US012743186B2

(12) United States Patent
Sengupta et al.

(10) Patent No.: US 12,743,186 B2
(45) Date of Patent: Sep. 22, 2026

(54) COLLABORATIVE ANALYTICS PLATFORM

(71) Applicant: Aible Inc., Pleasanton, CA (US)

(72) Inventors: Arijit Sengupta, San Francisco, CA (US); Joseph Veltkamp, Pleasanton, CA (US); Richard Cooke, Pleasanton, CA (US); Robert Shaw, Pleasanton, CA (US); Jonathan Wray, San Francisco, CA (US); John Delaney, Foster City, CA (US)

( * ) Notice: Subject to any disclaimer, the term of this patent is extended or adjusted under 35 U.S.C. 154(b) by 0 days.

(21) Appl. No.: 17/813,671

(22) Filed: Jul. 20, 2022

(65) Prior Publication Data

US 2023/0029011 A1 Jan. 26, 2023

Related U.S. Application Data

(60) Provisional application No. 63/223,829, filed on Jul. 20, 2021.

(51) Int. Cl.

| | |
|---|---|
| ***G06F 3/04817*** | (2022.01) |
| ***G06F 3/0482*** | (2013.01) |
| ***G06F 3/0484*** | (2022.01) |
| ***G06F 9/451*** | (2018.01) |

(52) U.S. Cl.

CPC ........ *G06F 3/04817* (2013.01); *G06F 3/0482* (2013.01); *G06F 3/0484* (2013.01); *G06F 9/451* (2018.02); *G06F 9/453* (2018.02)

(58) Field of Classification Search

CPC .. G06F 3/04817; G06F 3/0482; G06F 3/0484; G06F 9/451; G06F 9/453

See application file for complete search history.

(56) References Cited

U.S. PATENT DOCUMENTS

| | | | |
|---|---|---|---|
| 7,111,783 | B2 | 9/2006 | Xi et al. |
| 8,024,651 | B1 | 9/2011 | Error |
| 8,230,339 | B2 | 7/2012 | Watanabe et al. |
| 9,779,147 | B1 | 10/2017 | Sherman et al. |
| 9,891,801 | B2 | 2/2018 | Roesch et al. |
| 10,572,841 | B2 | 2/2020 | Reznik et al. |
| 10,990,247 | B1 | 4/2021 | Allspaw et al. |
| 11,029,806 | B1 | 6/2021 | Wijegunawardana |
| 11,037,208 | B1 | 6/2021 | Todd et al. |
| 11,138,271 | B1 | 10/2021 | Morningstar et al. |
| 11,314,692 | B1 | 4/2022 | Gutierrez et al. |

(Continued)

*Primary Examiner* — Adam M Queler

(74) *Attorney, Agent, or Firm* — Mintz Levin Cohn Ferris Glovsky and Popeo, P.C.

(57) ABSTRACT

A first set of nodes indicative of a multi-step analytical process including a plurality of analytical tasks is provided in a first graphical user interface (GUI). A first node of the first set of nodes is indicative of a first analytical task of the multi-step analytical process. A spatial arrangement of the first set of nodes in the GUI is indicative of a temporal order associated with the plurality of analytical tasks in the multi-step analytical process. Data characterizing a first input from a first user indicative of a request for assistance with the first analytical task is received. A second user with a second GUI including the spatial arrangement of the first set of nodes is provided. Data characterizing a second input indicative of interaction of a second user with the first analytical task via the first node is received. Related apparatus, systems, techniques and articles are also described.

18 Claims, 70 Drawing Sheets

5200

(56) References Cited

U.S. PATENT DOCUMENTS

| | | | |
|---|---|---|---|
| 11,468,369 | B1 | 10/2022 | Wilson et al. |
| 11,487,820 | B2 | 11/2022 | Mostafa et al. |
| 2002/0029161 | A1* | 3/2002 | Brodersen .......... G06Q 10/1093 705/7.14 |
| 2004/0078373 | A1* | 4/2004 | Ghoneimy ............. G06Q 10/10 |
| 2008/0312199 | A1 | 12/2008 | Glinsky |
| 2011/0055760 | A1 | 3/2011 | Drayton et al. |
| 2011/0145738 | A1* | 6/2011 | Laugwitz ............... G06Q 10/06 715/763 |
| 2011/0219324 | A1 | 9/2011 | Watanabe et al. |
| 2012/0240064 | A1 | 9/2012 | Ramsay et al. |
| 2013/0055146 | A1 | 2/2013 | Armitage |
| 2013/0246431 | A1 | 9/2013 | Ahuja et al. |
| 2013/0339904 | A1 | 12/2013 | Geithner |
| 2014/0053070 | A1 | 2/2014 | Powers et al. |
| 2014/0114889 | A1 | 4/2014 | Dagum |
| 2014/0164051 | A1 | 6/2014 | Nezhad et al. |
| 2014/0344004 | A1* | 11/2014 | Surendran ........ G06Q 10/06316 705/7.26 |
| 2015/0088808 | A1 | 3/2015 | Tyagi et al. |
| 2015/0120782 | A1* | 4/2015 | Kim ....................... G06Q 50/01 707/798 |
| 2015/0121368 | A1 | 4/2015 | Beisiegel et al. |
| 2015/0170382 | A1 | 6/2015 | Bhatia |
| 2015/0317320 | A1 | 11/2015 | Miller et al. |
| 2016/0275144 | A1 | 9/2016 | Herman et al. |
| 2016/0359700 | A1 | 12/2016 | Pang et al. |
| 2017/0017903 | A1 | 1/2017 | Gray et al. |
| 2017/0149875 | A1 | 5/2017 | Iyengar et al. |
| 2017/0178019 | A1 | 6/2017 | Duggan et al. |
| 2017/0288989 | A1 | 10/2017 | Sinha et al. |
| 2018/0068408 | A1 | 3/2018 | Edwards |
| 2018/0114178 | A1 | 4/2018 | Asokan |
| 2018/0165847 | A1 | 6/2018 | Broadbent et al. |
| 2019/0095507 | A1 | 3/2019 | Elisseeff et al. |
| 2019/0101834 | A1 | 4/2019 | Cao et al. |
| 2019/0286542 | A1 | 9/2019 | Shankar et al. |
| 2019/0318009 | A1 | 10/2019 | Miller et al. |
| 2020/0089664 | A1 | 3/2020 | Russell et al. |
| 2020/0097482 | A1 | 3/2020 | Woodward et al. |
| 2020/0104678 | A1 | 4/2020 | Nixon et al. |
| 2020/0174651 | A1 | 6/2020 | Kruse et al. |
| 2020/0241852 | A1 | 7/2020 | Vidan et al. |
| 2021/0034623 | A1 | 2/2021 | Sabhanatarajan et al. |
| 2021/0055915 | A1* | 2/2021 | Guo ...................... G06F 3/0482 |
| 2021/0150375 | A1 | 5/2021 | Pete et al. |
| 2021/0326387 | A1* | 10/2021 | Vliegen ................ G06F 16/904 |
| 2021/0407866 | A1 | 12/2021 | Huang et al. |
| 2022/0021705 | A1 | 1/2022 | Brurok et al. |
| 2022/0121329 | A1 | 4/2022 | Allspaw et al. |
| 2022/0207413 | A1 | 6/2022 | Harsha et al. |
| 2022/0245704 | A1 | 8/2022 | Xie et al. |
| 2023/0021917 | A1 | 1/2023 | Sengupta et al. |
| 2023/0053644 | A1 | 2/2023 | Sengupta et al. |

* cited by examiner

700

900

1000

1100

1200

Data Transformation

Dataset with 3 transformations, 1 filter, and no joins
Suggested actions are predict, explore, and blueprint When joins have been made show them as links between the data hubs

1400

1500

1600

1700

1800

1900

2000

2100

2200

2300

2400

2500

2600

2700

2800

2900

3000

3100

3200

3300

3400

3500

3600

3700

3800

3900

4000

4100

4200

4300

4400

4600

4700

4900

FIG. 51
Welcome to the Aible Data Portal
Upload Your Data

5100

5200

5400

5500

5600

5700

5800

5900

6000

6100

6200

6300

6400

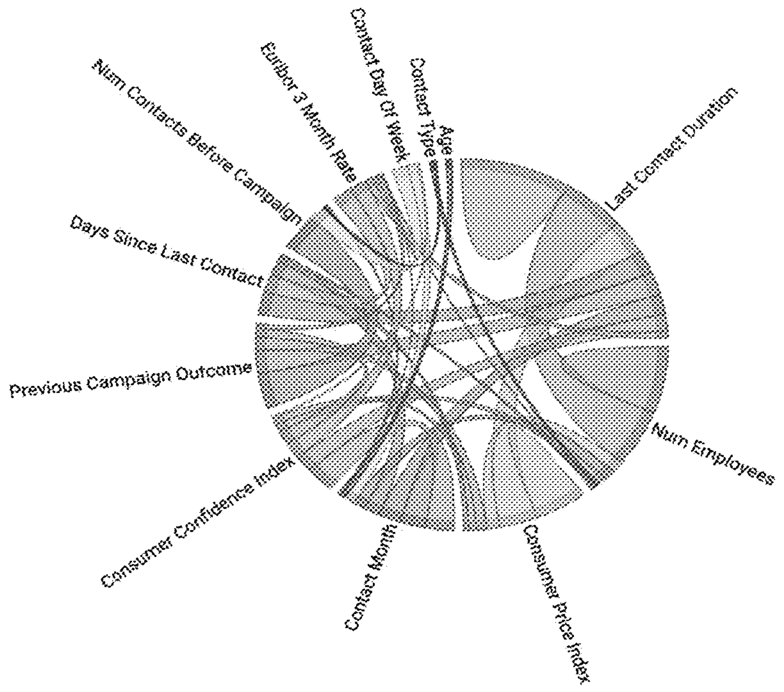

Last Contact Duration has the strongest relationship with Term Deposit Conversion and it behaves most differently when: Days Since Last Contact is (Missing) or Previous Campaign Outcome is success.

Num Employees has the second strongest relationship with Term Deposit Conversion.Consumer Price Index or Contact Month behave most differently when Num Employees is 5195.9 to 5228.1. Last Contact Duration behaves most differently when Num Employees is 4963.6 to 4991.6. Last Contact Duration behaves most differently when Num Employees is 4991.7 to 5017.5.

Consumer Price Index has the third strongest relationship with Term Deposit Conversion and it behaves most differently when: Employment Variation Rate is 1.2 to 1.4 or Num Employees is 5195.9 to 5228.1.

COLLABORATIVE ANALYTICS PLATFORM

CROSS-REFERENCE TO RELATED APPLICATION

This application claims the benefit of and priority under 35 U.S.C. § 119(e) to U.S. Provisional Patent Application No. 63/223,829 filed Jul. 20, 2021, the entire contents of which is hereby expressly incorporated by reference herein.

TECHNICAL FIELD

The subject matter described herein relates to an analytics platform.

BACKGROUND

A Graphical User interface (GUI) which can be displayed on a display device (e.g., monitor) of a computing device can allow a user to interact with the computing device. The GUI can include interactive graphical objects. Actions in the GUI can be performed through direct interaction (e.g., clicking, double clicking, etc.) with the interactive graphical objects. An interaction with the interactive graphical object can result in execution of a software application. In some implementations, the results of the software application can be displayed in the GUI.

SUMMARY

In an aspect, a first set of nodes indicative of a multi-step analytical process including a plurality of analytical tasks is provided in a first graphical user interface (GUI). A first node of the first set of nodes is indicative of a first analytical task of the multi-step analytical process. A spatial arrangement of the first set of nodes in the GUI is indicative of a temporal order associated with the plurality of analytical tasks in the multi-step analytical process. Data characterizing a first input from a first user indicative of a request for assistance with the first analytical task is received. A second user with a second GUI including the spatial arrangement of the first set of nodes is provided. Data characterizing a second input from a second user indicative of interaction of the second user with the first analytical task via the first node is received.

One or more of the following features can be included in any feasible combination. For example, the request for assistance from the first user can include one or more access parameters characterizing whether the second user is permitted to access a record of a dataset associated with the first analytical task. The second input can include a request for information associated with the first analytical task. A data sub-set can be selected from a dataset associated with the first analytical task, the selecting based on the one or more access parameters. The selected data sub-set can be provided to the second user. One or more users can be selected from a plurality of prospective users. The selecting can be based on comparing a predetermined set of requirements included in the request for assistance from the first user and user characteristics associated with the plurality of prospective users. A second set of nodes indicative of the selected one or more users can be provided in a third graphical user interface (GUI). The second set of nodes can be arranged adjacent to a core node located at a first location in the third GUI. The arrangement can be based on a plurality of priority values. Each node of the second set of nodes can be associated with a priority value of the plurality of priority values. A second node of the second set of nodes can be located at a second location in the third GUI, the second node associated with the second user, and the second location can be indicative of a highest priority result associated with the request for assistance. A third node of the second set of nodes can be located at a third location in the third GUI. The third node can be associated with a third user and the third location can be indicative of a second-highest priority result associated with the request for assistance.

An assistance notice including at least a portion of the predetermined set of requirements can be generated. The assistance notice can be provided to the plurality of prospective users. Data characterizing user characteristics associated with the plurality of prospective users can be received. Data characterizing a request to provide the temporal order of the plurality of analytical tasks in the multi-step analytical process can be received via the second GUI. The temporal order can be indicative of the order in which the analytical tasks in the plurality of analytical are created in the first GUI. The nodes in the first set of nodes can be sequentially provided in the second GUI. The first node indicative of the first analytical task can be displayed prior to a second node indicative of a second analytical task. The first node and the second node can be simultaneously displayed after the second node is displayed. The data characterizing the second input can be provided to the first user via the first GUI, the provided data indicative of operations performed by the second user on the first analytical task.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 64 is an example of a chord chart according to some example implementations;

Like reference symbols in the various drawings indicate like elements.

DETAILED DESCRIPTION

Figure 1:
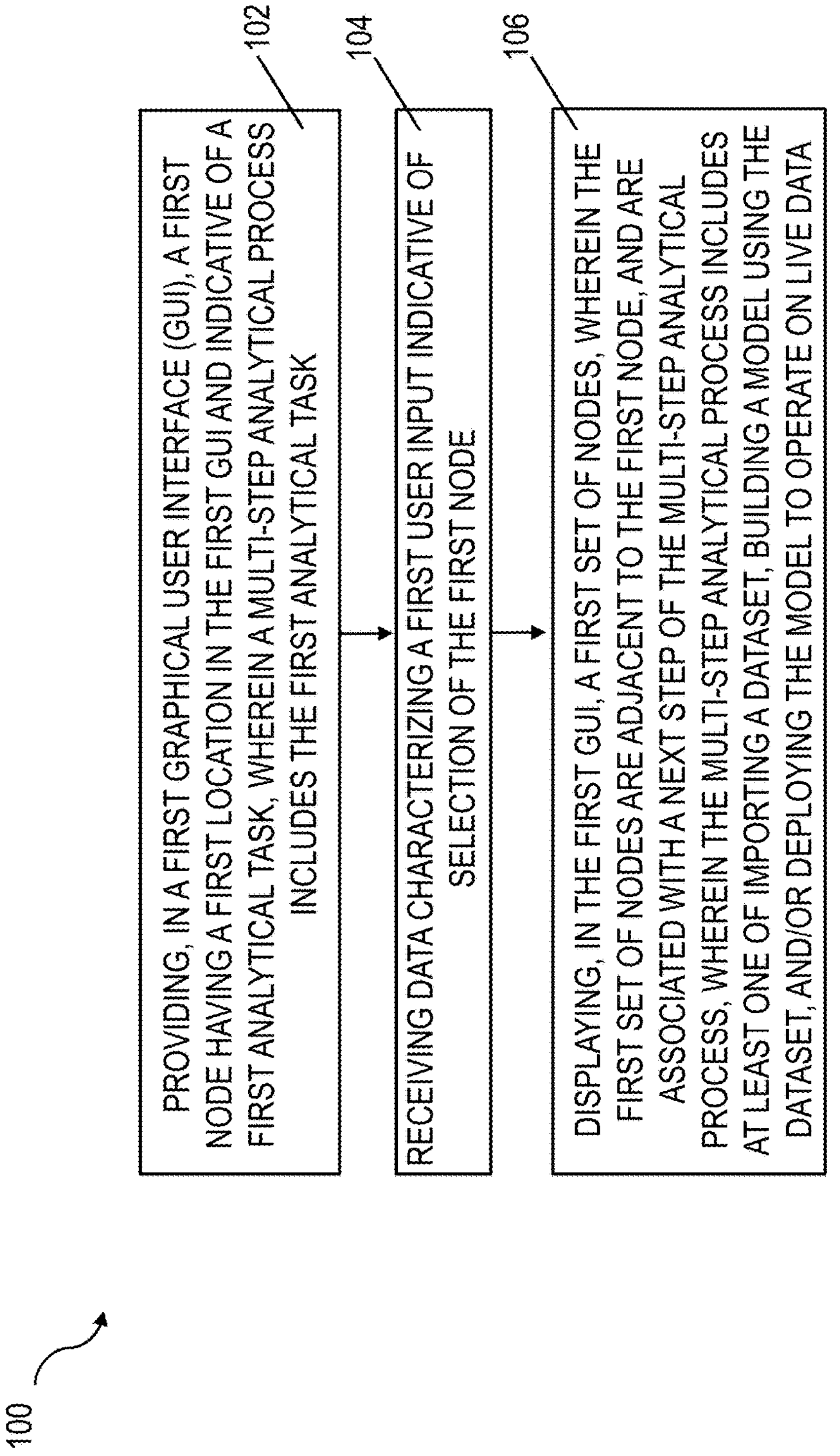
FIG. 1 is a flowchart of an exemplary method of generating an interface representative of a multi-step analytical process.

Analytical tasks (such as model building, assessment, and deployment) can include performing complex analytical processes using systems such as model building platforms that enable the creation of analytics (e.g., models). These techniques and systems may record a log of actions taken by a user (e.g., a model developer) but the log can be difficult for the user to follow, particularly where the user is a business user, rather than a technical subject matter expert. Moreover, the user may not be able to understand what steps they or another user has taken in developing the analytics. Analytical tasks can be composed into granular analytical tasks that can be carried out independently or dependently in the pursuit of the overall analytical goal. Decomposing the overall analytical task into granular tasks can simplify context transfer and collaboration. Thus some existing analytical systems lack an interface for allowing a user to seamlessly collaborate with another user for a given analytical task. This can include selecting a suitable user, assigning the analytical task to the selected user and providing the selected user with the information needed to work on the assigned analytical task. Moreover, it can be desirable to present information associated with the assigned task in an efficient manner to improve the performance of the assigned user. For example, information may need to be presented such that the assigned user can quickly gain an understanding of the assigned analytic task (e.g., model, process, and the like), quickly gain an understanding of what may have changed in an analytic over a period of time, and quickly gain an understanding of how an analytic was developed. The ability of a system for a user to quickly gain an understanding of analytics, changes to the analytics, and how the analytics were developed can be sometimes referred to as "glanceability" of the model building and deployment system. More broadly, whether an interface is glanceable can refer to information on an electronic interface that can be understood quickly or at a glance.

Some implementations of the current subject matter include an interface that enables improved glanceability, including by providing an intuitive interface for collaboration between users to perform an analytical task. The interface can include a graphical user interface that can include nodes (for example hex boxes as shown in the examples below) that can represent granular analytical tasks and convey information associated with those tasks, such as the impact on the project or enterprise from the granular analytical task. The nodes can be arranged in a manner to convey relationships among the analytical tasks (e.g., a temporal order in which the analytical tasks were created).

The nodes can be interactive, allowing for selection of the node to, for example, control actions in the performance of the analytical task, such as allowing for exploration of information associated with the node (e.g., viewing graphs and other analysis related to the selected analytic task), providing an interface for performing any incomplete analytic tasks, and the like.

Views

In some implementations, a user can interact with a graphical user interface that can be representative of (and allow for the performance of) a plurality of analytical tasks (e.g., a plurality of analytical tasks associated with a multi-step analytical process). For example, a node in the GUI can be indicative of a first analytical task that has been performed. In order for a user to perform a second step in the multi-step analytical process, the user can select a second analytical task from a first set of possible or available analytical tasks, which can be subsequently performed via the interface.

A user can request adding a node representative of the second analytical task in the GUI, for example, by selecting an existing node in the interface. In some implementations, when the user requests the addition of the second analytical task (e.g., by selecting an existing node), the GUI can generate a first set of nodes adjacent to the first node (e.g., where each node of the first set of nodes represents an analytical task from the first set of analytical tasks that can be performed within the system). The user can select the desired second analytical task to be performed from the first set of analytical tasks by selecting the corresponding node (e.g., second node) from the first set of nodes in the GUI. In some implementations, after the selection of the second node, the remaining nodes from the first set of nodes is no longer be visible, indicating that the second node has been selected by the user. A subsequent node (e.g., a third node, a fourth node, etc.) can be added by repeating the above-mentioned method.

The arrangement of the first set of nodes in the GUI can be indicative of a priority associated with the nodes. In some implementations, a priority of the node can be representative of a recommendation by the system for a next step to be performed in the multi-step analytical process. In some implementations, the first set of nodes can be arranged adjacent the first node based on the priority of the analytical tasks corresponding to the nodes in the first set of nodes. For example, a node arranged above and to the right of the primary node can represent a highest priority step, and nodes arranged downstream in the clockwise direction can have decreasing (or lower) priority.

Figure 2:
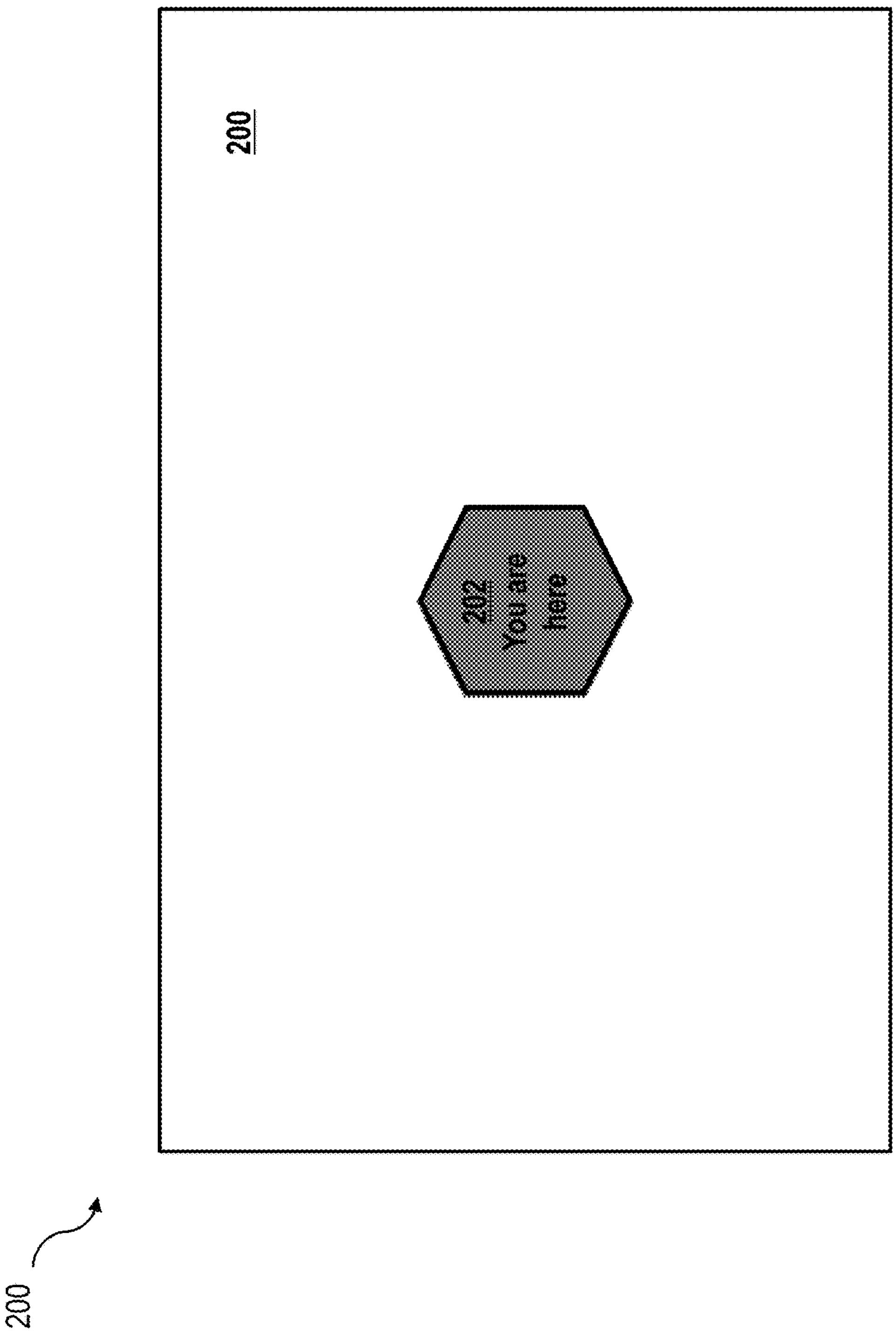
FIG. 2 illustrates an exemplary graphical user interface (GUI) display space that includes a first node.

FIG. 1 illustrates an exemplary process of generating an interface that can enable performance of steps in a multi-step analytical process, viewing of previously-completed steps in the multi-step analytical process, and other functionality in an intuitive manner for a user. At step 102, a first node having a first location can be provided in a first graphical user interface (GUI) display space. FIG. 2 illustrates an exemplary GUI 200 that includes a first node 202. The first node can be indicative of a first analytical task. In some implementations, the first analytical task can serve as a first step of a multi-step analytical process. For example, the multi-step analytical process can include importing a dataset, building a model using the dataset, and/or deploying the model to operate on live data. Other actions can be performed in the multi-step analytics process, as described more fully below. Subsequent steps of the multi-step analytical process can be performed utilizing the GUI 200, which can include displaying nodes to represent the subsequent steps of the multi-step analytical process.

At step 104, data characterizing a first user input indicative of selection of the first node of the first set of nodes can be received. For example, the first node 202 can be interactive and the user can interact with it (e.g., by clicking on it). Based on the user interaction with the first node by the user, the first analytical task represented by the first node 202 can be performed. In some implementations, performance of the first analytical task can be performed via another screen or view of the GUI 200.

In some implementations, the user can interact with the first node to indicate adding of a next step of the multi-step analytical process. The next step can include performing a second analytical task that can be performed after the first analytical task in the multi-step analytical process. In some implementations, the next step can include importing a dataset, building an analytical model (e.g., included in the analytical task) using the imported dataset, deploying the analytical model to operate on live data, and the like.

Figure 3:
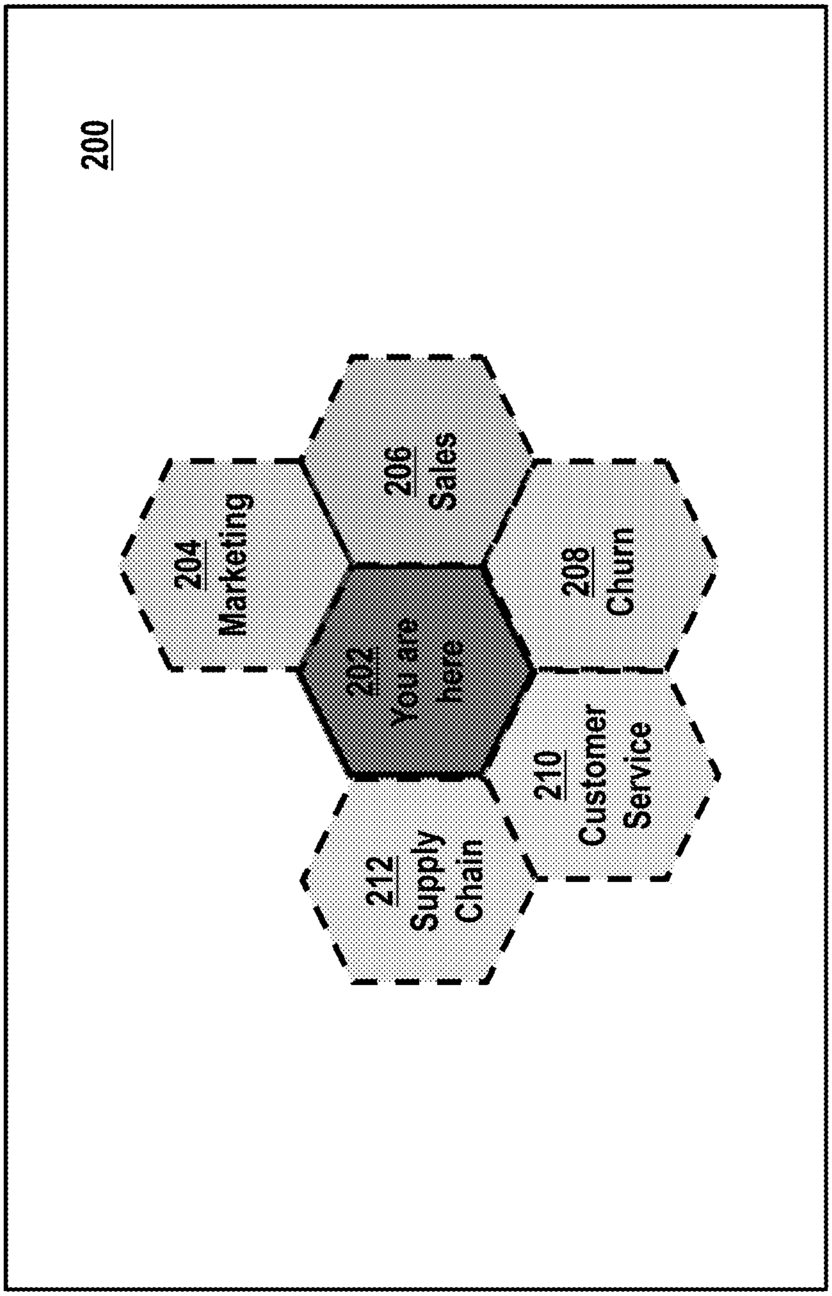
FIG. 3 illustrates the GUI display space of FIG. 2 that includes a first set of nodes that are displayed adjacent to the first node.

At step 106, the first set of nodes can be displayed in the first GUI display space. The first set of nodes can represent steps in the multi-step analytical process that are available to be performed. FIG. 3 illustrates the first GUI display space 200 that includes the first set of nodes 204-218 that are displayed adjacent to the first node 202. Each node of the first set of nodes 204-212 is associated with a possible next step of the multi-step analytical process (e.g., node 204 can represent a marketing task, node 206 can represent a sales task, node 208 can represent a churn task, node 210 can represent a customer service task, node 212 represents a supply chain task, etc.).

The arrangement of the nodes in the first set of nodes in the first GUI can be representative of the priority of the analytical task represented by the corresponding node. In some implementations, the nodes of the first set of nodes can be arranged clockwise (relative to the first location of the first node) in the decreasing order of priority. For example, node 204 located at a second location in the interface 200 can have the highest priority, node 206 located at a third location (adjacent to the node 204 in a clockwise direction (around the first location of the first node) from the second location of the node 204) and can have the second highest priority, and node 212 located at a fourth location in the interface 200 can have the lowest priority. In some implementations, the nodes of the first set of nodes can be arranged counter-clockwise (relative to the first location of the first node) in a decreasing order of priority. For example, node 212 can have the highest priority, node 210 located at a fifth location (adjacent to the node 212 in an anti-clockwise direction (around the first location of the first node) from the third location of the node 212) and can have the second highest priority, and node 204 can have the lowest priority. In some implementations, priority can be determined by the system, for example, utilizing predictive models that predict the next-best step to be performed based on historical user activity for users with similar objectives or performing similar multi-step analytical processes. In some implementations, the priority order can be predefined or predetermined. In some implementations, there is no priority order to the displayed nodes representing possible next-steps in the multi-step analytical process.

In some implementations, visual characteristics of a node can be indicative of various properties of the analytical task associated with the node. In some implementations, the boundary of a node can indicate whether the analytical task has been completed/selected or not. For example, if the boundary of the node (e.g., node 204) is a solid line, it is indicated that the corresponding analytical task (e.g., analytical task indicated by the node 204) has been completed/selected. As illustrated in FIG. 3, the boundaries of the first set of nodes 204-212 are represented by a dashed line. This can indicate that no node from the first set of nodes 204-212 has been selected yet. In other words, the analytical tasks associated with the first set of nodes are the possible options for the next analytical task (after the first analytical task associated with the first node 202), and the user has not made a selection for the next task.

Figure 4:
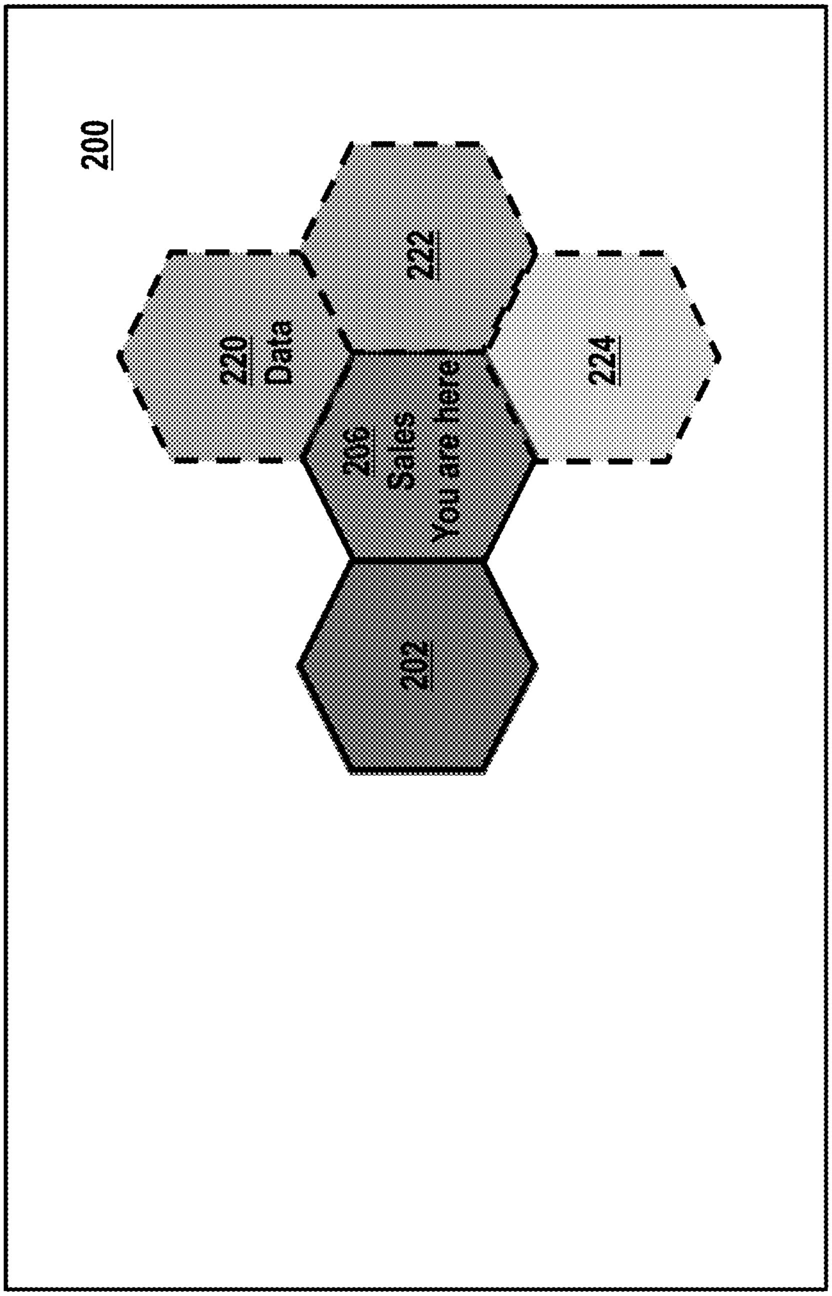
FIG. 4 illustrates the GUI display space of FIG. 3 that includes a second set of nodes that are displayed adjacent to a node selected from the first set of nodes.

FIG. 4 represents the exemplary GUI 200, where the user has selected the analytical task (associated with the node 206) as the second task (or the next task) of the multi-step analytical process. Upon selection, the boundary of the node 206 is represented by a solid line. The user may decide to continue building the multi-step analytical process. This can be done, for example, by adding a third analytical model to the existing first analytical model (represented by first node 202) and the second analytical mode (represented by second node 206). The user can interact with the second node 206 (e.g., by clicking on it) to indicate, for example, the generation of a next step (or the third step) of the multi-step analytical process. The next step can include generating the third analytical task that can be executed after the execution of the first and the second analytical task in the multi-step analytical process.

When the user interacts with the second node 206, data characterizing the user's interaction with the second node 206 is received. Based on the receipt of user's interaction, a third set of nodes 220-224 can be displayed adjacent to the second node 206. Each node of the third set of nodes 220-224 are associated with a possible next step of the multi-step analytical process. As described above, in some implementations, the arrangement of the nodes in the third set of nodes in the first GUI 200 can be representative of the priority of the analytical task represented by the corresponding node. For example, node 220 can have the highest priority, node 222 can have the second highest priority and node 224 can have the third highest priority. Alternately, node 224 can have the highest priority, node 222 can have the second highest priority and node 220 can have the third highest priority. The boundaries of the third set of nodes 220-224 are represented by a dashed line. This can indicate that no node from the third set of nodes 220-224 has been selected yet.

Figure 5:
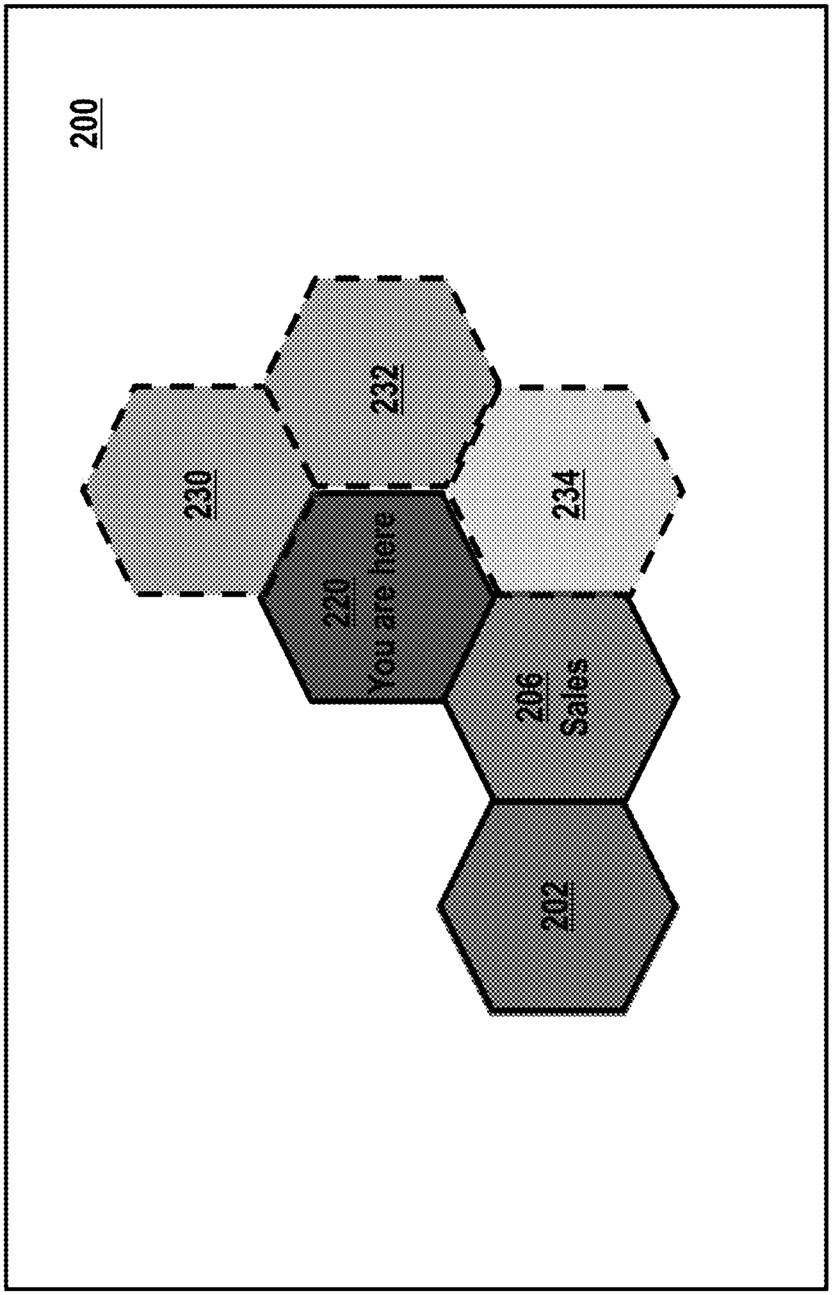
FIG. 5 illustrates the GUI display space of FIG. 4 that includes a third set of nodes that are displayed adjacent to another node selected from the second set of nodes.

FIG. 5 represents the exemplary GUI 200, where the user has selected the analytical task (associated with the node 220) as the third task (or the next task) of the multi-step analytical process. Upon selection, the boundary of the node 220 is represented by a solid line. The user may decide to continue building the multi-step analytical process. This can be done, for example, by adding a fourth analytical model to the existing first analytical model (represented by first node 202), the second analytical mode (represented by second node 206) and the third analytical model (represented by the third node 220). The user can interact with the third node 220 (e.g., by clicking on it) to indicate, for example, the generation of a next step (or the third step) of the multi-step analytical process. The next step can include generating a fourth analytical task that can be executed after the first, the second and the third analytical task in the multi-step analytical process.

When the user interacts with the second node 220, data characterizing the user's interaction with the second node 220 is received. Based on the receipt of user's interaction, a fourth set of nodes 230-234 can be displayed adjacent to the third node 220. Each node of the fourth set of nodes 230-234 is associated with a possible next step of the multi-step analytical process. As described above, in some implementations, the arrangement of the nodes in the fourth set of nodes in the first GUI 200 can be representative of the priority of the analytical task represented by the corresponding node. For example, node 230 can have the highest priority, node 232 can have the second highest priority and node 234 can have the third highest priority. Alternately, node 234 can have the highest priority, node 232 can have the second highest priority and node 230 can have the third highest priority. The boundaries of the fourth set of nodes 230-234 are represented by a dashed line. This can indicate that no node from the fourth set of nodes 230-234 has been selected yet.

Figure 6:
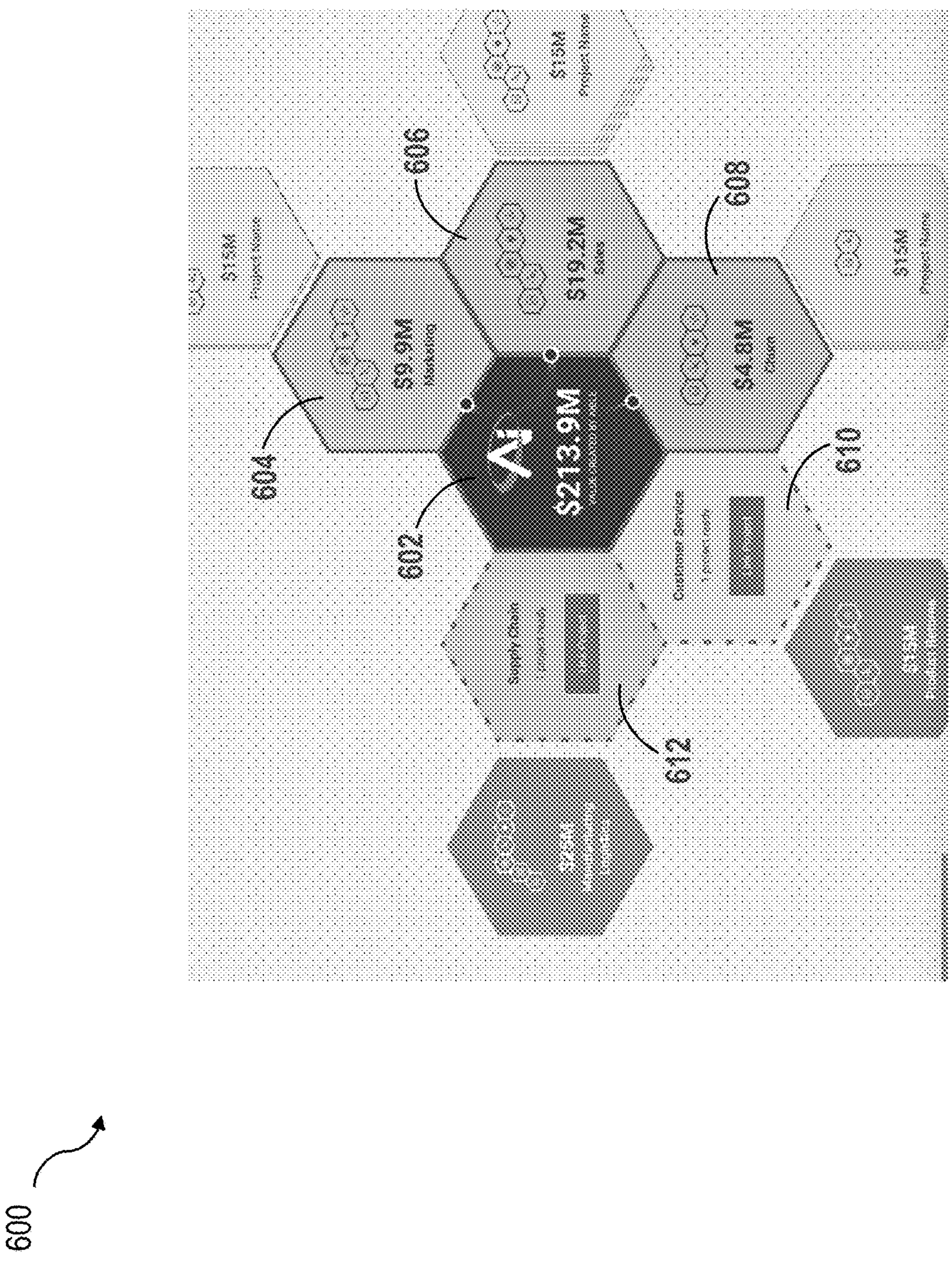
FIG. 6 is an image of an example graphical user interface according to some example implementations of the current subject matter that can provide an intuitive interface to managing and performing analytical tasks using a model building and deployment platform.

FIG. 6 is an image of an example graphical user interface 600 according to some example implementations of the current subject matter that can provide an intuitive interface to managing and performing analytical tasks using a model building and deployment platform. The illustrated example interface 600 shows a summary or overview view. The initial node 602 (dark purple node) is illustrated with three connectors icons that connect the initial node (dark purple) to three neighboring nodes (labeled marketing 604 (light purple), labeled Sales 606 (light blue), and labeled Churn 608 light green). The initial node 602 (dark purple node) includes text describing a metric, in this case, the value that the analytical system is providing to an enterprise. In some implementations, the summary view can summarize one or more projects, which can include a collection of analytical tasks devoted to accomplishing a certain task, limited to a certain business unit, operation, team, and the like. As illustrated in FIG. 6, each node or hex box can represent a project, which can interact with one another.

The three neighboring nodes are projects including analytical tasks that have been completed and deployed by a user implementing the analytical tasks. The border of these nodes is solid indicating that the analytical tasks are completed and deployed. Nodes with dashed borders can indicate that an analytical task was completed but not deployed by the user, or that the analytical task or project was started but is still incomplete.

Each completed neighboring node (Marketing, Sales, and Churn), also shows that tasks' impact on the overall project or enterprise (e.g., on the initial node). For example, the Marketing, Sales, and Churn nodes also indicate the monetary value of those projects and associated analytical tasks to the enterprise.

Thus, the example interface 600 can provide a significant amount of information to a user relating to the analytical tasks and projects at a "glance" of the summary view.

Figure 7:
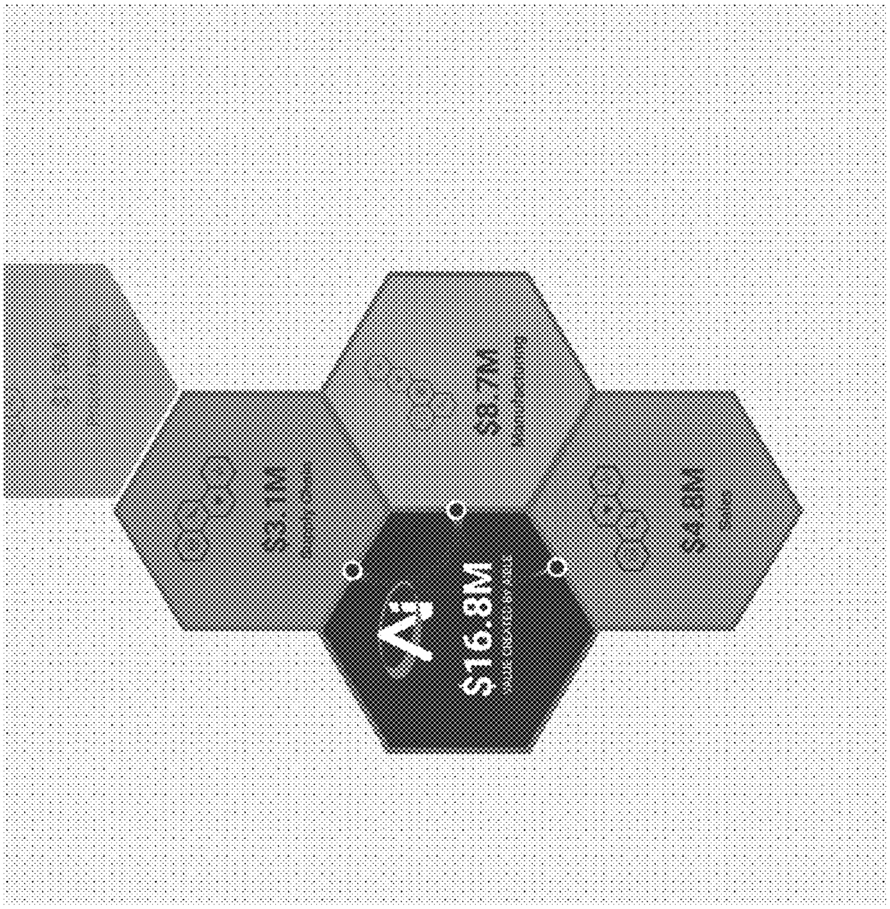
FIG. 7 is another example of the summary view interface as described with respect to FIG. 6.

FIG. 7 is another example of the summary view interface as described with respect to FIG. 6.

Figure 8:
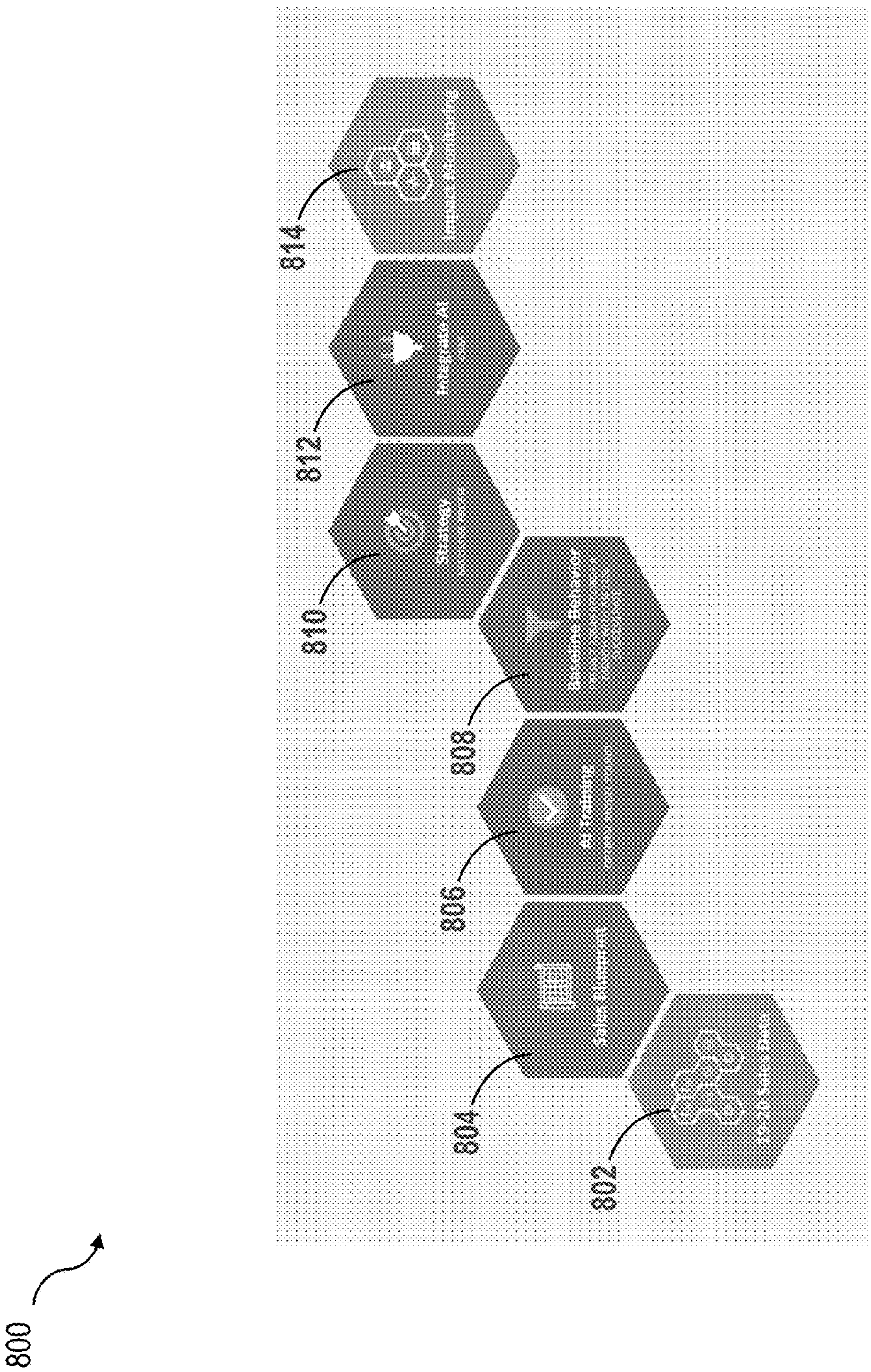
FIGS. 8-10 illustrate an example interface for building a predictive model using the example expandable node approach, for example, a model building view.
Figure 9:
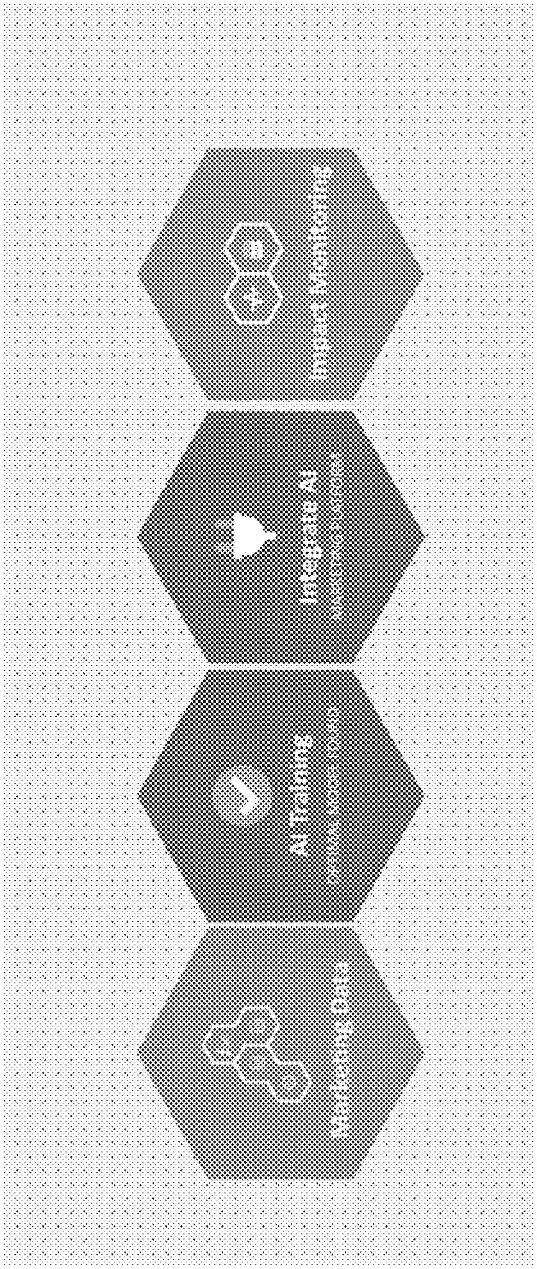
Figure 10:
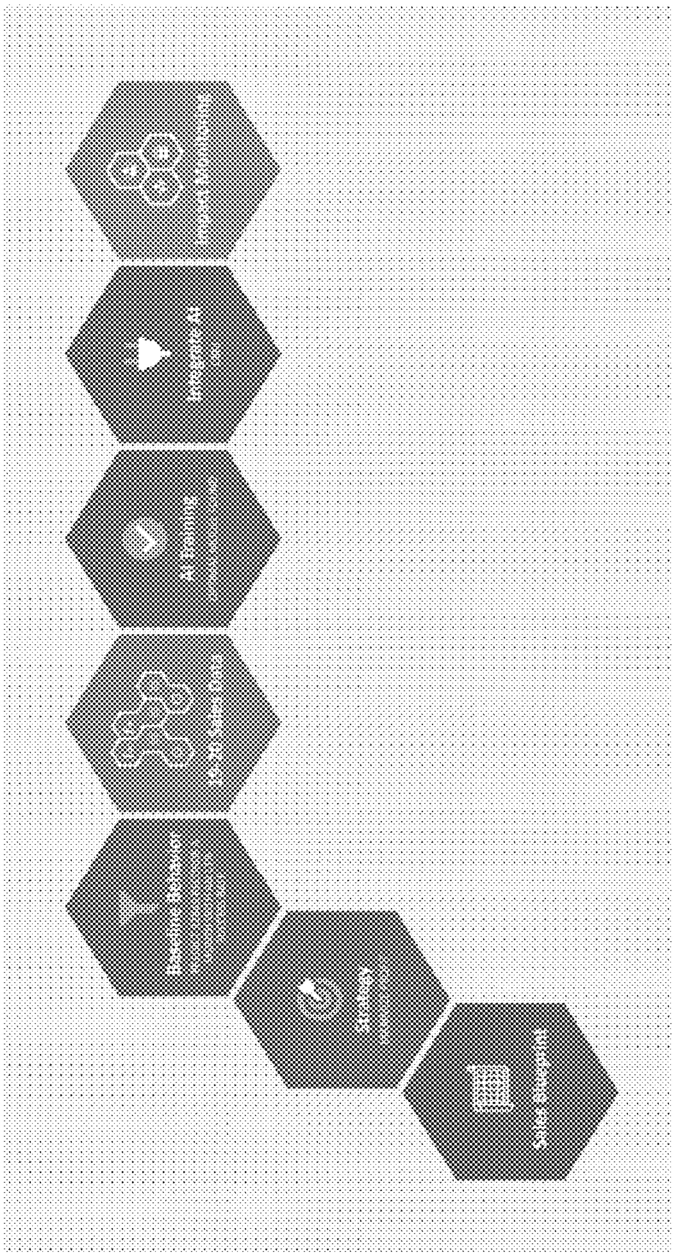

FIGS. 8-10 illustrate an example interface for building a predictive model using the example expandable node approach, for example, a model building view. With reference to FIG. 8, a user can begin with selecting a blueprint, selecting data sources, and then training an AI. Additional actions such as predicting baseline behavior (e.g., model performance assessment), strategy, integration, and impact monitoring can also be implemented by the user.

In some implementations, a user can work on the analytical task associated with a node. For example, the user can select one of the nodes 204-212 in interface 200 and add analytical sub-tasks to the analytical task associated with the selected node. In some implementations, a second user input indicative of an interaction (e.g., selection) with a node (e.g., node 206 associated with the sales task) can be received. Based on the interaction a second representation graphical user interface (e.g., interface 800) can be displayed which can allow for building the analytical task (e.g., a predictive model in the analytical task) associated with the interacted node. For example, the interface 800 can allow for building on the predictive model of the sales task. As illustrated in FIG. 8, interface 800 includes nodes 802-804 that represent a plurality of analytical sub-tasks associated with the sales task. Building the sales task can include retrieving/adding sales data (represented by node 802), adding a sales blueprint (represented by node 804), performing AI training (represented by node 806), predicting baseline behavior (represented by node 808), applying a strategy (represented by node 810), integrating the sales task with an existing artificial intelligence model (represented by node 812), performing impact monitoring (represented by node 814), etc. The nodes are placed based on the temporal order in which they were created (e.g., node 802 is created first and node 814 is created last).

In some implementations, a new node representing an analytical subtask can be added by a user. For example, a user input indicative of addition of a new analytical sub-task to the set of analytical sub-tasks can be received (e.g., via interface 800). The new node (e.g., node 814) is placed adjacent to a previous node (e.g., node 812 that is the last node to be generated temporally prior to the generation of node 814) in the interface 800. The previous node can be indicative of a previous analytical sub-task (e.g., artificial intelligence model associated with node 812) of the plurality of analytical sub-tasks. The location of a new node relative to the previous node can be indicative of the priority of the analytical sub-task associated with the new node. For example, as the priority of the analytical sub-task decreases, the location of the new node relative to the previous node is rotated in the clockwise (or anti-clockwise direction).

Figure 11:
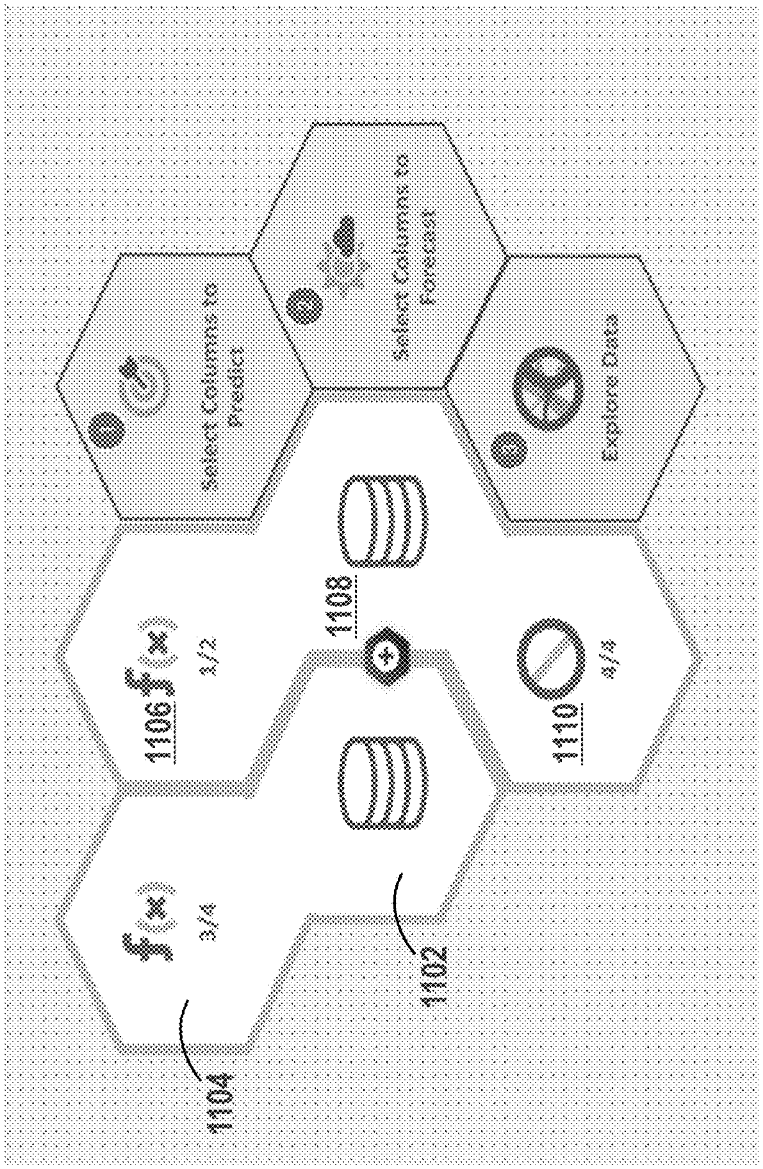
FIG. 11-12 is another example interface illustrating data transformation and data preparation views.
Figure 12:
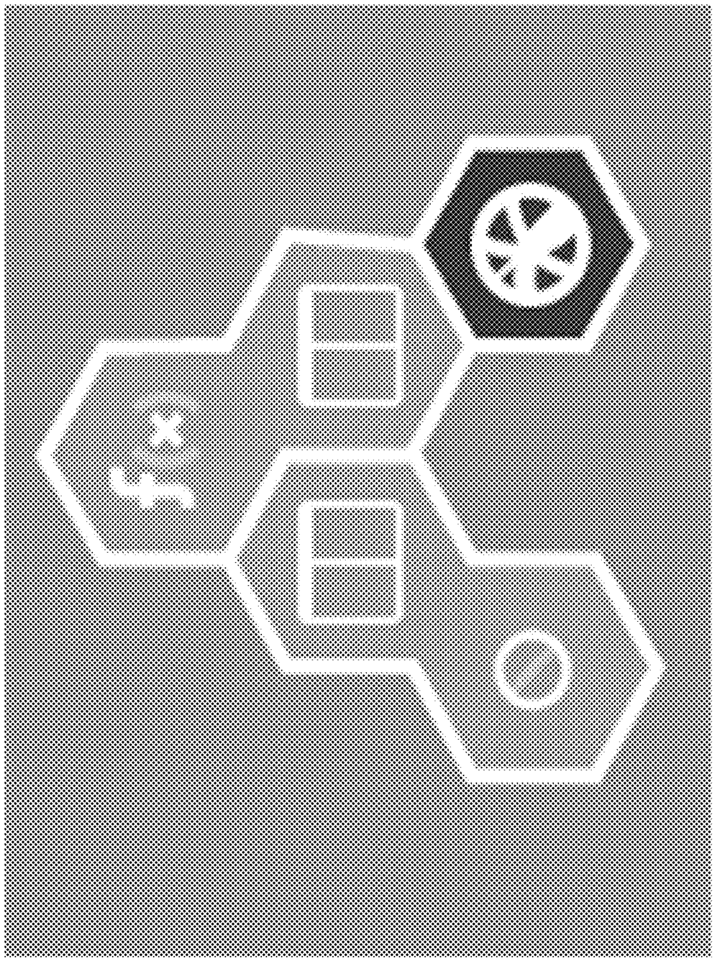
Figure 13:
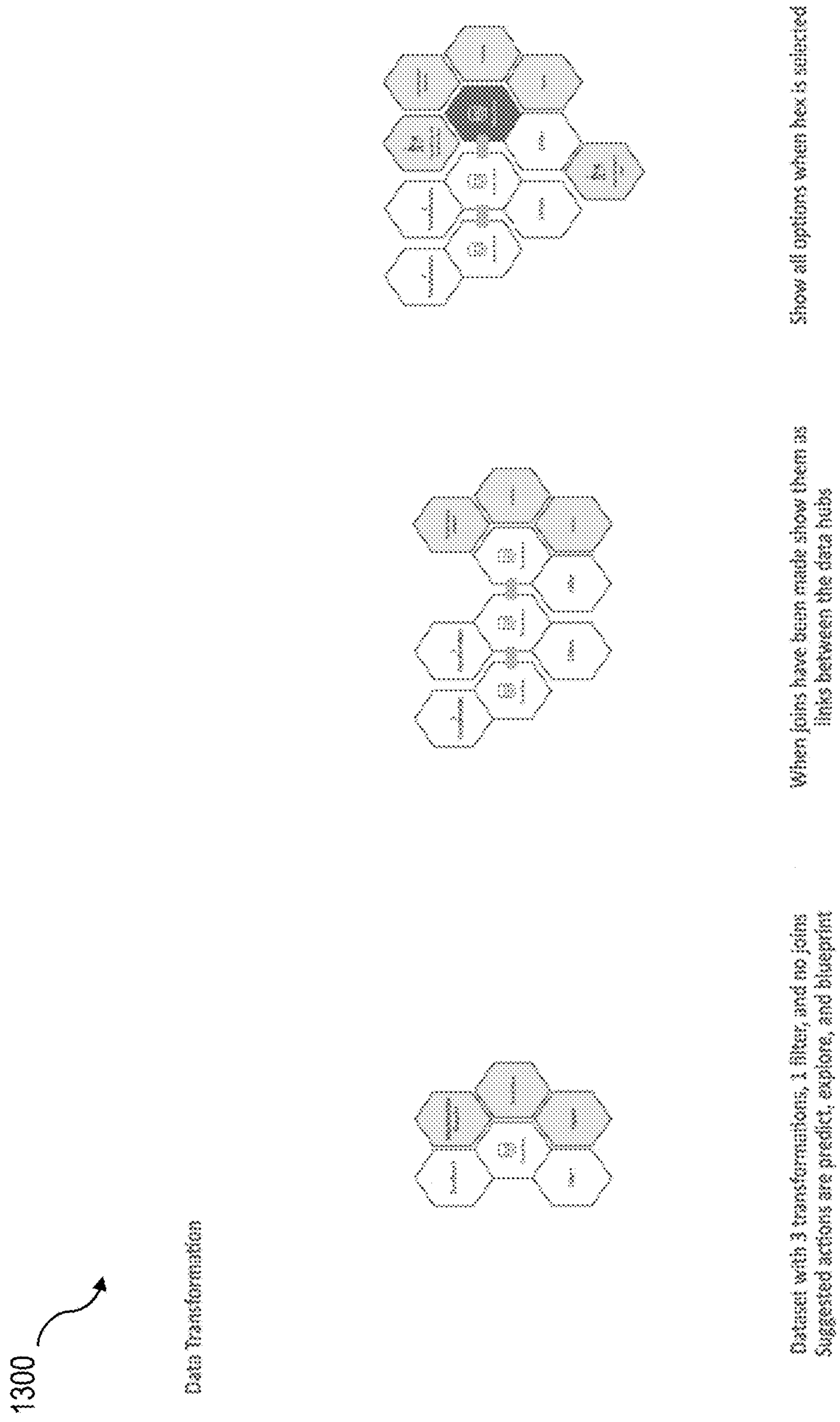
FIG. 13 illustrates an example of data transformation.
Figure 14:
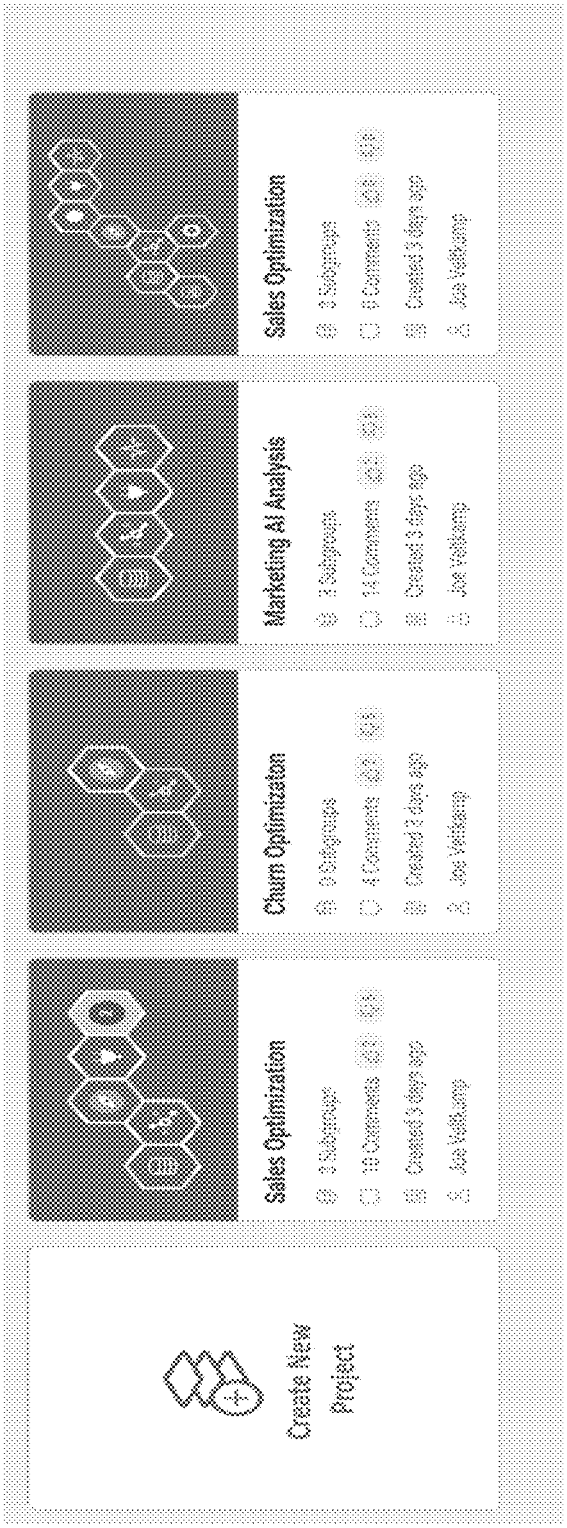
FIG. 14 illustrates an interface for selecting different projects or creating a new project.

FIG. 11 is another example interface 1100 illustrating data transformation and data preparation views. The illustrated nodes can represent data sources and functions on those data sources. Nodes that have common borders can show that a function (e.g., nodes labeled f(x), where a function can be any function that would be applied to a data source, such a "$x^2$") has been applied to the data source. A node illustrating a circle with a line through it can show that four variables have been excluded from the associated data source. The icon (plus sign) between the two data sources can indicate that the two data sources (with their associated functions applied and variables excluded) have been joined. The shaded nodes can represent recommendations or options for manipulating the data source or applying an analytical task, and selection of these nodes by the user can implement the associated analytical task. FIG. 12 is another example interface as described with respect to FIG. 11. FIG. 13 illustrates an example of data transformation. FIG. 14 illustrates an interface for selecting different projects or creating a new project.

In some implementations, interface 1100 can be displayed based on a user input indicative of selection of a node in interface 200 or interface 800. For example, the interface 1100 is displayed based on interaction (e.g., selection) with a node (e.g., node 802 associated with the analytical task of adding sales data) from the plurality of nodes (e.g., nodes 802-814) in the interface 800. The interface 1100 can include a subset of node that includes node 1102 indicative of a dataset (e.g., sales dataset associated with the analytical sub-task of node 802) and node 1104. Node 1104 can be located adjacent to the node 1102 (e.g., share a common border) and can be indicative of a function or an operation that can be (or has been) applied on the dataset. For example, a common border between node 1102 and the node 1104 can be absent. This can indicate that the operation associated with node 1104 has been applied on the dataset associated with node 1102.

In some implementations, a third node can be added to the subset of nodes. The third node can provide additional information associated with the application of the operation on the dataset (e.g., portion of the dataset that has been excluded from the application of the operation). For example, three nodes 1106, 1108 and 1110 can form a subset of nodes where one or more borders missing between the nodes in the subset. For example, a first border between node 1106 and 1108, and a second border between node 1108 and 1110 can be missing. The subset of nodes can indicate that an operation (associated with node 1106) has been applied on a portion of the dataset (associated with node 1108). The numerical value in the node 1110 can indicate the portion of the dataset that has not been operated upon by the operation associated with node 1106.

In some implementations, a graphical user interface (e.g., graphical user interface 200) can represent a multi-step analytical process that can include a hierarchy of tasks. The hierarchy can include multiple layers where each layer can include multiple analytical tasks. For example, a first layer can include an analytical task and a second layer can include a second layer analytical sub-tasks associated with the analytical task in the first layer (e.g., the second layer analytical sub-task can sequentially follow the analytical task in the first layer). In some implementations, the hierarchy can include a third layer that can include third a layer analytical sub-tasks associated with at least one analytical task in the second layer.

In some implementations of the current subject matter, the hierarchical multi-step analytical process can be visually represented. In some implementations, the first layer of the hierarchy can be represented by a first representation of a GUI, the second layer of the hierarchy can be represented by a second representation of the GUI, and a third layer of the hierarchy can be represented by a third representation of the GUI. For example, the first layer of the hierarchy can be represented by the GUI 200, the second layer can be represented by GUI 800, and the third layer can be represented by the GUI 1100. As illustrated in GUI 200, an analytical tasks in the first layer (analytical task associated marketing, sales, churn, customer service, supply chain, etc.) can be represented by one of the nodes 204-212.

In some implementations, the user can access the analytical tasks in the second layer by interacting with one of the nodes 204-212. For example, the user can interact with node 206 associated with sales, and the GUI 800 can be presented that includes a visual representation (e.g., one or more nodes) of the second layer analytical sub-tasks associated with the sales analytical task (represented by node 206). The second layer analytical sub-tasks can include, for example, importing data, training models, assessing, deploying, monitoring the deployment, etc. For example, a second layer analytical sub-tasks can be represented by one of the nodes 802-814.

In some implementations, the user can access the analytical tasks in the third layer by interacting by one of the nodes representative of second layer analytical sub-tasks. For example, the user can interact with node 802 associated with addition/importing of sales data, and the GUI 1100 can be presented that includes a visual representations (e.g., one or more nodes) of third layer analytical sub-task associated with addition/importing of sales data (represented by node 802). As described later, GUI 1100 can allow the user to identify the data to import and perform basic functions/joins/etc. on the data.

The interaction with a node that allows the user to move from one layer to another (e.g., from the first layer to the second layer) can be different from the user interaction associated with addition of a next step of the multi-step analytical process (e.g., as described in step 104 above). For example, in order to switch views, a user may double click a node, select an action from a context menu, select an action from a navigation bar, and the like.

In some implementations, the current subject matter can enable conveying recommendations visually, for example, by arranging nodes around a selected node in a predetermined order. For example, in some implementations, the model development and deployment system can provide recommendations to the user regarding which analytical tasks would be most impactful on the performance of the project or enterprise. These recommendations can be provided by displaying new nodes surrounding a current node, where each new node corresponds to a recommended action. The arrangement of new nodes can indicate the relative order of the recommendations. For example, recommendations can be arranged in a clockwise order.

Figure 15:
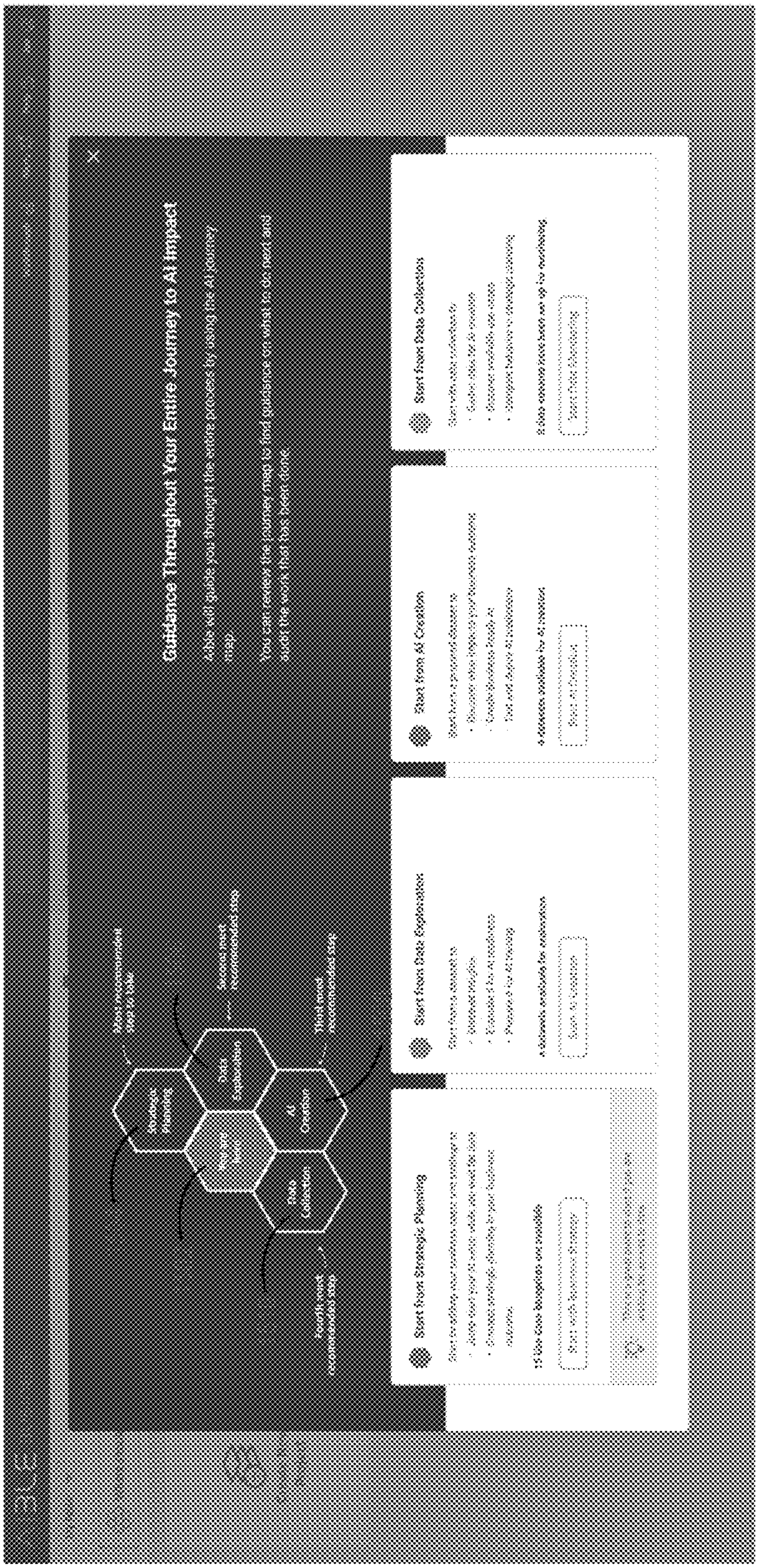
FIG. 15 illustrates an interface describing instructions for a user to interact with some example implementations of the current subject matter including showing how the most recommended next step can be illustrated in a predetermined location (e.g., upper right hand neighboring hexagon), with next recommended steps in order of priority proceeding clockwise.

FIG. 15 illustrates a recommendation interface 1500 that can provide recommendation (or information) for building an interface (e.g., interface 200) of a multi-step analytical process. In some implementations, an input from a user indicative of a request for recommendation (or information) can be received (e.g., via interface 200). This can be done prior to or during the generation of the nodes in the interface 200. After receiving the request from the user, the recommendation interface 1500 can be generated. The recommendation interface 1500 can include multiple recommendation nodes 1502-1510 that can include recommendation/information for building the interface representative of a multi-step analytical process. For example, a first recommendation node 1502 can be indicative of a starting node (e.g., node 202). The starting node can be associated with an analytical task in the first layer of the multi-step analytical process hierarchy. The recommendation interface 1500 can include a first set of recommendation nodes 1504-1510 that can be indicative of nodes (e.g., nodes 204-210) associated with analytical tasks in the second layer of the multi-step analytical process hierarchy. The recommendation nodes in the first set of recommendation nodes can includes properties of analytical tasks in the second layer. The properties can include, for example, description of an analytical task (e.g., as text inside the corresponding recommendation node), priority level of the analytical task (e.g., represented by location of the corresponding recommendation node relative to the first recommendation node 1502), etc.

Figure 16:
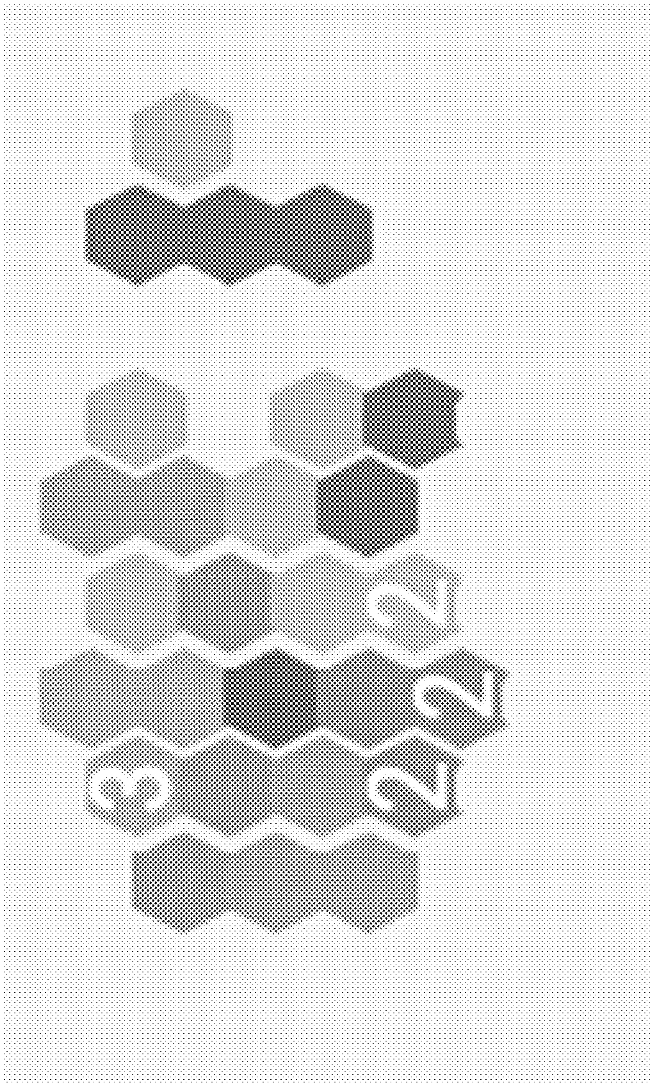
FIG. 16-19 illustrate exemplary data exploration views.
Figure 17:
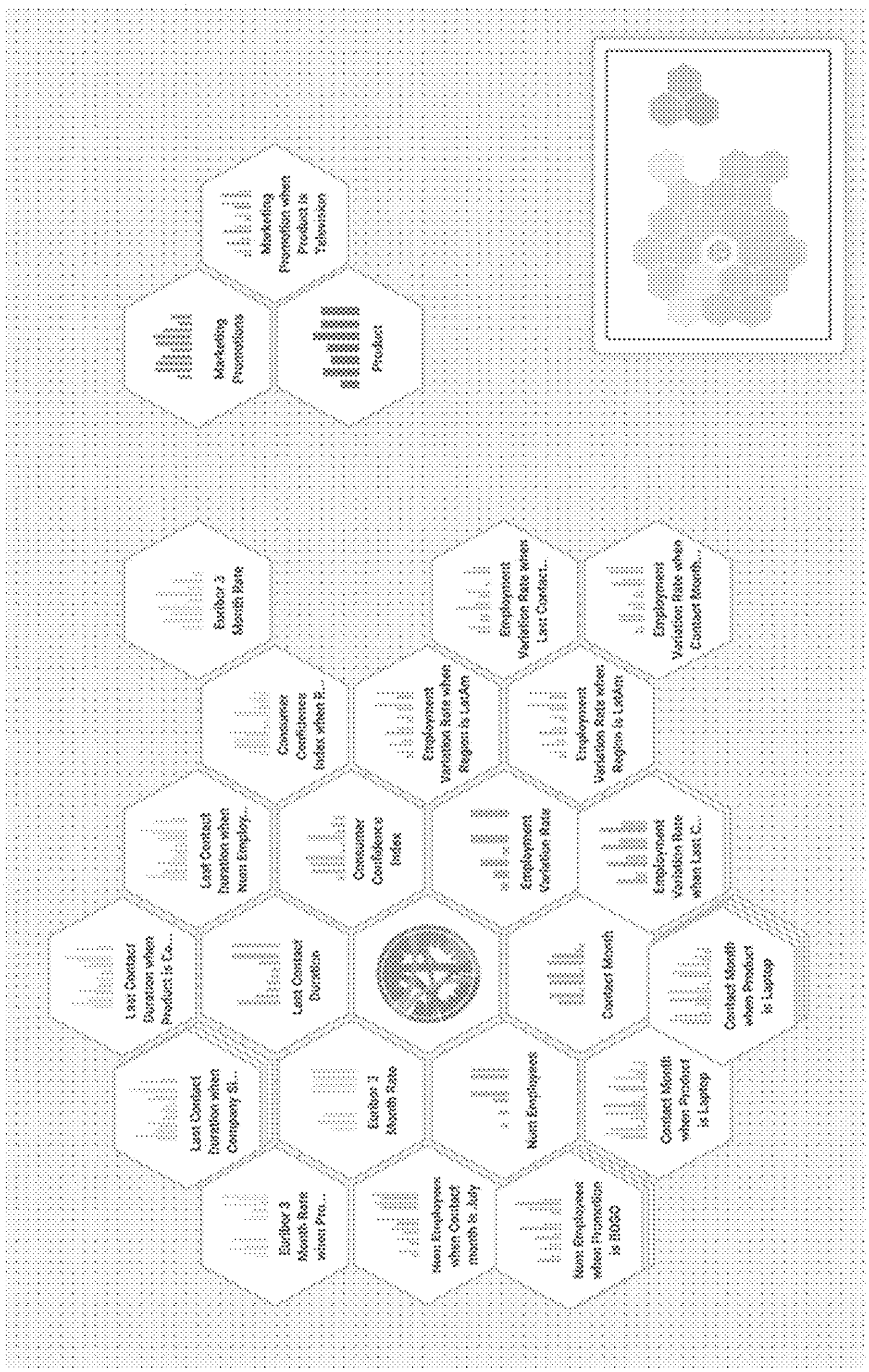
Figure 18:
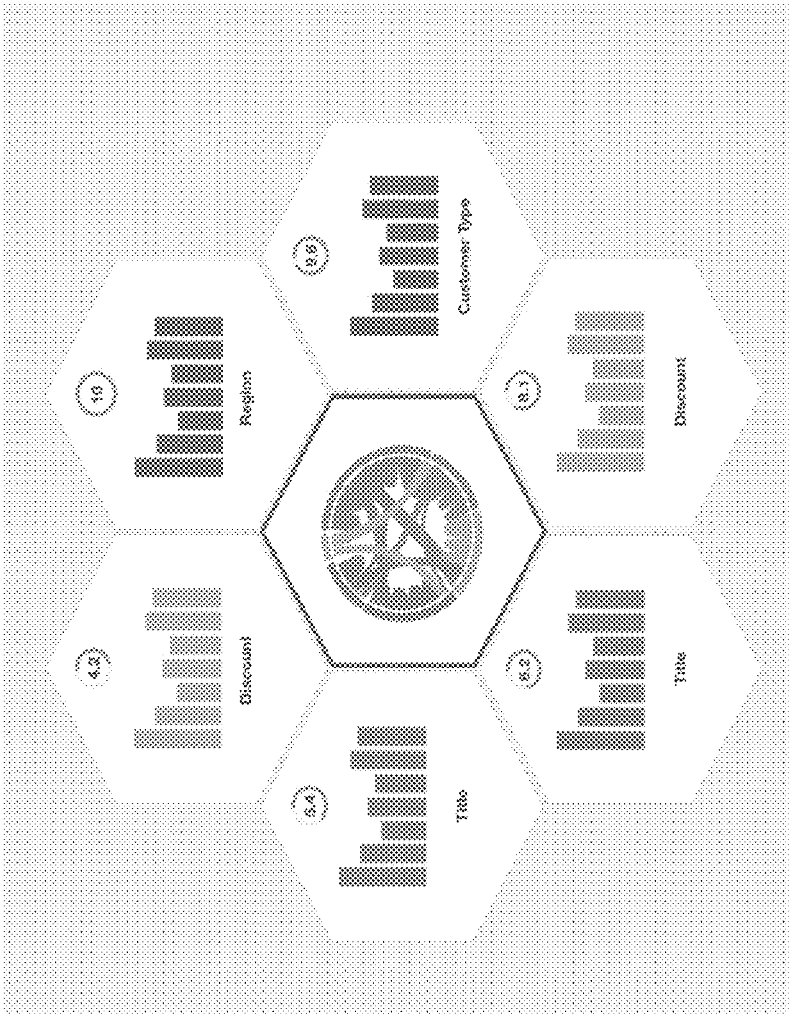
Figure 19:
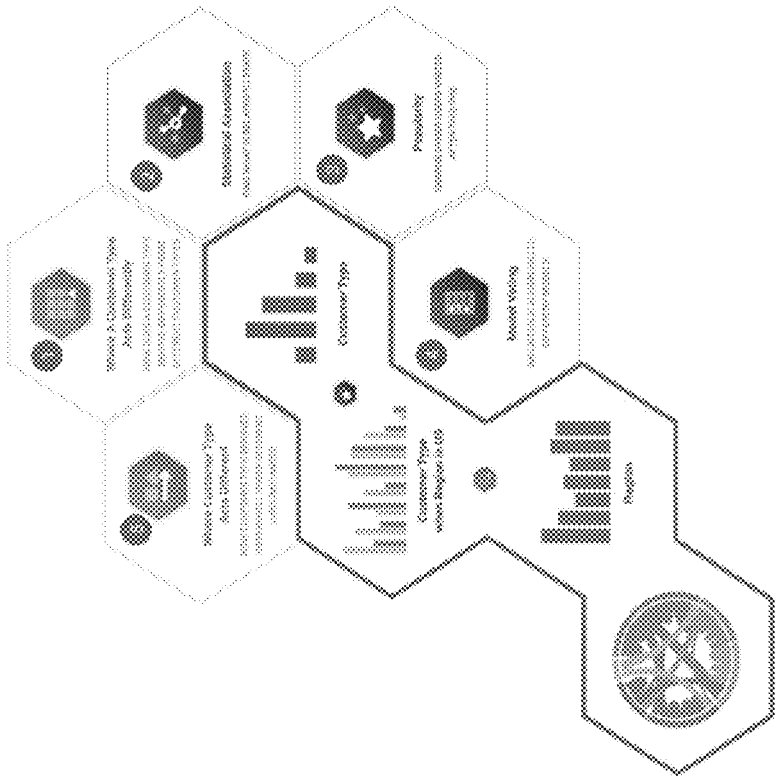

In some implementations, a user can add graphs to a data exploration analytical task, which can be illustrated, for example by a number (FIG. 16) or by showing stacked nodes (FIG. 17). Nodes that are adjacent can correspond to related subjects whereas non-adjacent nodes can correspond to a different subject. Additional data exploration views are illustrated at FIGS. 18 and 19.

As noted above, the direction that nodes are presented as a user is performing the analytical task can relate to actions the system recommends and they can be presented in an order of priority of recommendation. For example, the most recommended next action can always be provided at the upper right edge of a node (e.g., the "1 o'clock" position), and subsequent recommendations can be displayed in clockwise direction. Thus, a user reviewing an already performed analytical task can quickly infer from the structure of the displayed node graph whether the recommendations were followed. Thus if a node graph shows nodes extending generally in the upper-right direction from the initial node (for example as shown in FIG. 8), then it can be inferred that the user generally performed the most recommended actions. Similarly, node graphs that show nodes extending generally in the left direction from the initial node can indicate that the user did not follow the actions recommended by the system.

Further, the order in which the user performed the steps of the analytical task, or collection of analytical tasks, can be reflected by the shape of the node graph. For example, starting at an initial node, the next performed action can be represented by an adjacent node. Thus the node graph visualization can provide a quick and intuitive display for understanding not just what actions a user has performed but in what order.

These different above-described views can communicate several types of additional valuable information. For example, colors in data exploration view can show which variables the user or automated analysis focused on (e.g., each color or numbered hexagon showing how many charts focused on each variable were added to the overall analysis); grouping or insights be conveyed, for example, in FIG. 19, a core analysis was conducted spanning various variables and then a separate set of four graphs focused on two variables; whether a chart added to the exploration was recommended by the system or added manually by the user; whether the user follow system recommendations or not; and the like.

Zooming within a View for Additional Details

Figure 20:
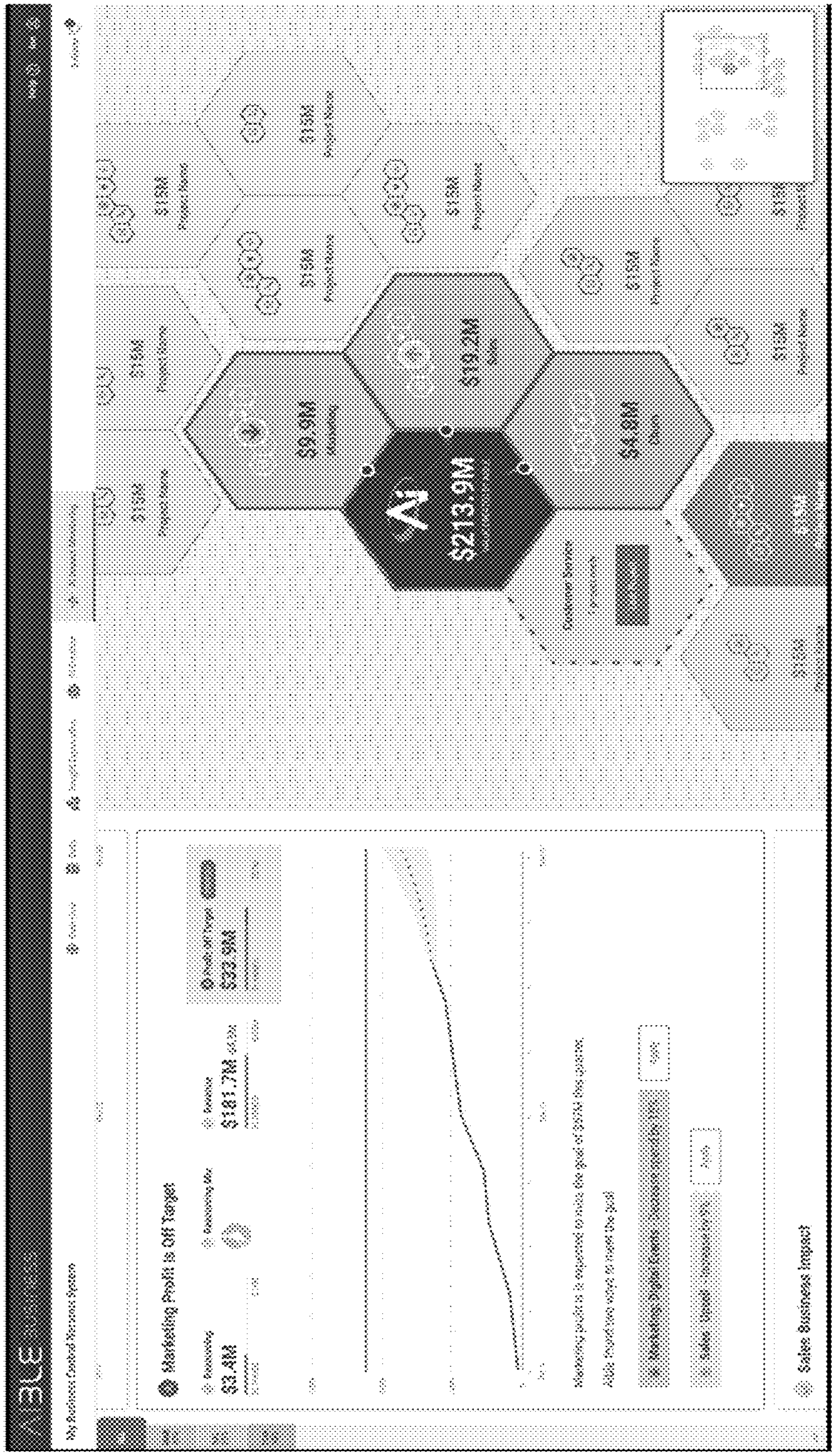
FIG. 20 illustrates an example interface where a user has selected a node and "zoomed" into the node to explore more information about the analytical activity that the node represents.
Figure 21:
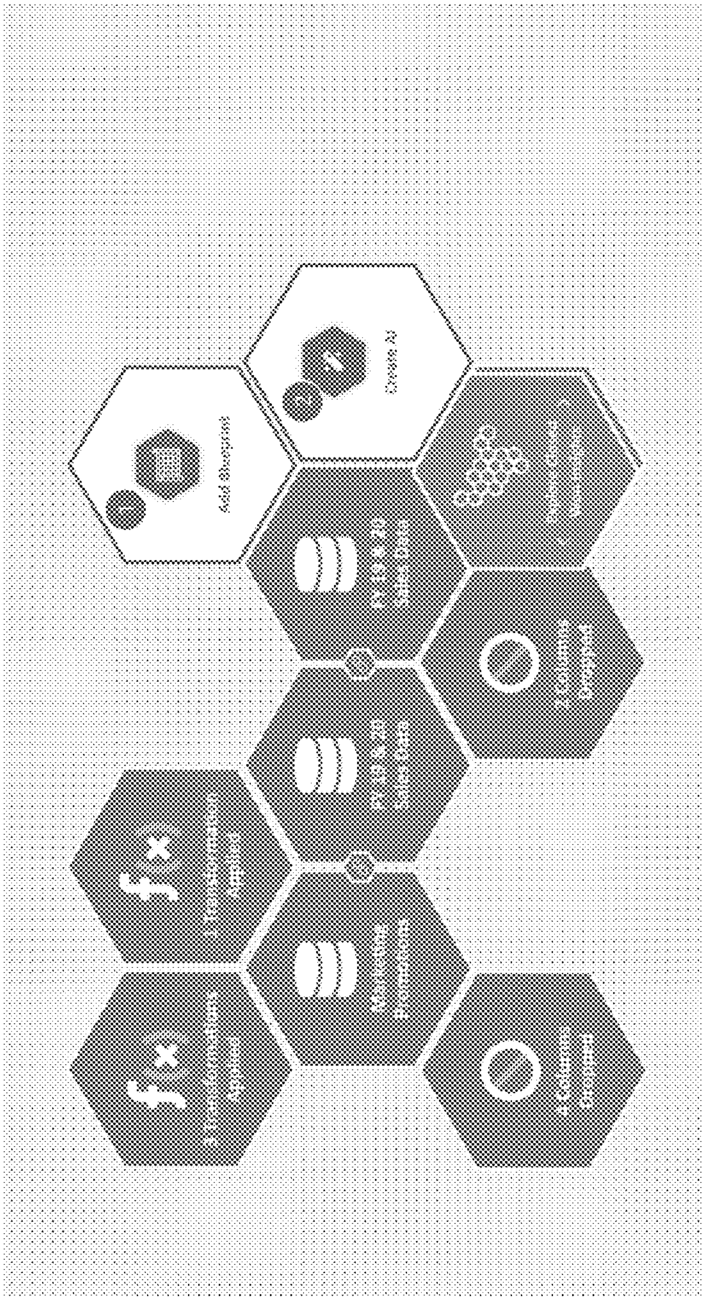
FIGS. 21-26 illustrates a zoom into a data transformation and preparation view, a predictive model development view, and a data exploration view.
Figure 22:
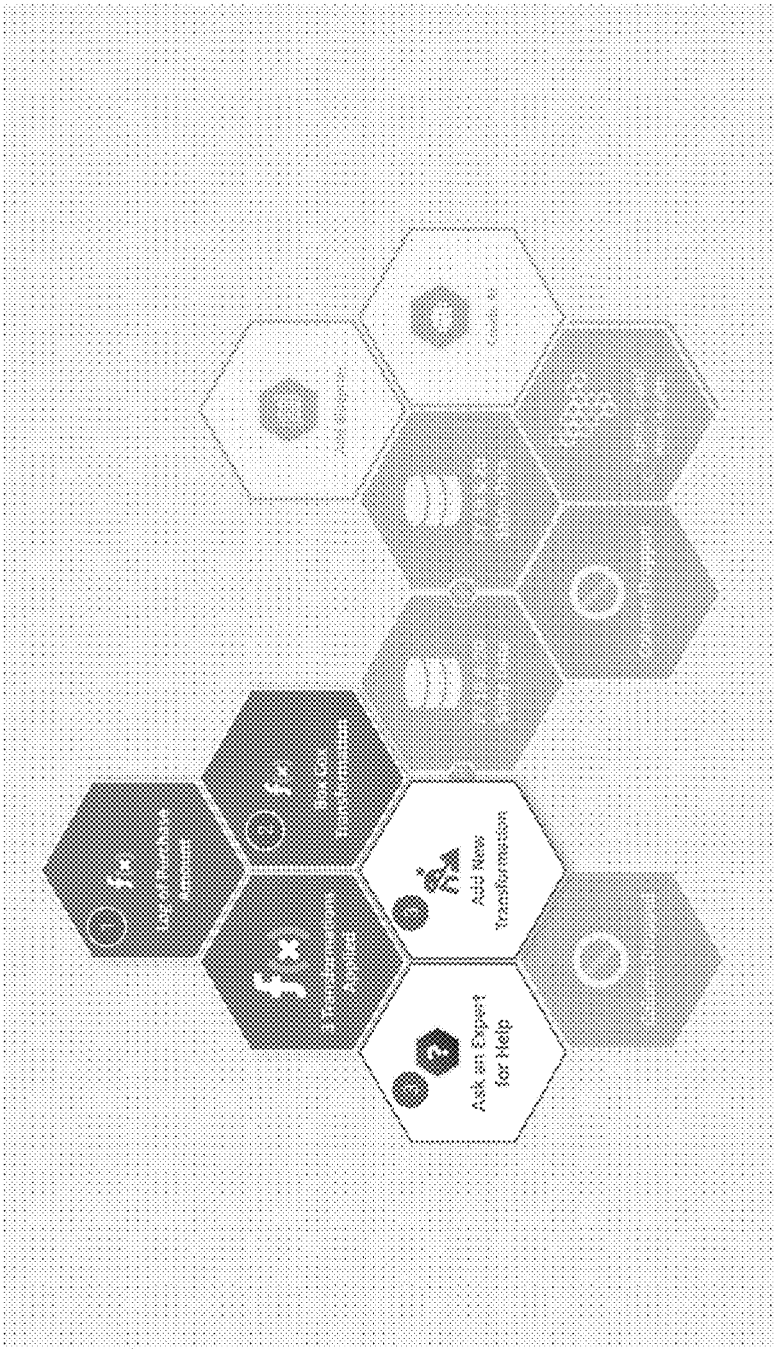
Figure 23:
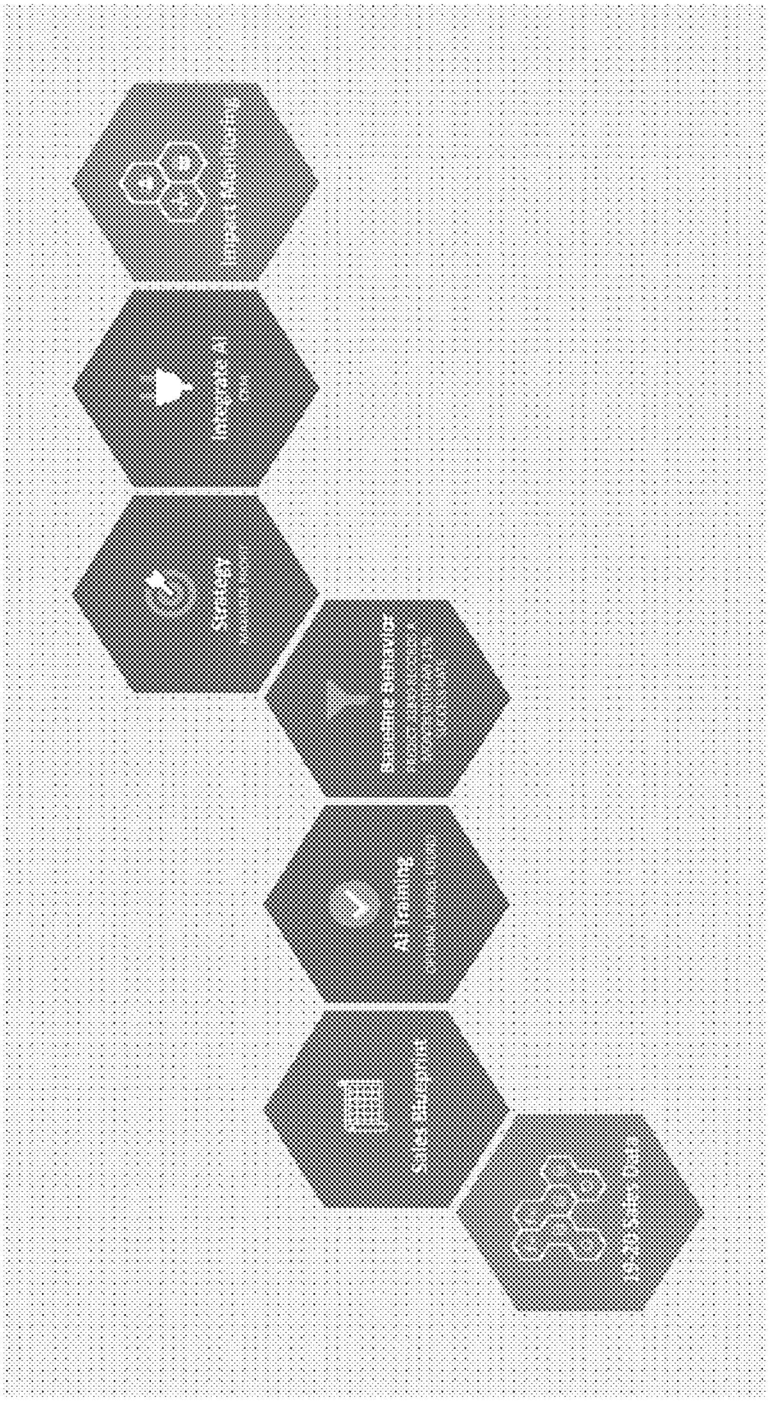
Figure 24:
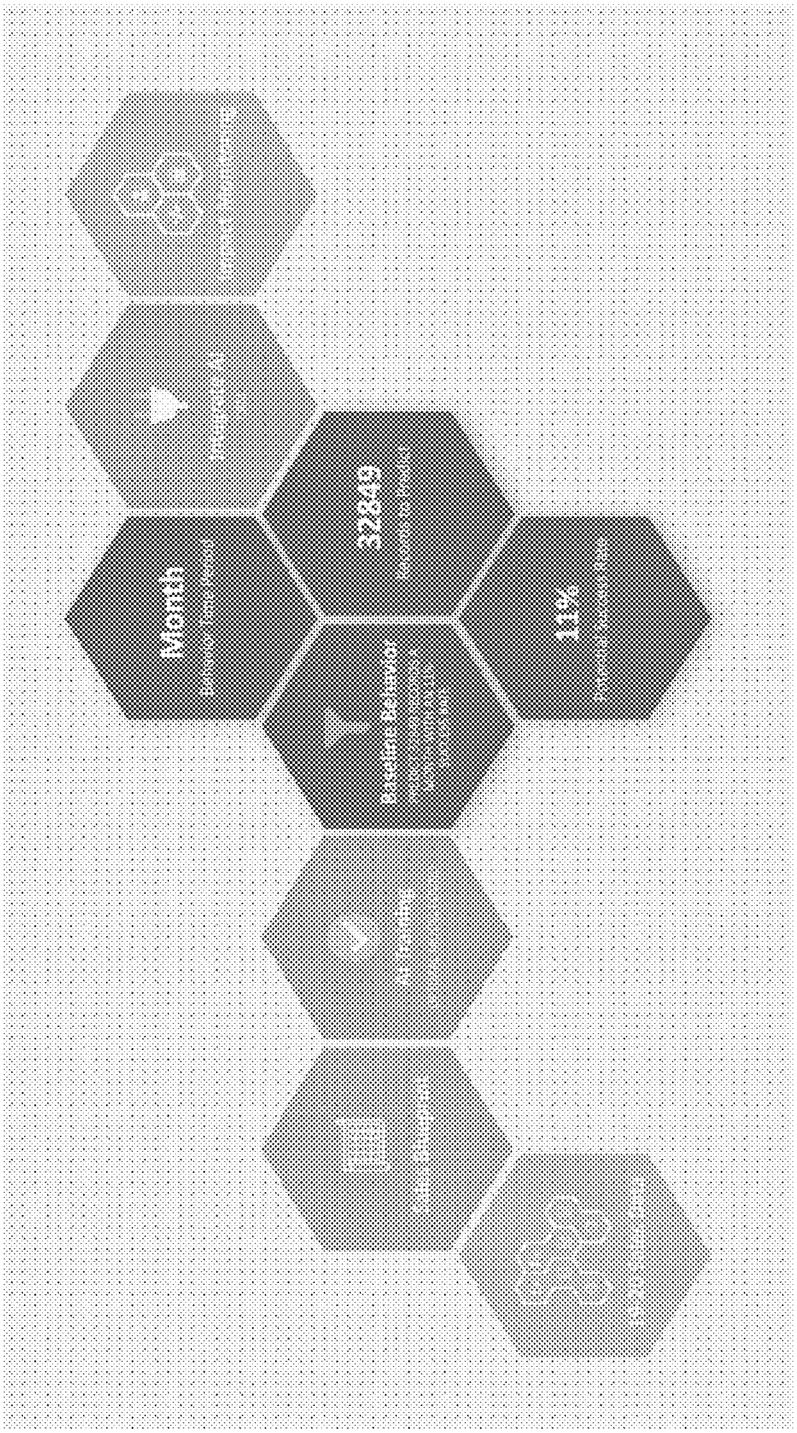
Figure 25:
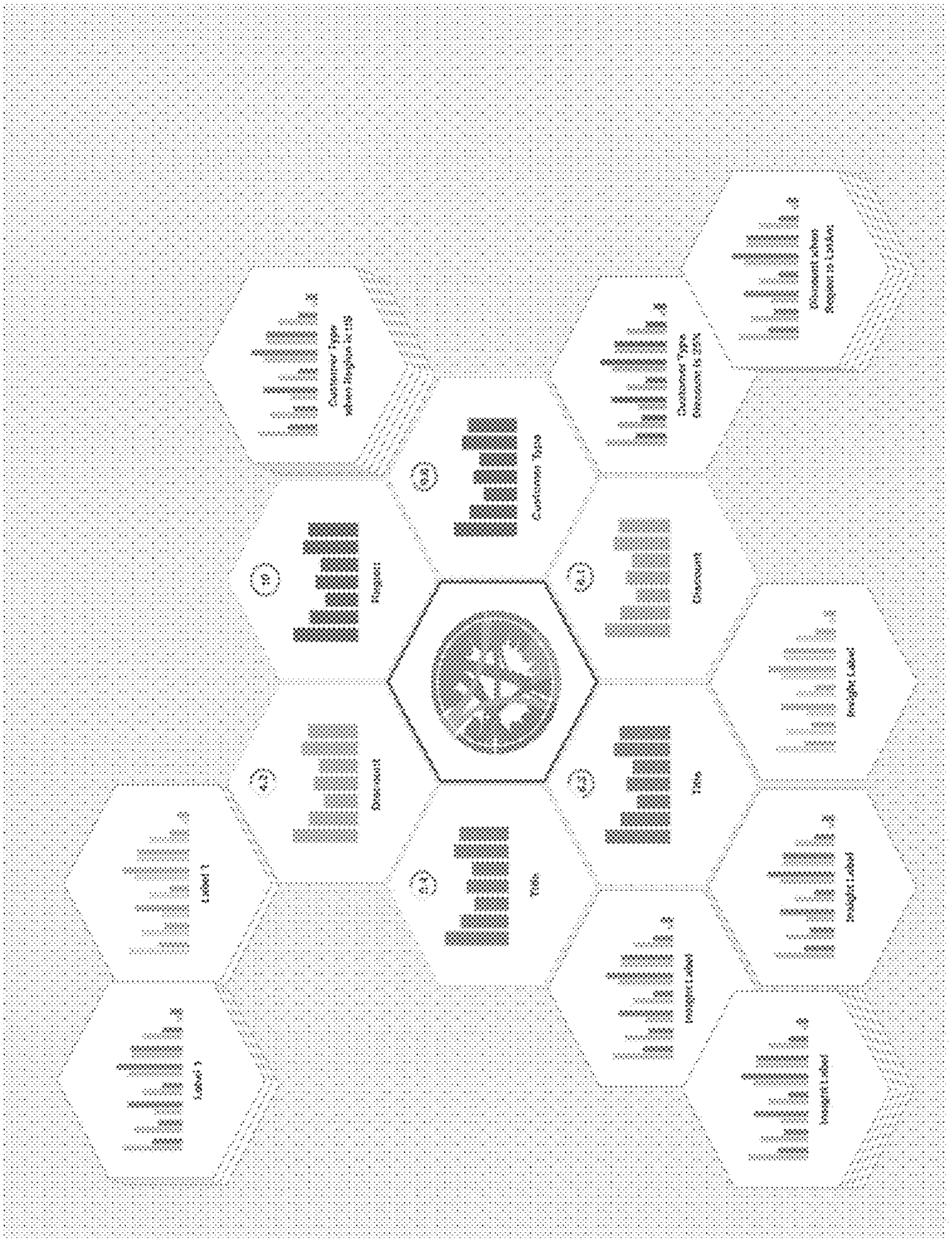
Figure 26:
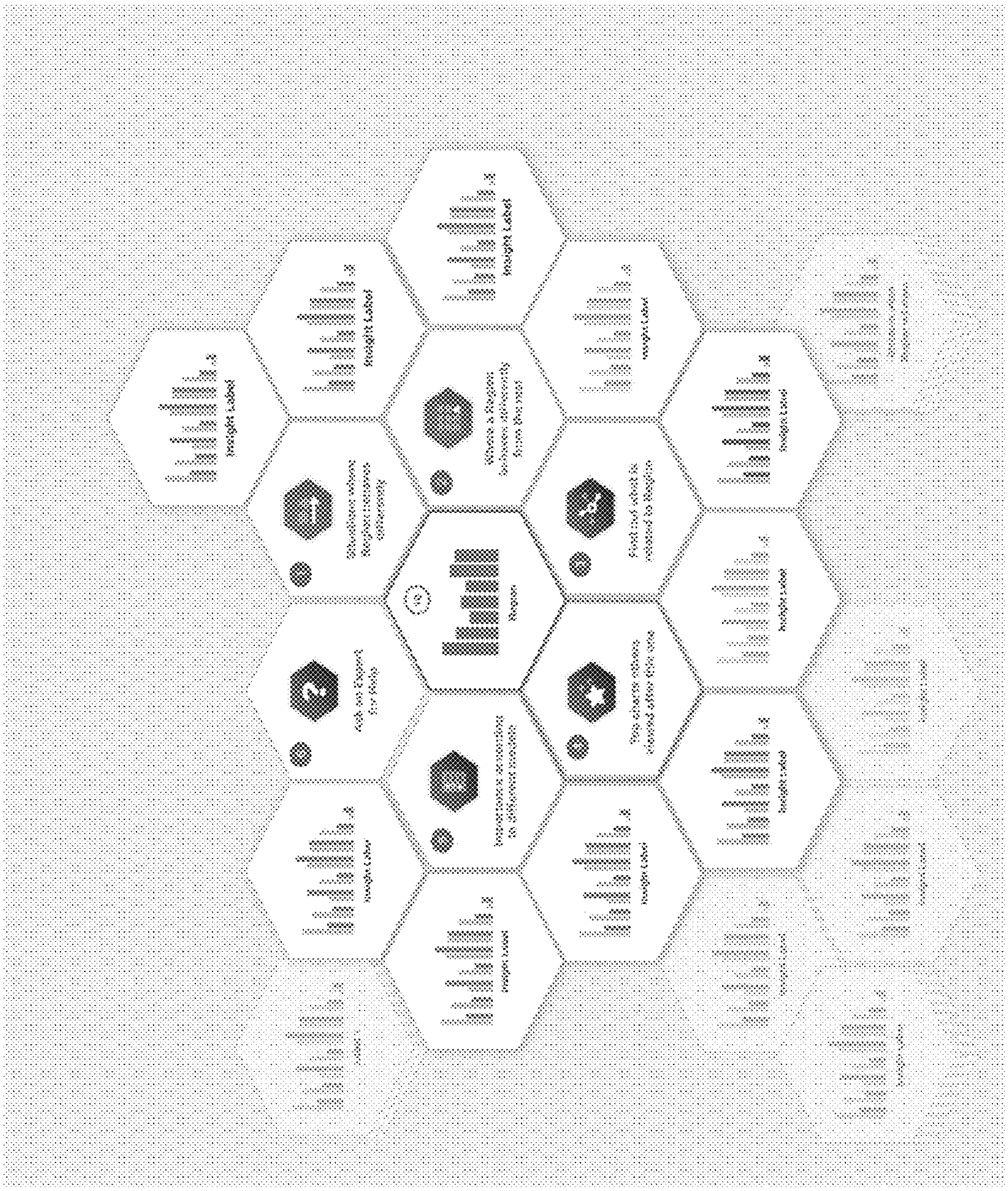
Figure 27:
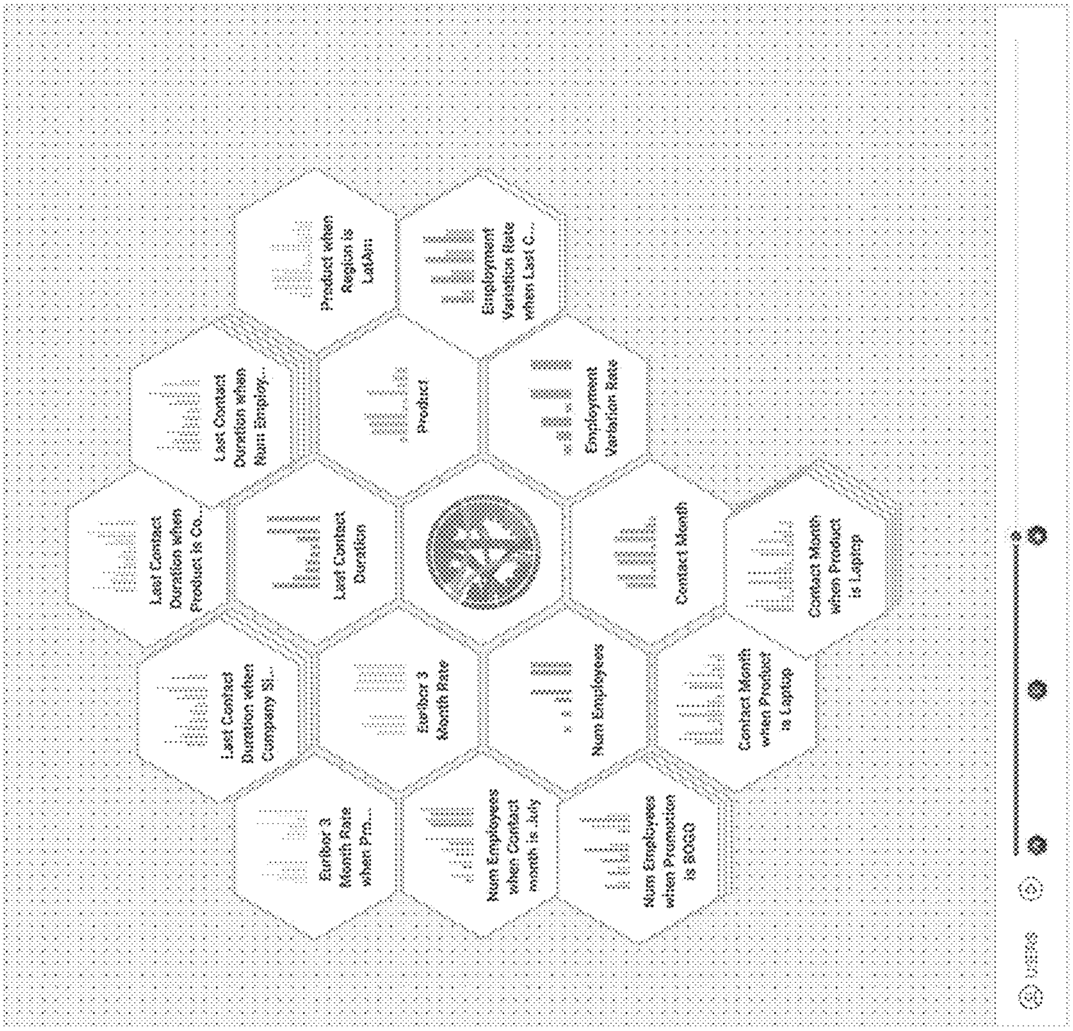
FIG. 27-31 illustrate example frames from a movie generated according to some aspects of the current subject matter whereby a user can view the steps that were performed in a given project or analytical task to enable improved traceability.
Figure 28:
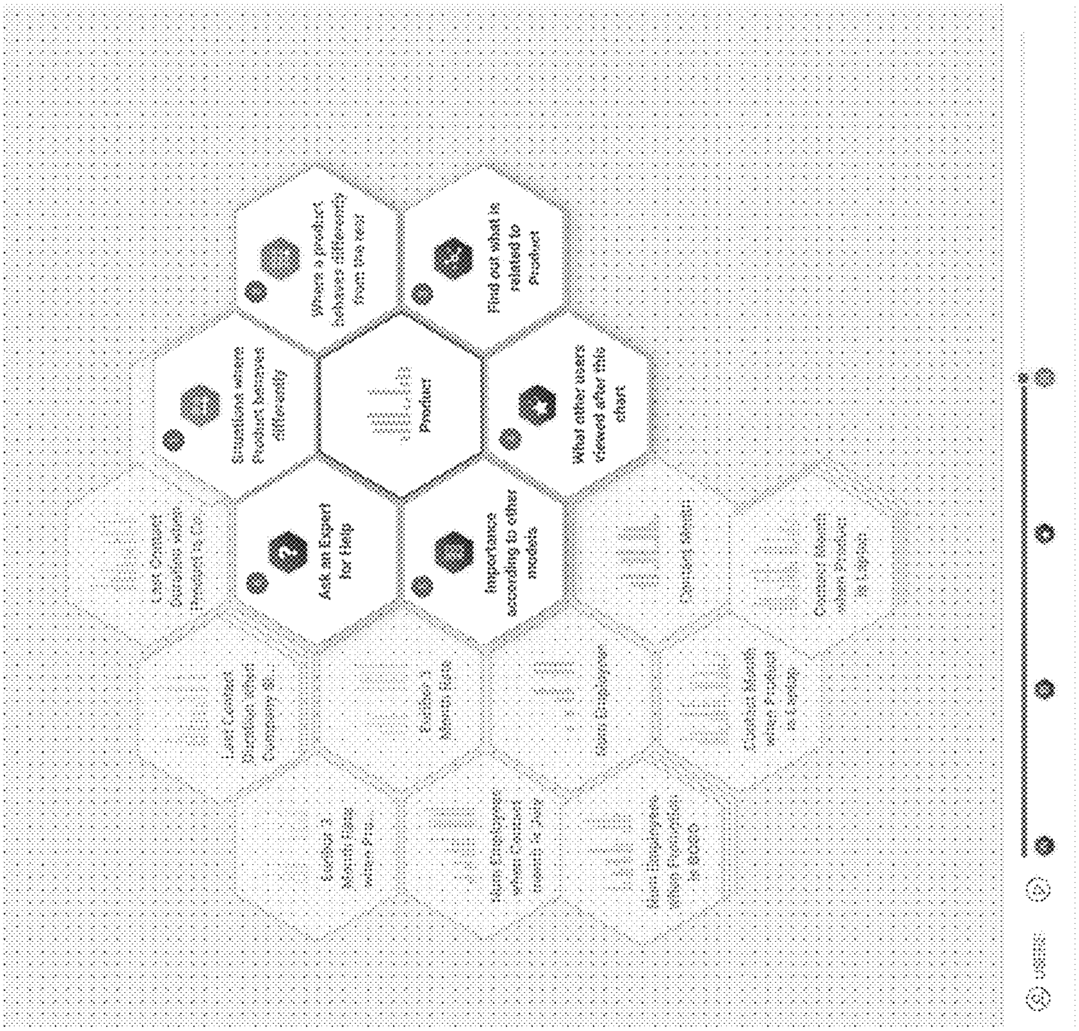
Figure 29:
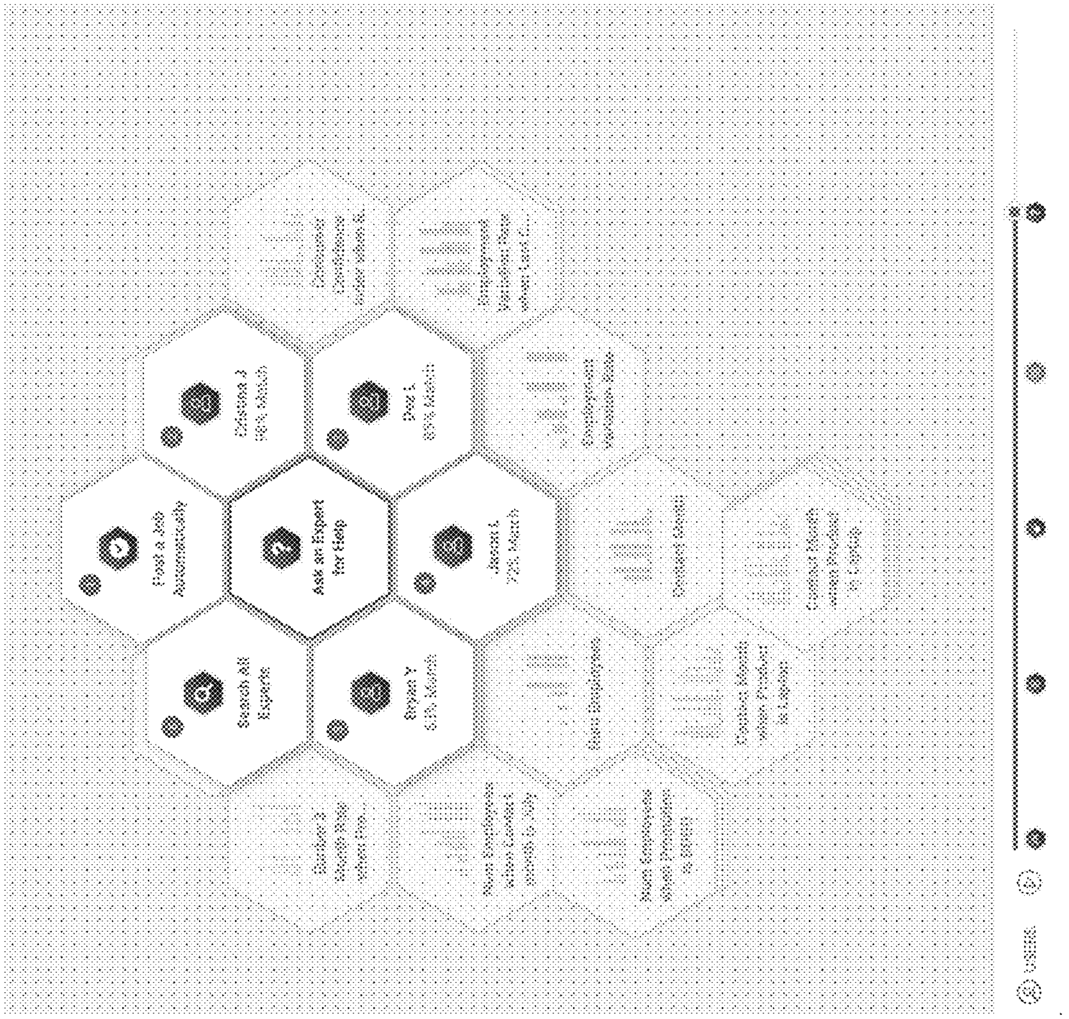
Figure 30:
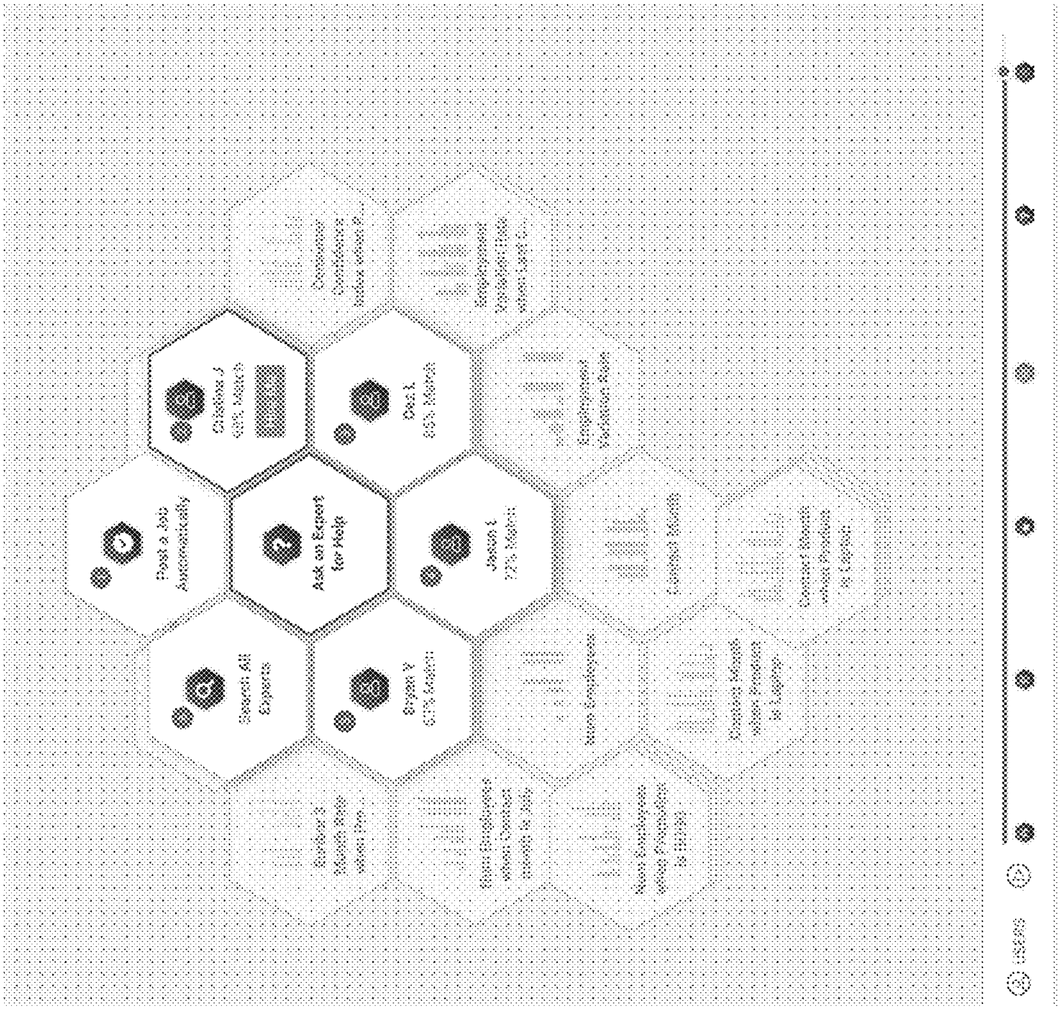
Figure 31:
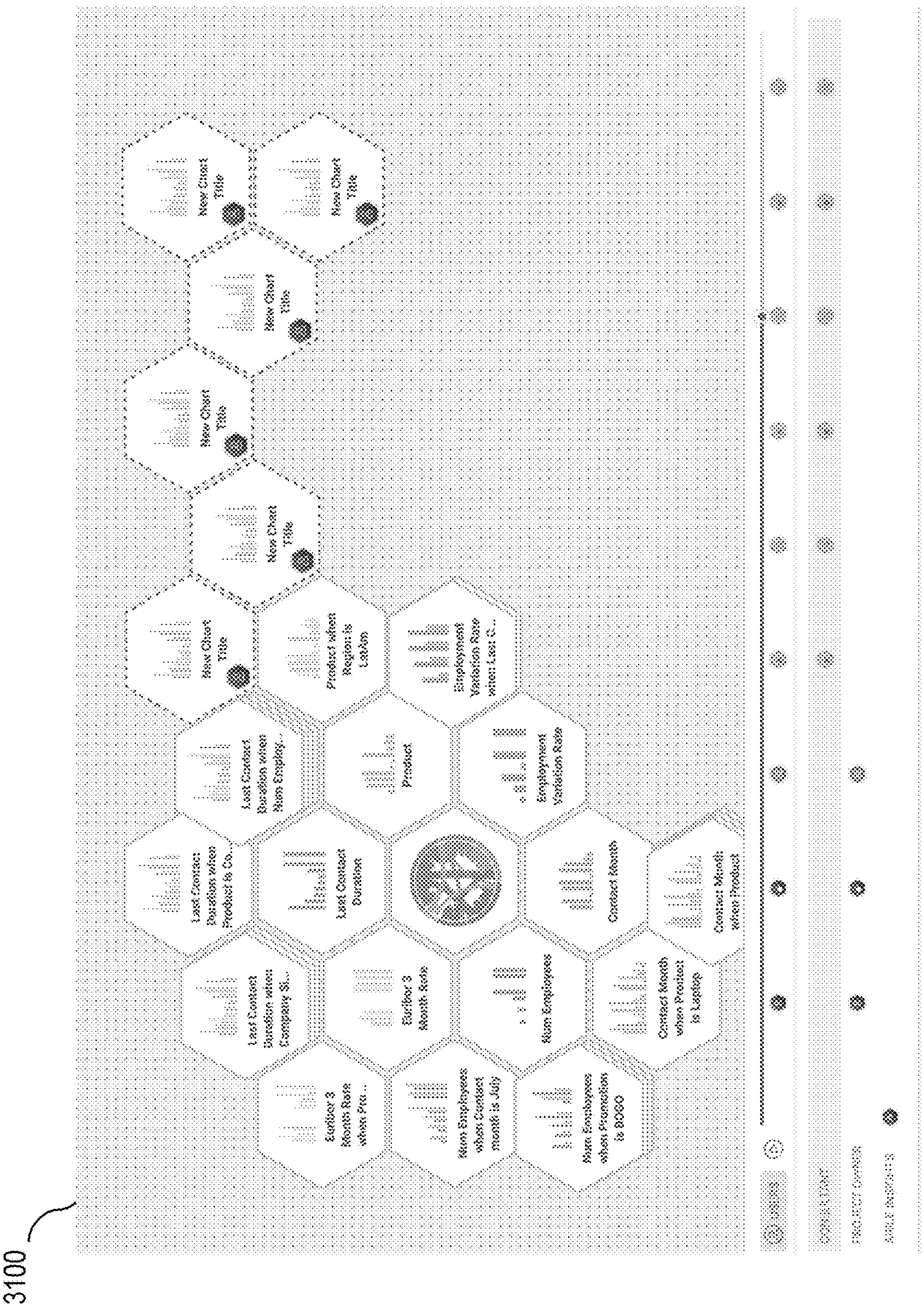

FIG. 20 illustrates an example interface where a user has selected a node and "zoomed" into the node to explore more information about the analytical activity that the node represents. As illustrated, a graph or other display space can be rendered enabling consumption of information in a variety of modes. The zoomed in view can take a number of forms, which can vary based on the view type. For example, FIG. 20 illustrates a zoom into a summary view, FIGS. 21-22 illustrates a zoom into a data transformation and preparation view, FIGS. 23-24 illustrate a zoom into a more detailed view of a predictive model development view, and FIG. 25-26 illustrate a zoom into a more detailed view of a data exploration view.

Collaboration Between Users and Tracking Changes to Analytical Tasks

Some implementations of the current subject matter can enable multiple users to collaborate on the same analytical tasks. Both the glanceable views and zoomed views can show how and when multiple users collaborated. Users can also easily hand off an analytical task to an expert and then take it back without losing the context of what the expert did. For example, in the midst of an exploration a business user may not know where to go next. They ask an expert to help. The expert looks at different parts of the analysis already conducted and then starts adding a few different charts that can be good starting points for additional exploration. They then hand the project back to the original user who can see exactly what the expert user has done via a 'movie-like playback' and can see the key charts the expert user tagged as good starting points for further collaboration. Either user can comment on any chart or any aspects of the analytical task.

FIG. 27-31 illustrate example frames from a movie generated according to some aspects of the current subject matter whereby a user can view the steps that were performed in a given project or analytical task to enable improved traceability. By enabling a "replay" of actions performed, collaboration between users can be improved. Moreover, such a reply can enable improved contextual understanding of a given analytical task, for example, if a user has not worked on a particular analytical task in some time. In some implementations, different lines at the bottom of the interface in FIG. 27-31 can relate to actions taken by different users.

In some implementations, the model development and deployment platform can regularly provide recommendations to the user regarding what actions to take next or how to complete a given action. Many recommendation provision systems (e.g., recommendation engines) are driven off of a knowledge graph based on data. In some implementations, the system can also utilize a human interaction graph. The human interaction graph can be a knowledge representation based on behavior of users with the system. For example, the system can learn that a particular graph or analysis is performed within a certain analytical task, and the system can learn the user's behavior and consider that human interaction graph for preparing the recommendations. The human interaction graph can be determined as a variety of granular populations. For example, the human interaction graph can be created from the collective action of all users of the system, all users within a business, all users within a team of the business, or based on the actions of the individual. In this manner, the system can automatically develop domain specific knowledge regarding best practices based on monitoring user behavior and utilizing the user behavior to affect the recommendations that the system provides. In some implementations, the user behavior including historical analytical tasks performed by a user can be saved off as a blueprint for future projects and/or analytical tasks.

Audits and Traceability

Some implementations of the current subject matter can enable user friendly traceability and auditability for analytical activities such as data preparation, data exploration, predictive model building, and the like. As noted above, analytical activities can be complex and full audit or traceability logs of such activities can be difficult to navigate. As such, it is often the case that such logs are only used by experts in extraordinary circumstances like evidence in a lawsuit. However, traceability and auditability can provide an answer to the 'how' behind the analyses, charts, datasets that users create—how exactly was this dataset created, or how exactly did an analyst arrive at this conclusion—not just what they added to a report, but also what they explored but didn't add to the report. Some implementations of the current subject matter can make auditability and traceability easy for end users, which can generate greater trust in analytical output. Moreover, easy auditability and traceability can enable users to effectively collaborate with each other because they can quickly get a sense of what each person has done and what tasks remain undone. And even when a single user approaches the same analytical task after a period of time, they often forget what they had done to arrive at the output of the analysis task. Being able to quickly review how they got to that point when they had previously worked on the task, helps them quickly regain the context so that they can continue or adjust the original analytical task.

In some implementations, all of the tasks conducted by users are tracked and shown on a timeline. Users can play back the movie of the analytical task and see exactly what was done, what was considered but not acted upon, what recommendations were followed and not followed, as well as the next recommended steps to take in the exploration. Glanceable visualization helps them see what was done at a high level and they can quickly zoom in at any point in the playback to ascertain greater details.

Figure 32:
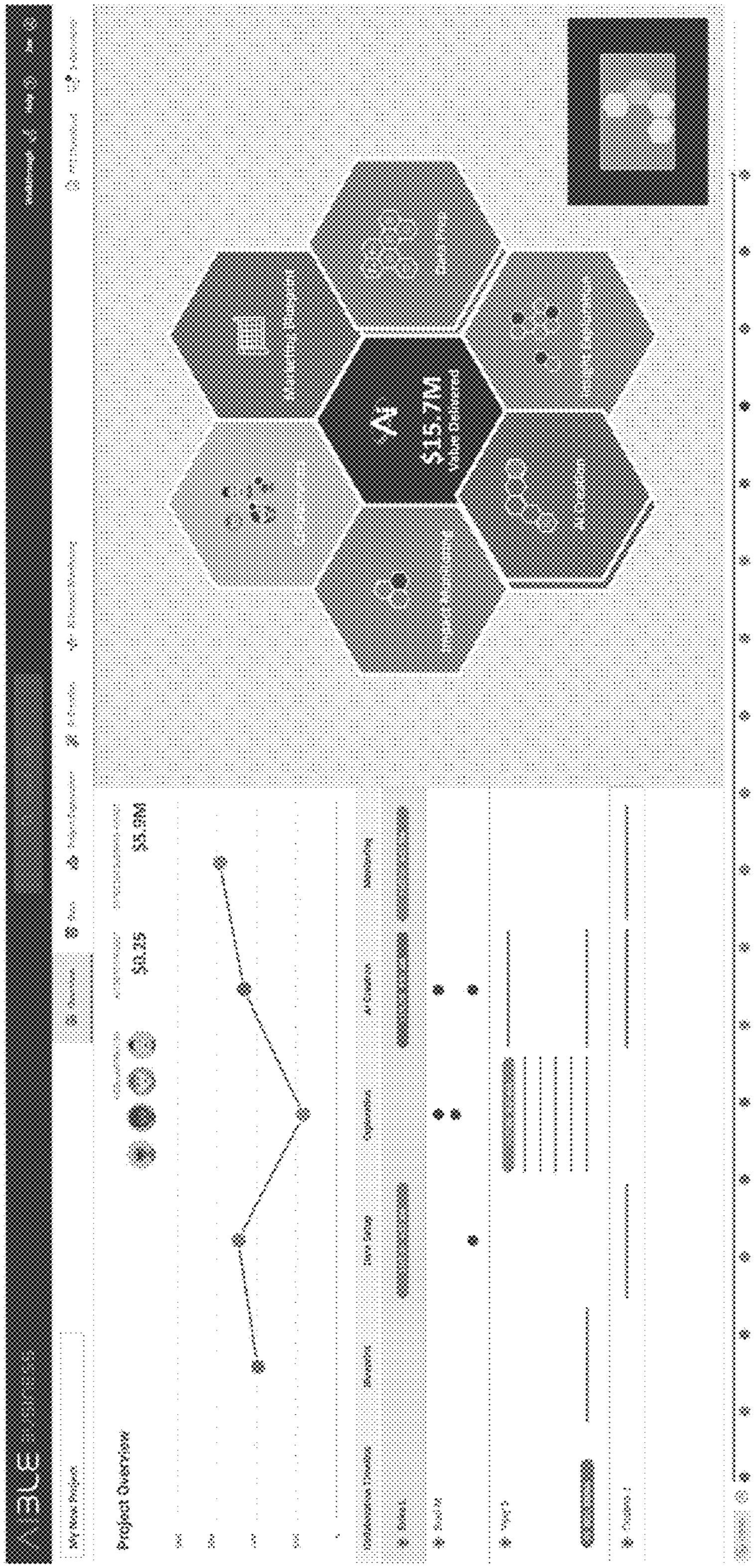
FIGS. 32-34, and 36-39 illustrate an example audit replay video showing actions taken by users that can be reviewed.
Figure 33:
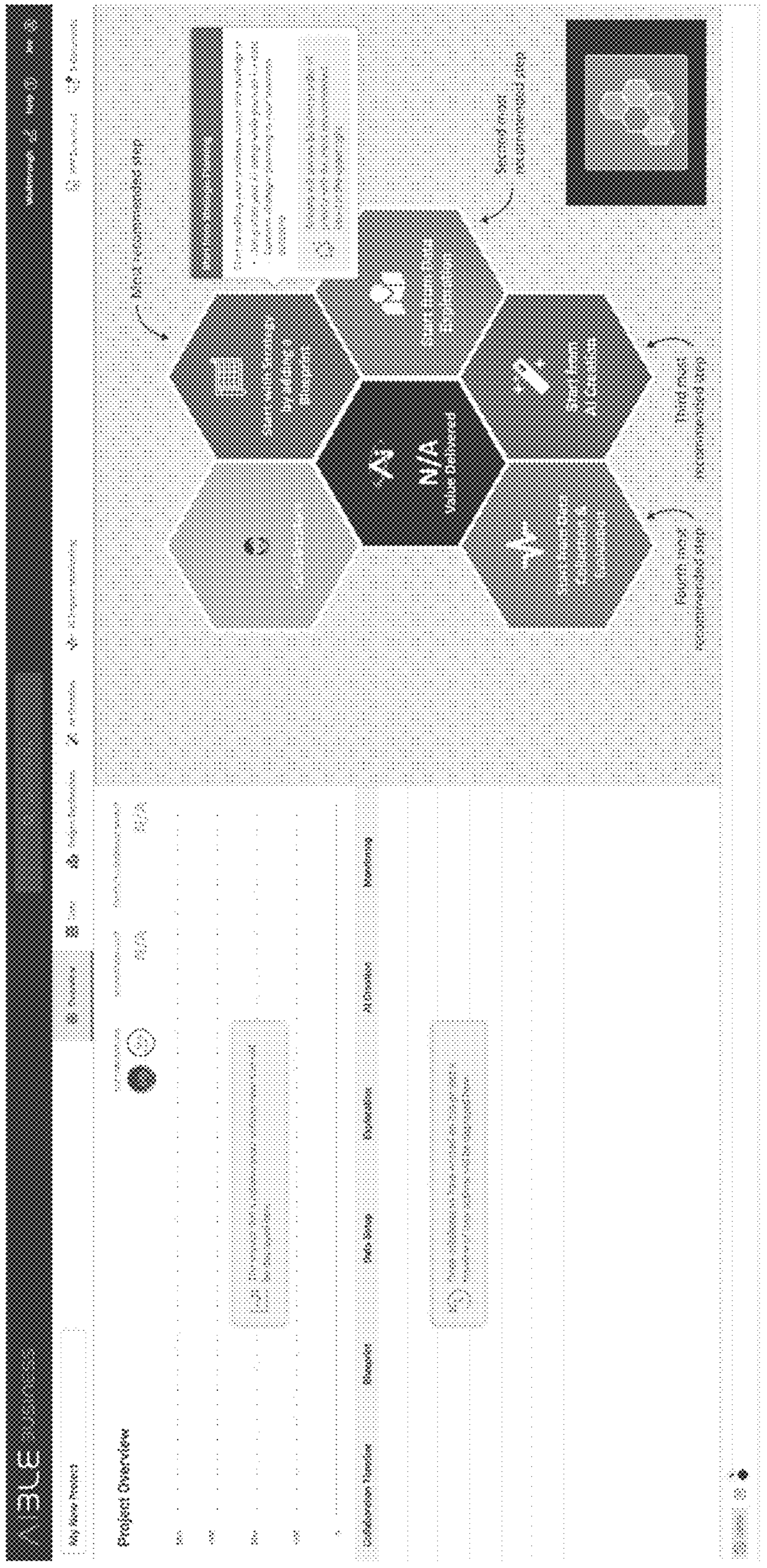
Figure 34:
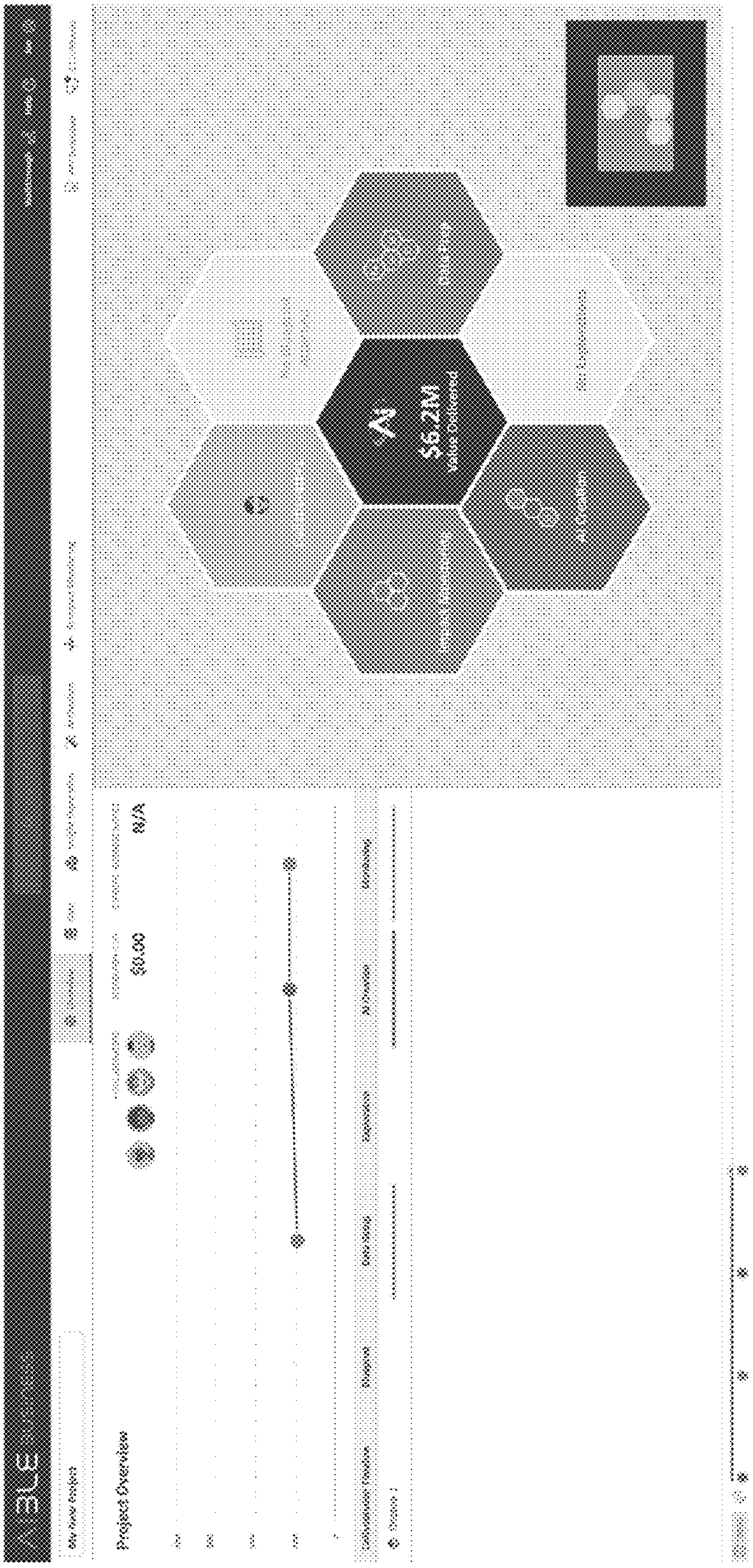
Figure 36:
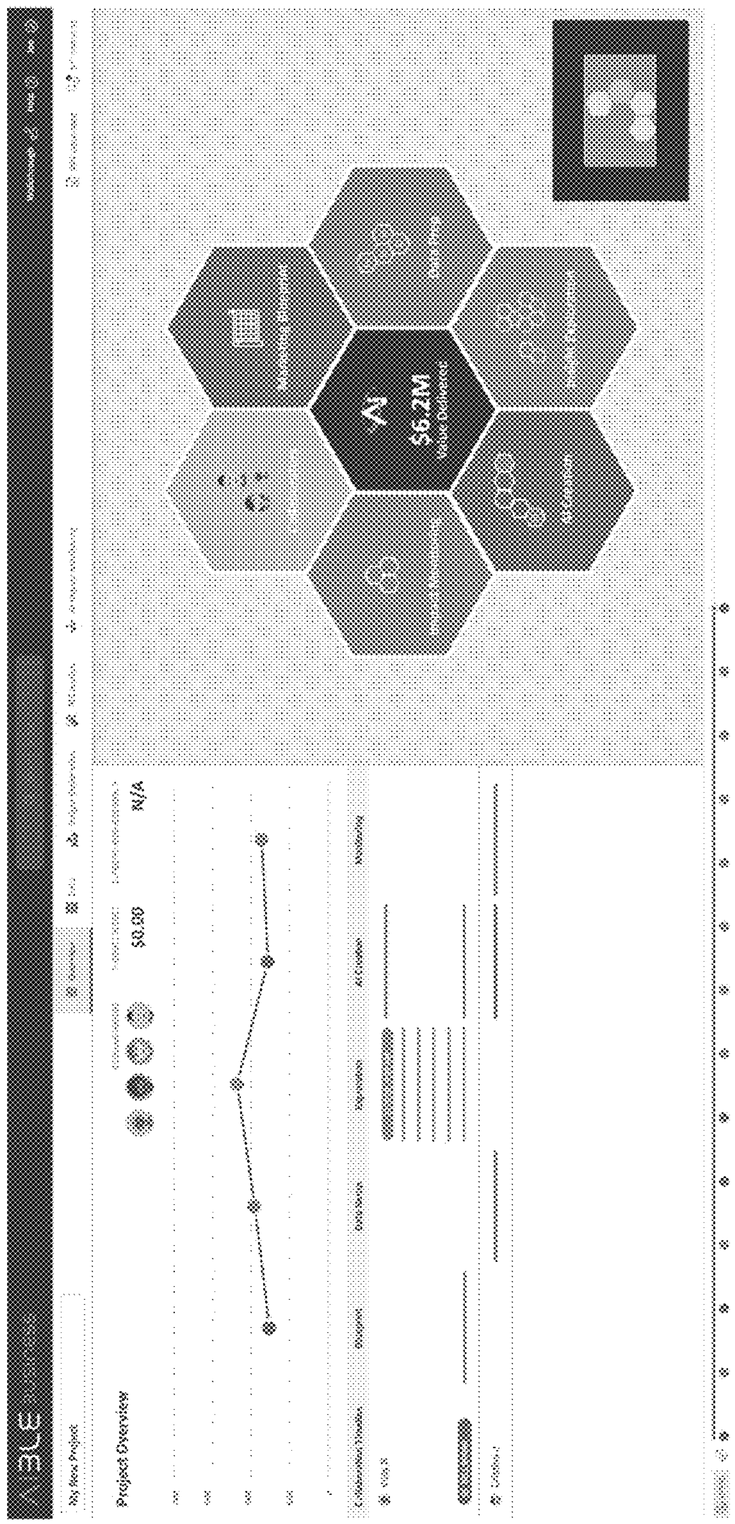
Figure 37:
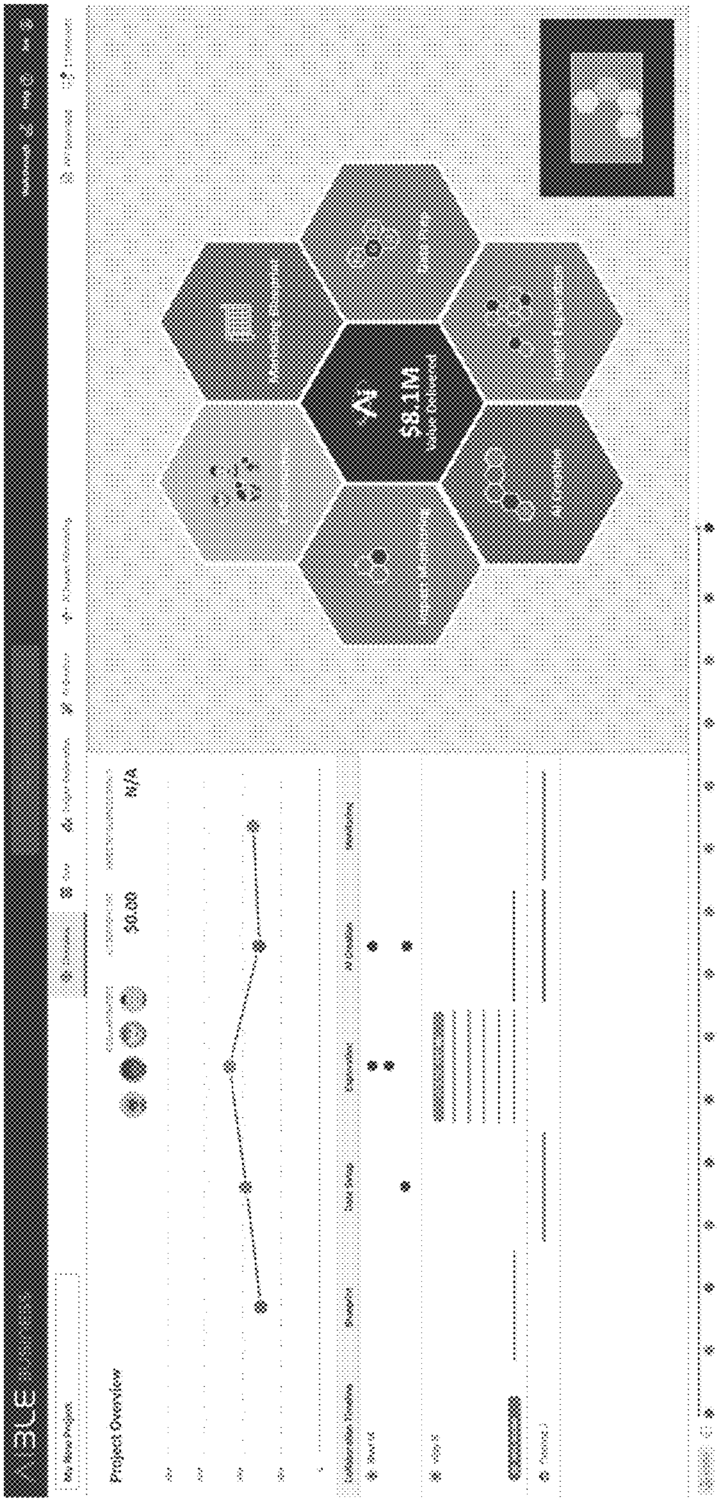
Figure 38:
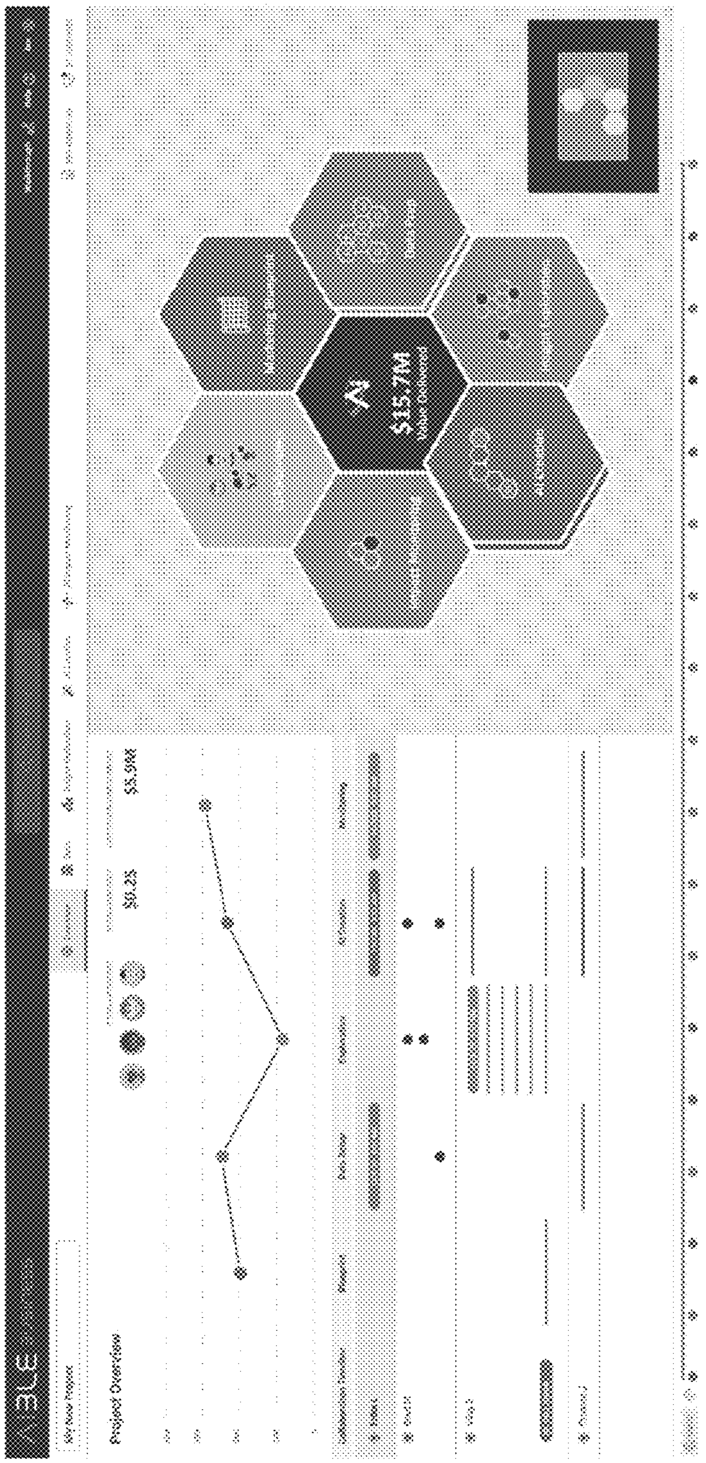
Figure 39:
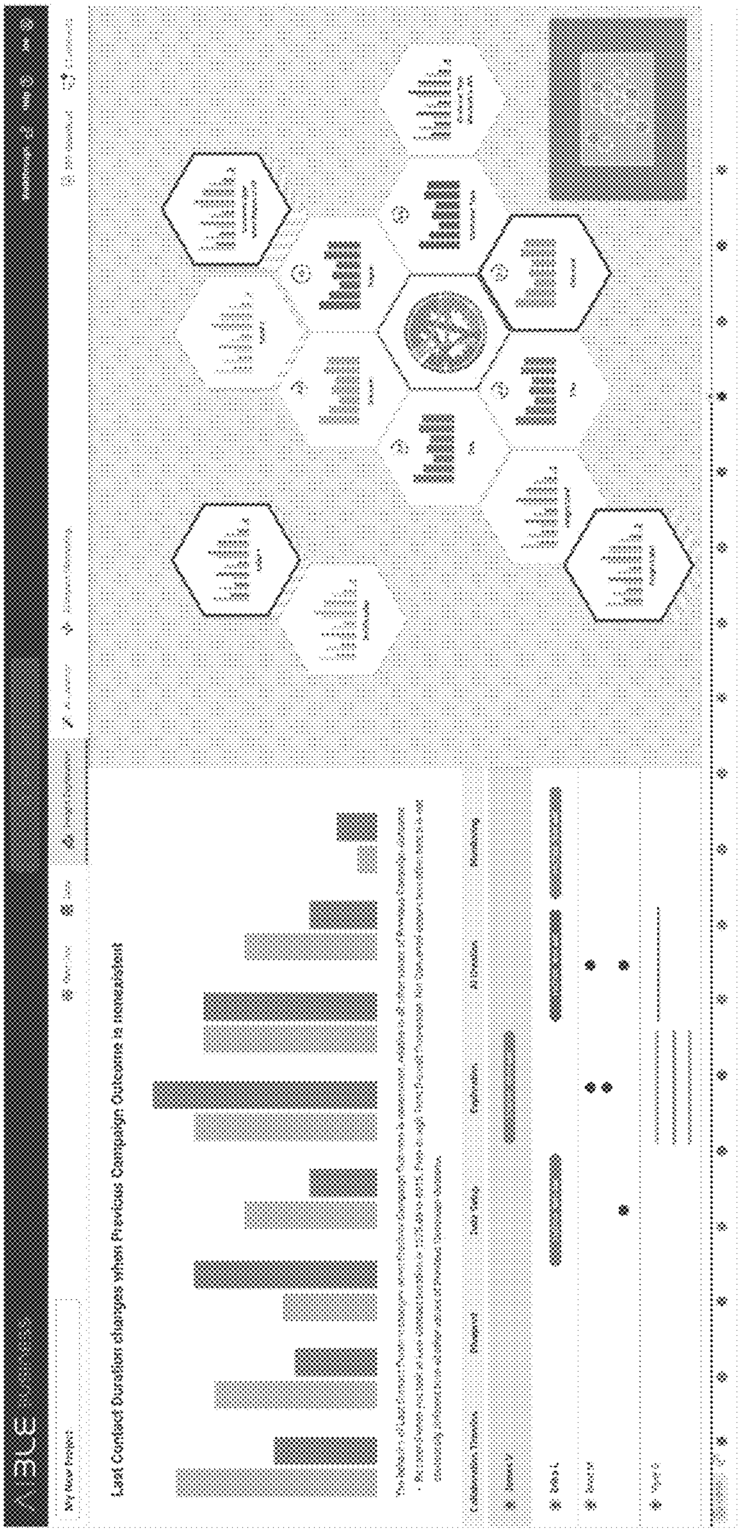

FIGS. 32-34, and 36-39 illustrate an example audit replay video showing actions taken by users that can be reviewed. FIG. 32 illustrates an overview and FIG. 33 illustrates an example project creation start. Hexes show guidance on where to start, but timeline is empty since no actions have been taken. FIG. 34 illustrates that the first user actions are logged. In the figure, hexes show that data is added, artificial intelligence (AI) is created and deployed. The center hex summarizes the impact of the project. Users can review actions by replaying the timeline at the bottom left. FIG. 36 illustrates the interface after a user has added a blueprint and perform an insight exploration. FIG. 37 illustrates that next a new user does not make any changes but gives a lot of feedback (red or highlighted hexes can indicate that a comment is provided and associated with a given hex). FIG. 38 illustrates that another user updates the data, creates and deploys AI. As shown in FIG. 39, when the video is replayed, the content shifts to each section, replays edits (e.g., insight exploration in this example), and a list of the users making current updates is shown in the panel on the lower left.

Figure 35:
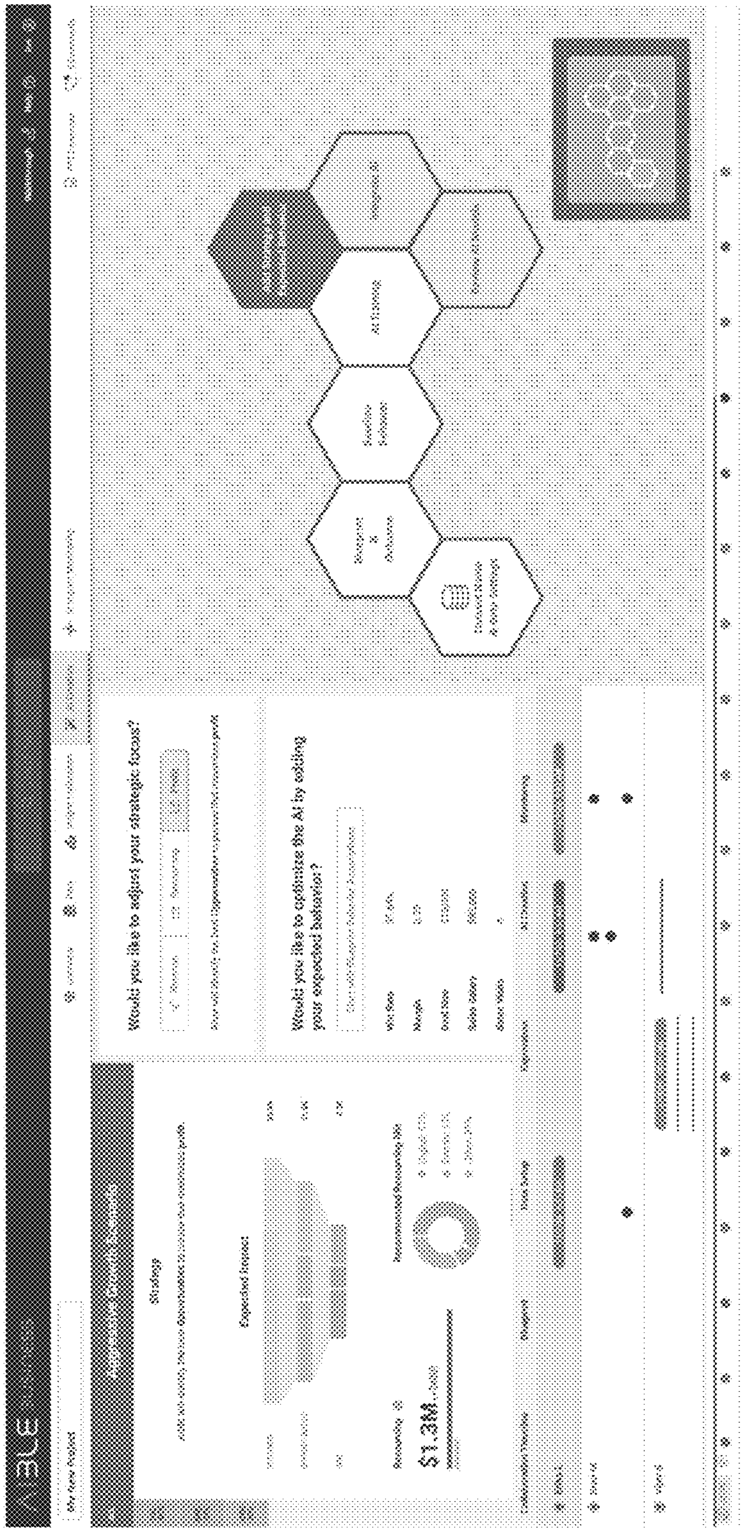
FIGS. 35 and 40-42 illustrate another example traceability feature according to some example implementations of the current subject matter.
Figure 40:
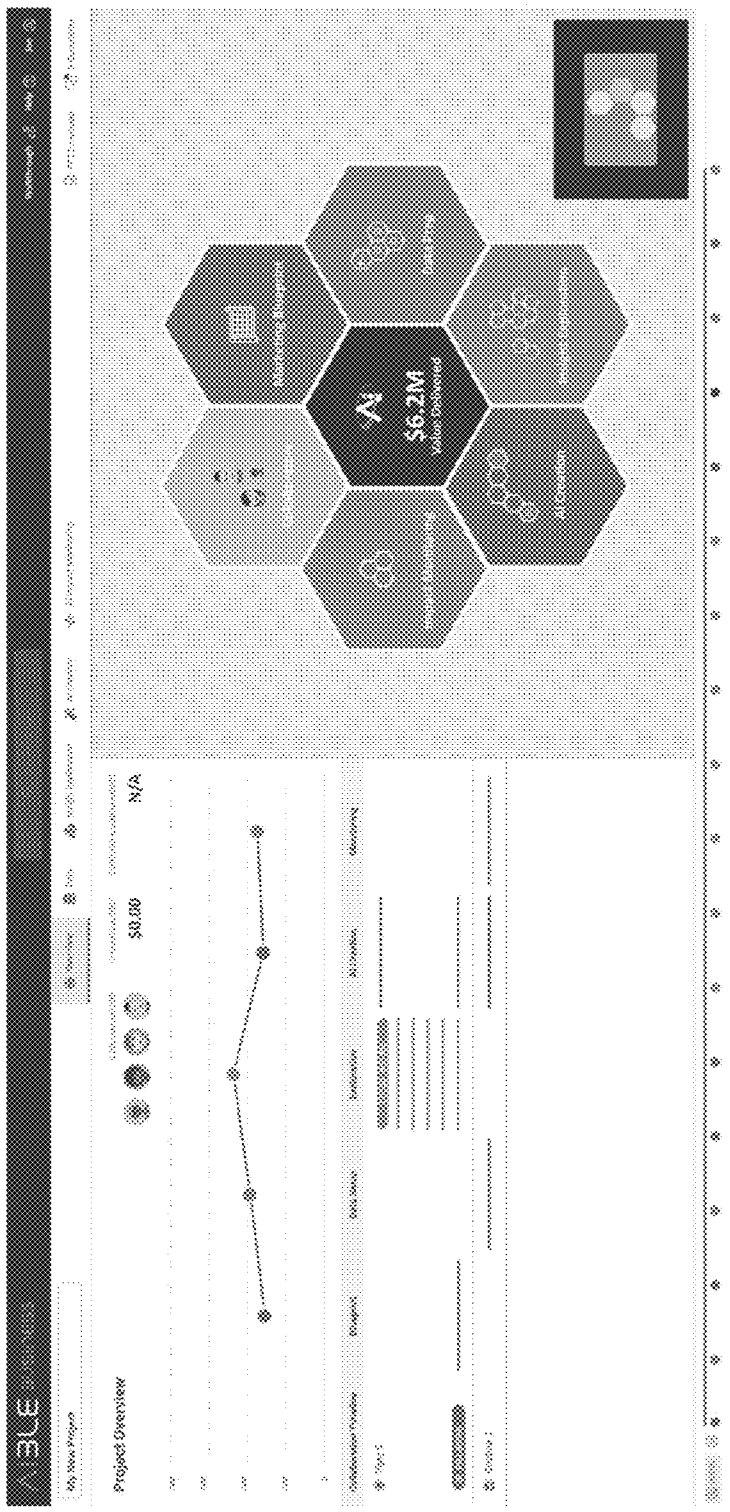
Figure 41:
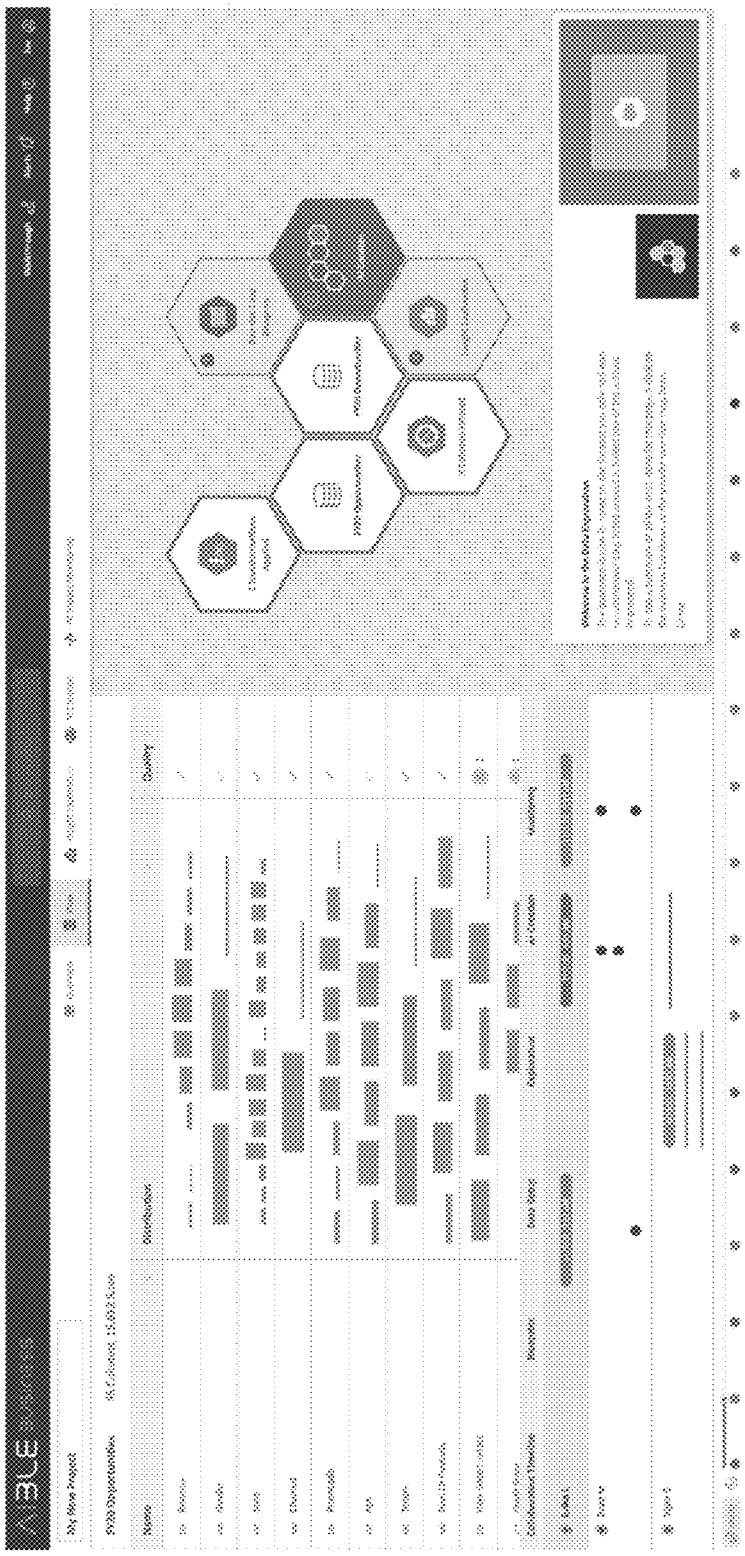
Figure 42:
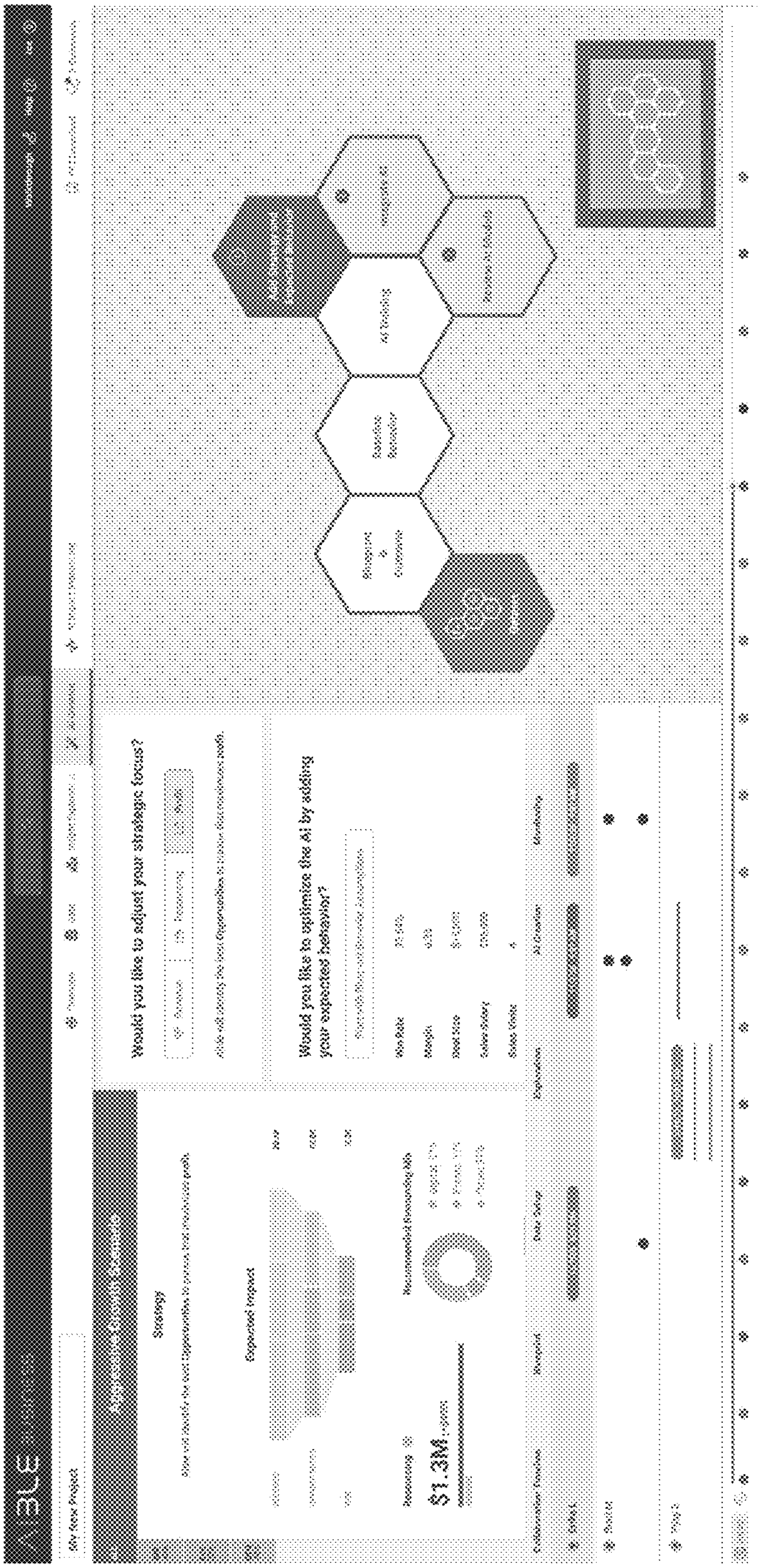

FIGS. 35 and 40-42 illustrate another example traceability feature according to some example implementations of the current subject matter. FIG. 40 illustrates an overview that shows all actions that have been taken in an AI project. FIG. 41 illustrates that the user clicks on the data (green) section and it focuses on those actions. FIG. 42 illustrates the user clicks on the AI creation (purple) section and traceability switches focus to that area. FIG. 35 illustrates what happens when a user clicks into the AI creation hex before clicking into the data prep hex. A user can take action to add a blueprint, explore data, and create two new AI updates. Actions impact is logged on the left.

Management Overview

Some implementations of the current subject matter can provide a management overview of the analytical activities of business users showing productive work done on analytical activities such as data preparation, data exploration, predictive model building while maintaining traceability and auditability and without giving users access to the raw data.

Figure 43:
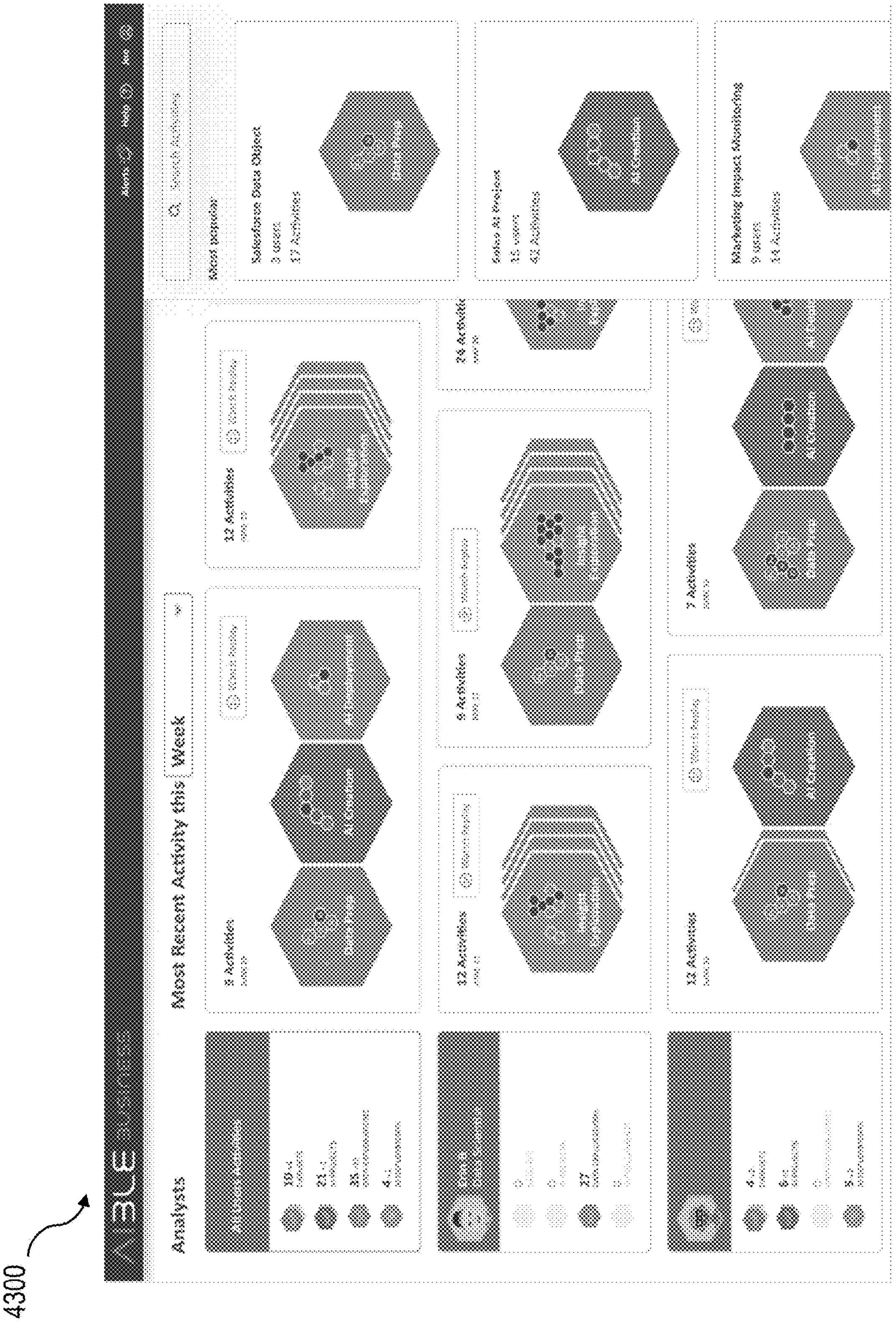
FIG. 43-44 illustrate example interfaces for a manager role.
Figure 44:
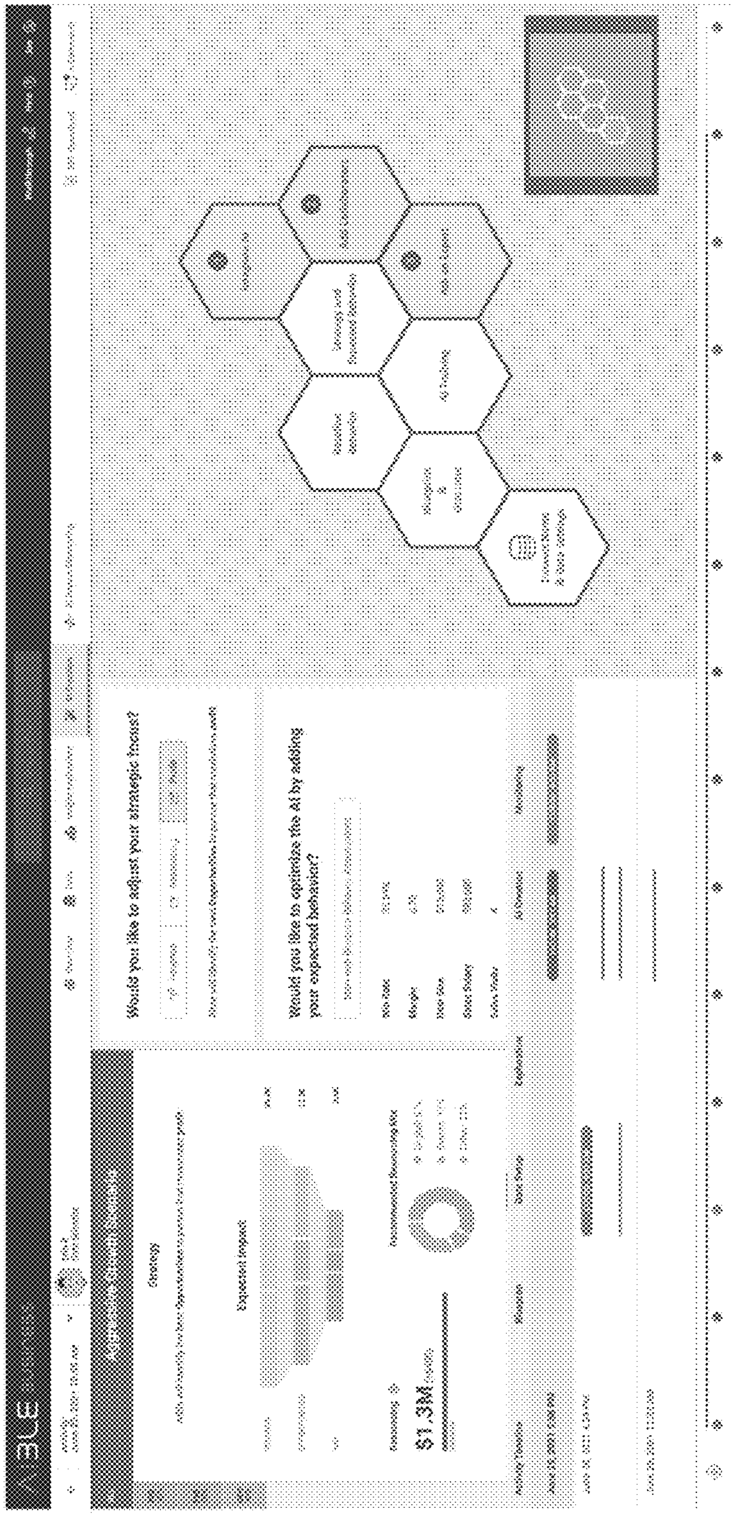

FIG. 43-44 illustrate example interfaces for a manager role. It shows various employees, how many datasets they have worked on this week, how many explorations, and the like. They can see icons for each employee. They can see before and after icons for things that have changed. They can zoom in and they can play the movie. FIG. 43 illustrates an interface in which a manager sees an overview of all the activities that have been done within their organization. FIG. 44 illustrates an interface in which clicking on an activity opens the timeline replay of what the user did during that session. In another implementation of the interface, managers can see the tasks backlog of each employee such that they can easily review what tasks were assigned to an employee during a time period, what tasks they completed, and what remains to be done.

Enabling Independent Expert Input for Micro-Analytical Tasks

Moreover, as described more fully below, using the intuitive interface for analytical tasks, additional functionality can be achieved to enable a user (such as a non-technical business user) to obtain independent or outside expertise regarding their analytical tasks in a manner that can (1) protect data security of the analytical tasks since the outside expert can review the user's interface (e.g., node graph) without having access to the underlying data; (2) enable quick understanding by the expert regarding which steps the user has and has not performed in an analytical task; and (3) allow for an independent evaluation of work or advise given by the expert.

Figure 68:
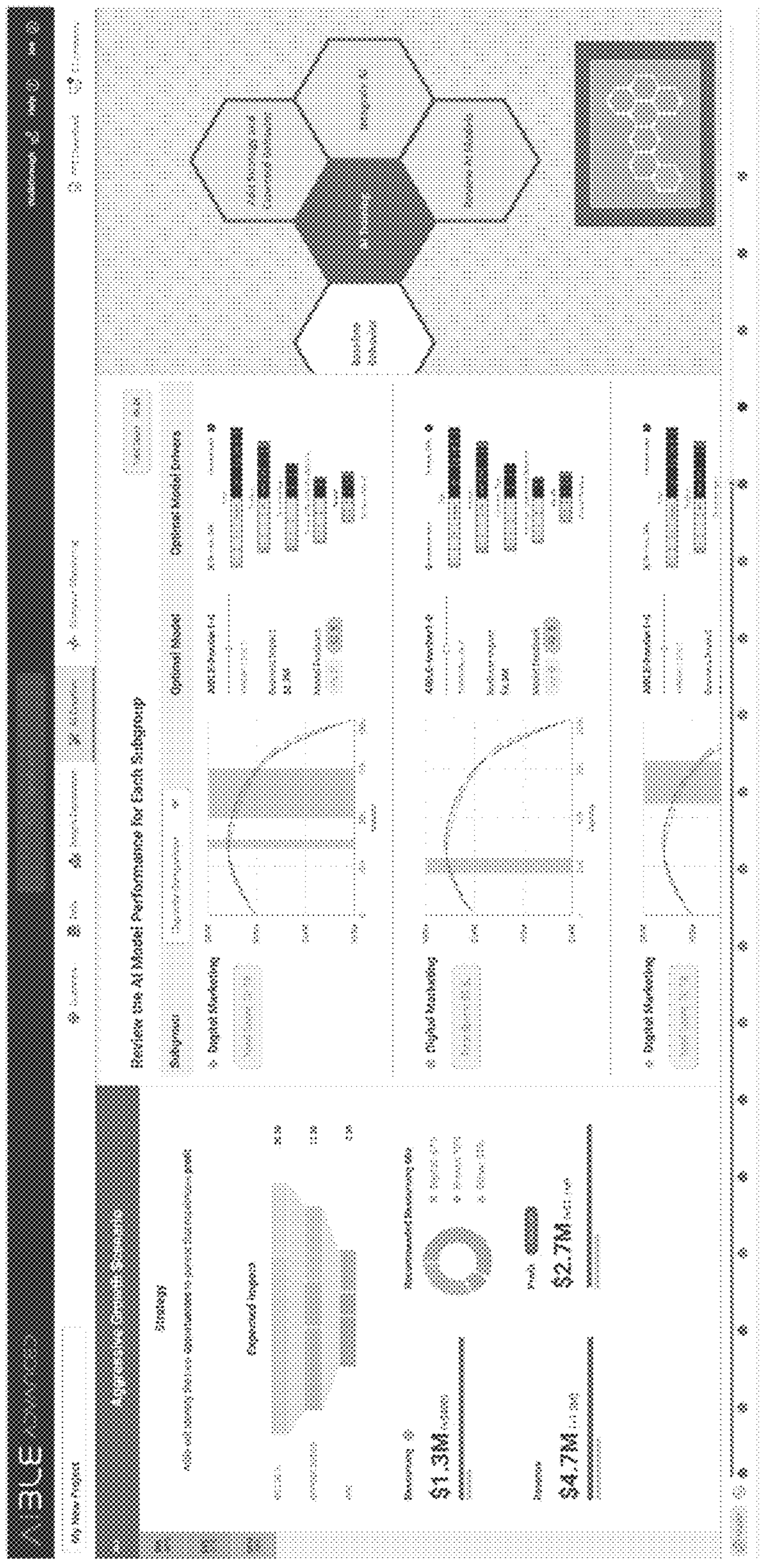
FIG. 68-69 illustrate example playback views with differing level of detail in the playback.
Figure 69:
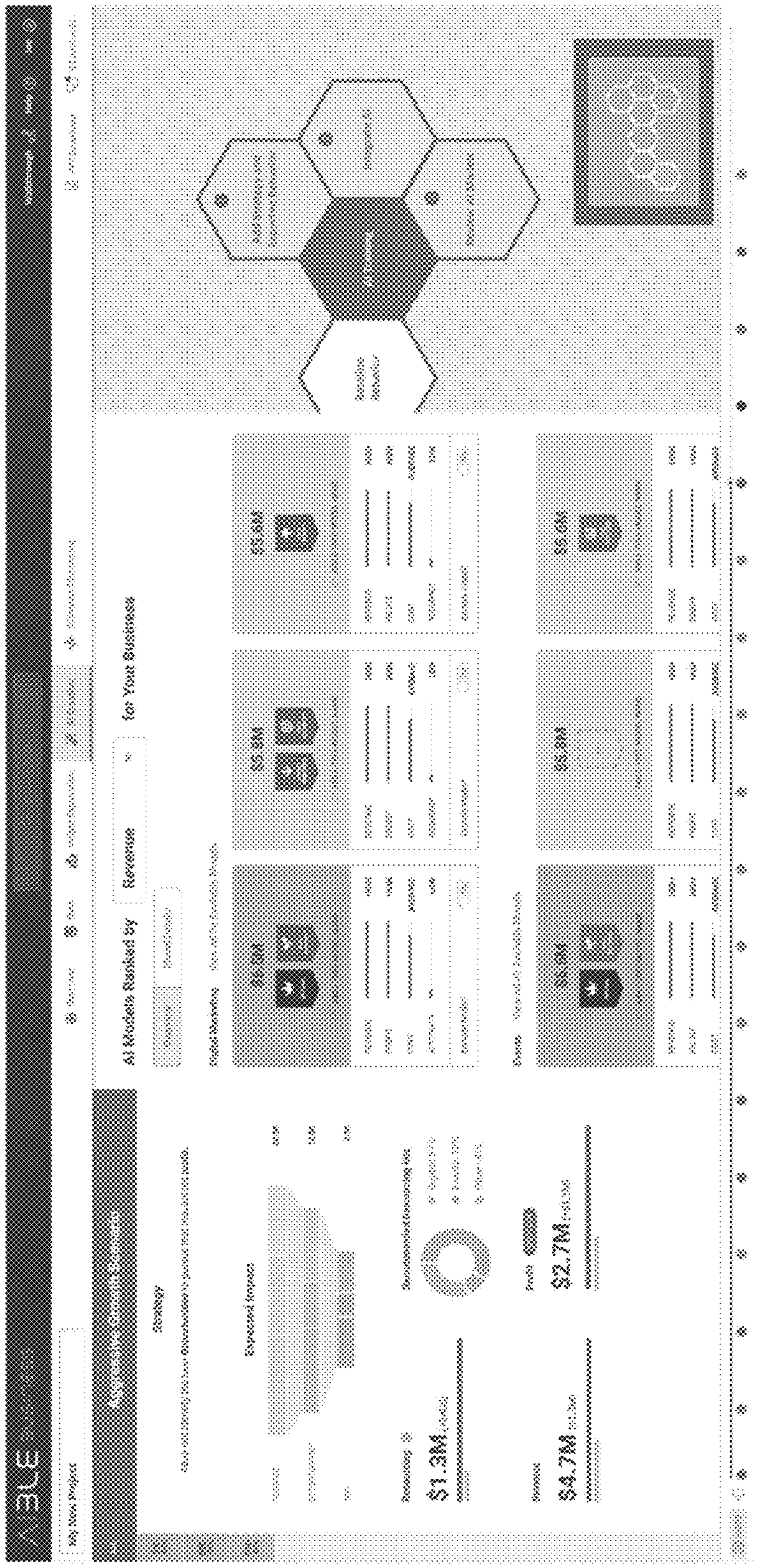

In some implementations, the user interface allows for auditability and traceability of analytical tasks. For example, using the improved interface, a user can "replay" actions that they took to perform an analytical task (such as building a predictive model). The system can show, by visualizing the node graph expanding as the user performed prior actions, the information contained in the audit log in an intuitive and easily understood (e.g., glanceable) manner. Such an approach can enable the non-technical business user to understand past analytical task actions to gain further understanding of a project. Further, such an approach can enable another user (such as an auditor, manager, expert, or collaborator) to understand past analytical task actions to gain further understanding of a project, thereby enabling them to work on the project (e.g., collaborate, audit, provide advice, perform quality control, and the like). The "replay" can be user-role-specific such that a business user would see a different level of details compared to an expert user even as they view a replay of the exact same set of analytical tasks. Examples interfaces showing differing levels of detail are shown at FIGS. 68 and 69.

Some implementations of the current subject matter can enable a services exchange where customers can easily arrange for analysts (e.g., subject matter experts) to work on specific analytical activities such as data preparation, data exploration, predictive model building while maintaining traceability, auditability, and without giving analysts access to the raw data. In some implementations, the system can enable enforceable satisfaction guarantees (e.g., an independent evaluation of work performed by expert).

In some implementations, a requirements document (e.g., job description) can be automatically generated based on actions by a user within a project. For example, a user who encounters difficulty in completing an analytical task in a project, for example, trying to add additional fields from a data set, can request a requirements document (e.g., job description) be automatically generated. Because the system understands where within the project and analytical task the user is currently working, the tasks the user has already completed, the tasks they worked on but did not complete, and the recommended tasks to be done, the system can automatically generate the requirements document. For example, the auto generated requirements document can request that "current dataset has 15 fields from CRM and marketing. Looking to add 5-10 additional fields." In one example implementation, the fact that '5-10 additional fields' may need to be added can be generated by comparing the dataset to other datasets used for successful analyses of the same sort. Such benchmarking can be specific to the user's organization, the use case, the specific user's other datasets, etc. The requirements document can be posted to an exchange on the system for experts to perform the requested micro-tasks.

Once an independent expert has accepted the job request, they can determine the current context of the project using, for example, a replay and collaboration feature as described above that allows another user to view the steps taken in the currently worked upon analytical task. By enabling the expert to quickly and intuitively understand the context of the currently worked upon project or analytical task, it enables experts to provide input for micro-tasks quickly and efficiently.

Some implementations of the current subject matter can also provide for data security. While a user may require expert help for a particular task they may not want to expose their data to an independent expert. By utilizing the interfaces described herein, some aspects of the current subject matter can allow for collaboration between an expert and a user without exposing the underlying data, thereby improving data security, because the analytical task can be performed entirely within the system the underlying raw data is never exposed or made available to the independent expert. The data can be stored securely in a cloud environment specific to the data provider and all analytical tasks of the expert translates into the code that executes in the data-provider's cloud account. Such code can be restricted from transferring anything other than high-level query results and specifically prevented from giving access to raw data. In one implementation, an approach such as k-anonymity can be implemented such that the system will only allow aggregation queries on data subsets where the count is greater than k.

Further, some implementations can allow for tracking of the expert's activities thereby giving the user assurance regarding the amount of time and steps taken by the expert when working on a particular job. Such tracking can be performed, for example, by monitoring interactions of the expert with the systems' servers. Such assurance can enable automated satisfaction guarantees (e.g., an independent evaluation of work performed by expert) and in a manner that does not log the entire view (e.g., user interface) of the expert, thereby avoiding privacy concerns associated with screen loggers.

Figure 45:
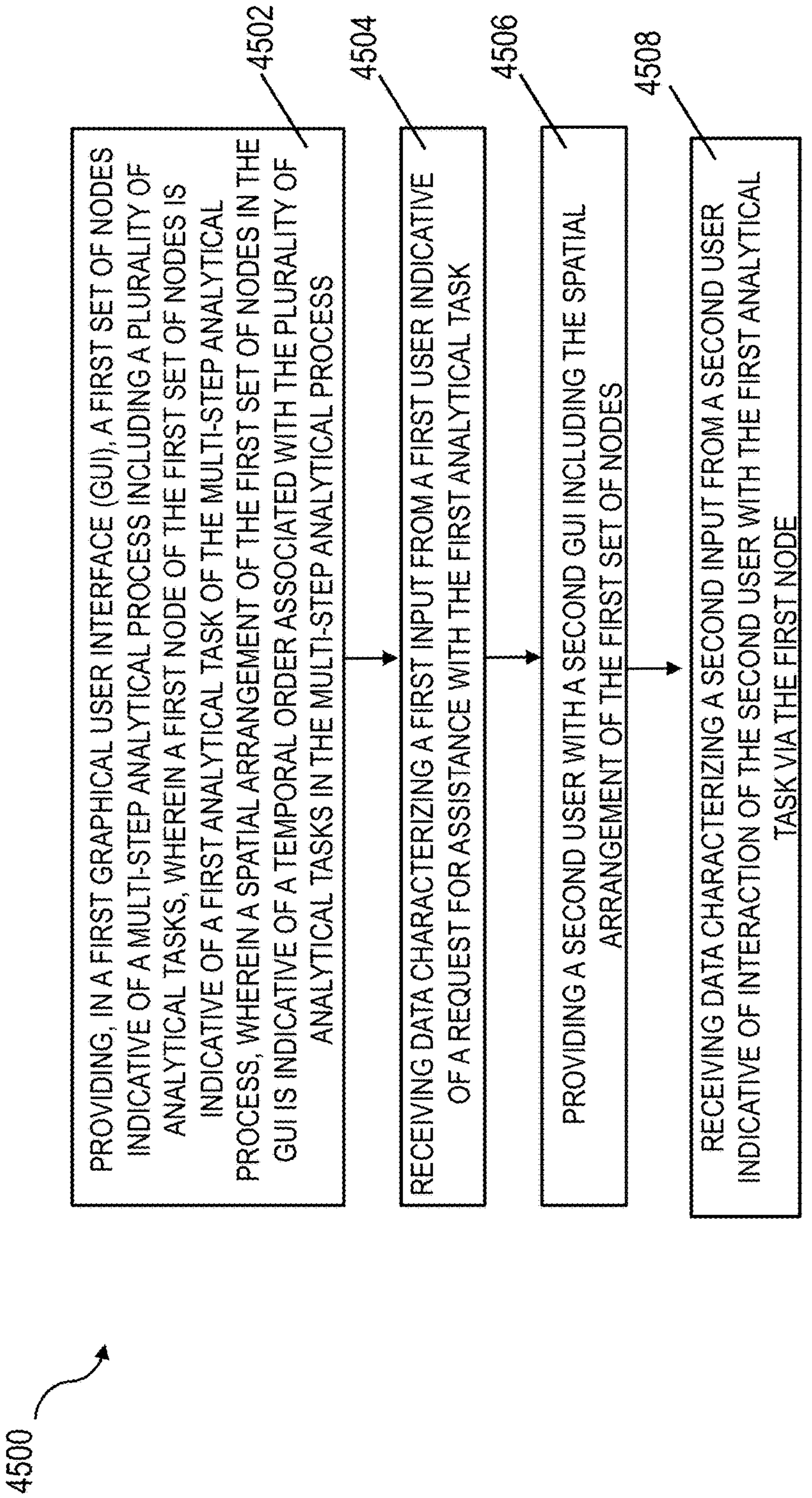
FIG. 45 is a flowchart of an exemplary method of requesting assistance for performing one or more analytical tasks of a multi-step analytical process.
Figure 46:
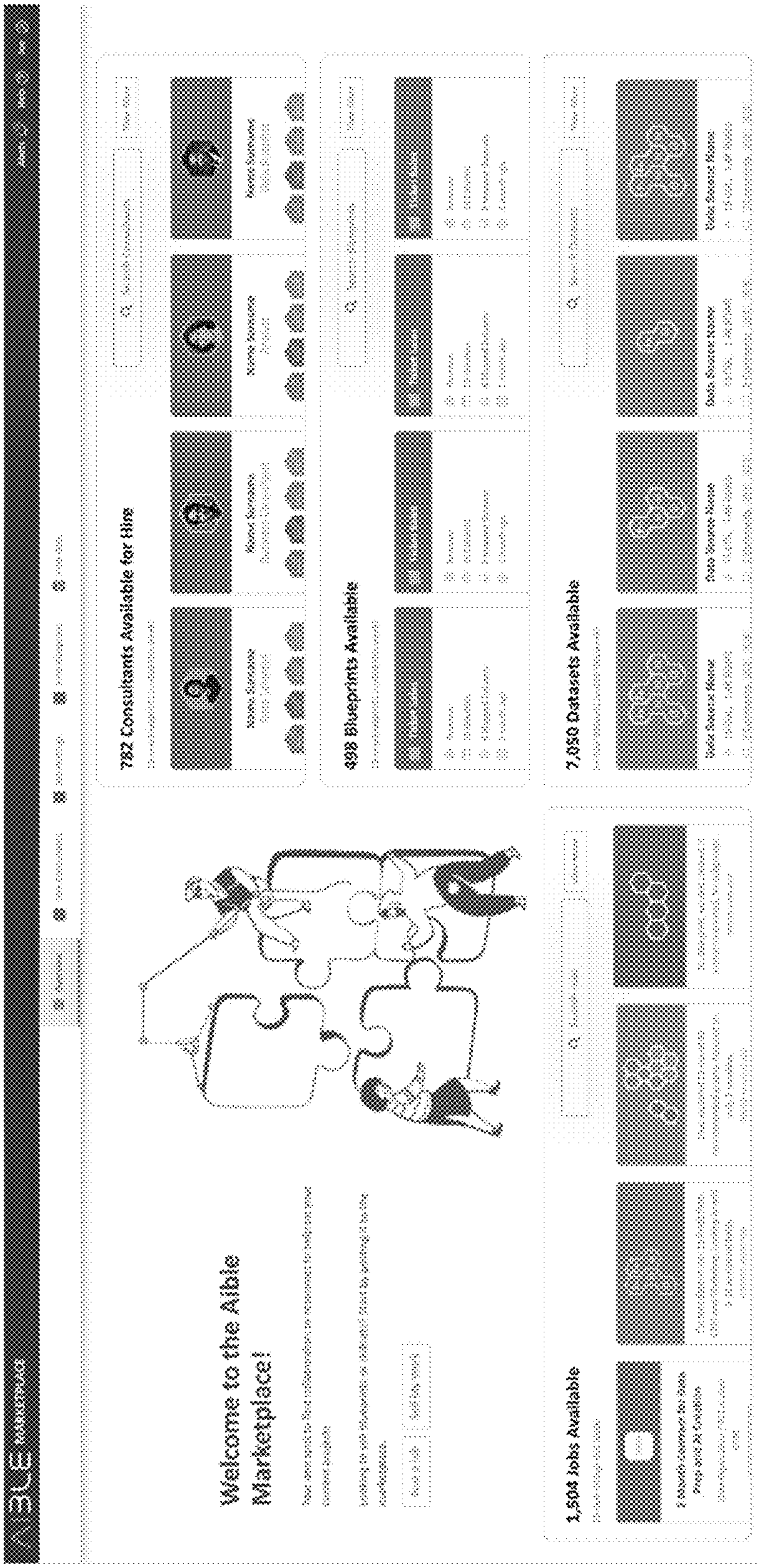
FIG. 46-57 illustrate example interfaces showing an example exchange in which a user can post for micro-task jobs and receive expert help.
Figure 47:
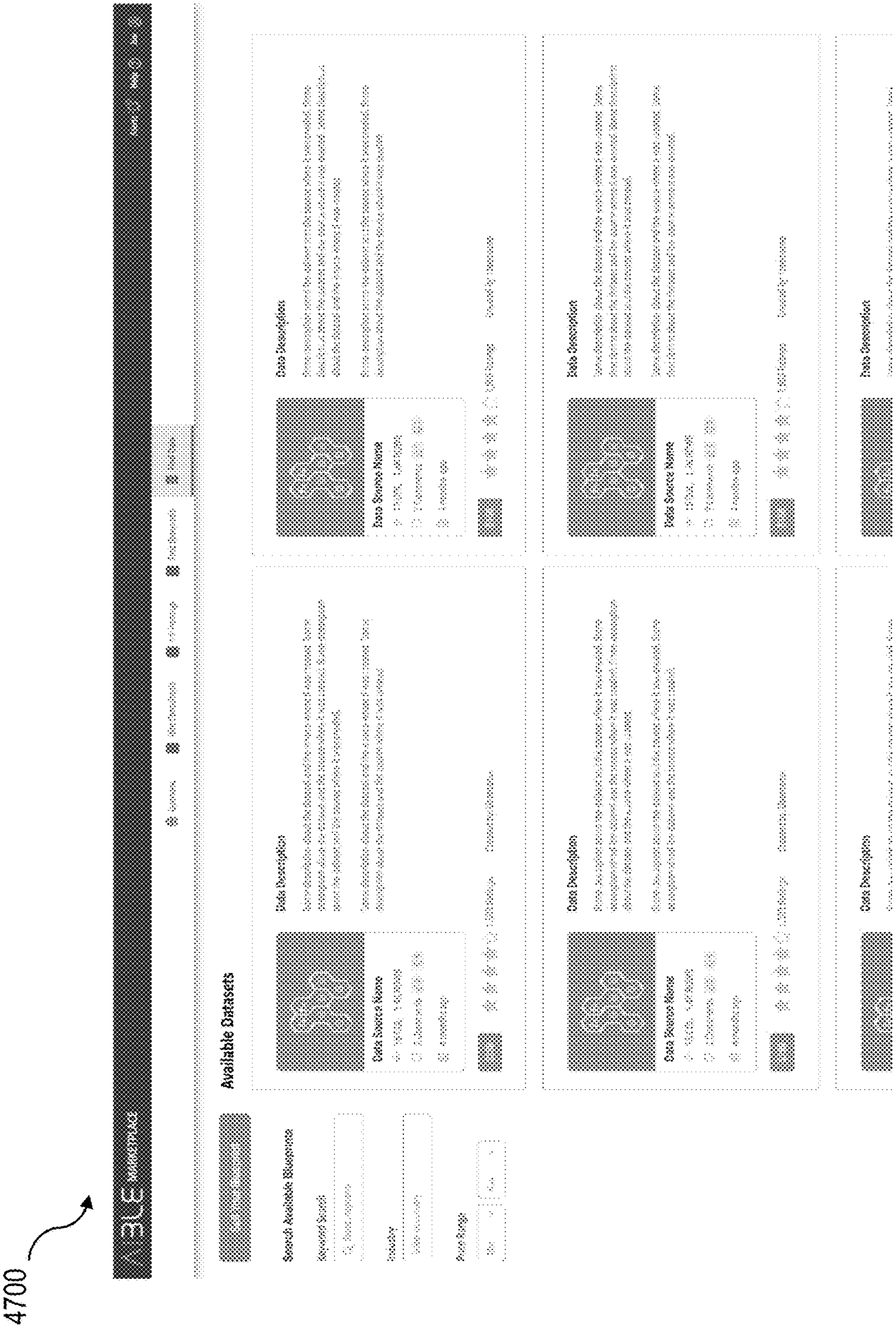
Figure 48:
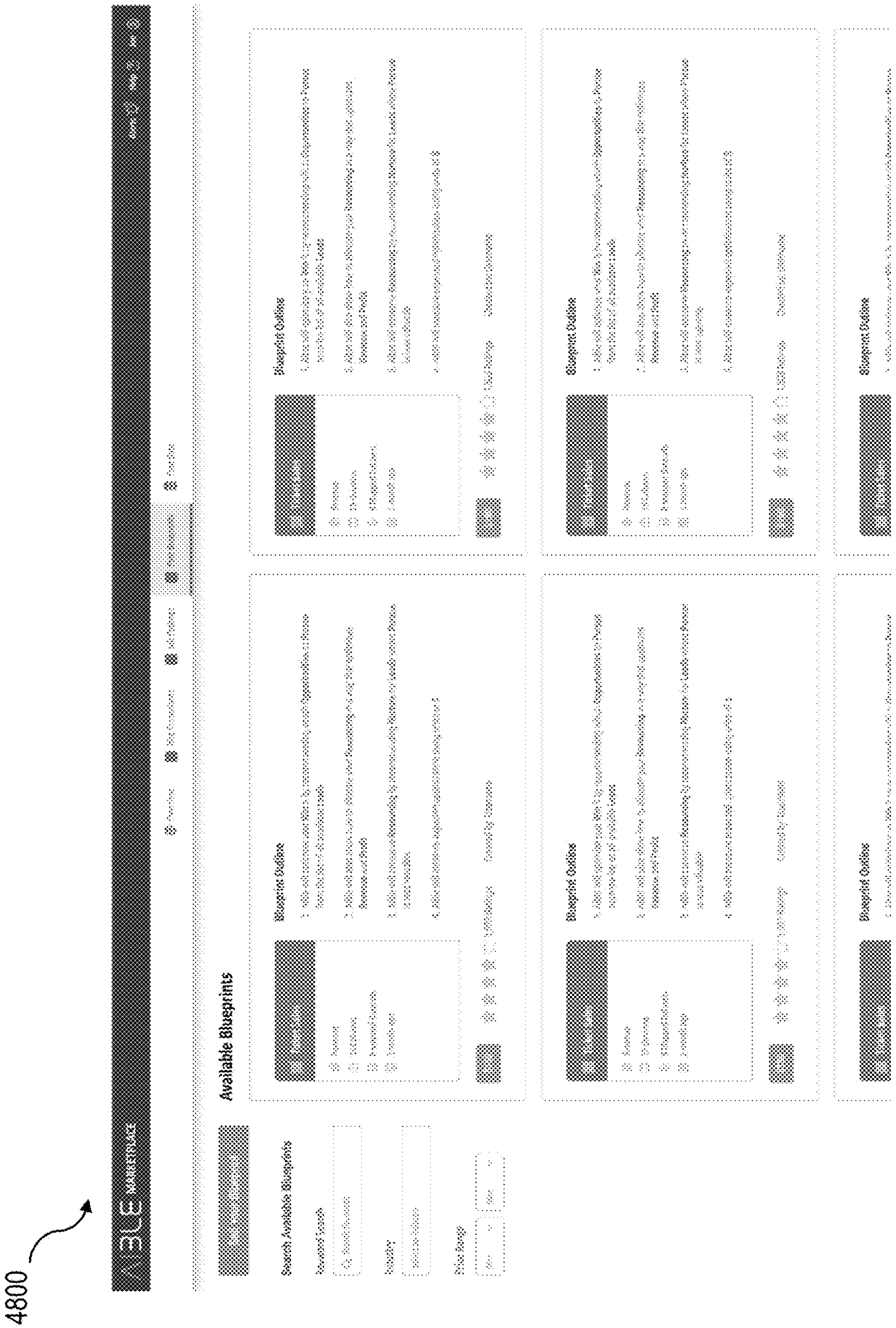
Figure 49:
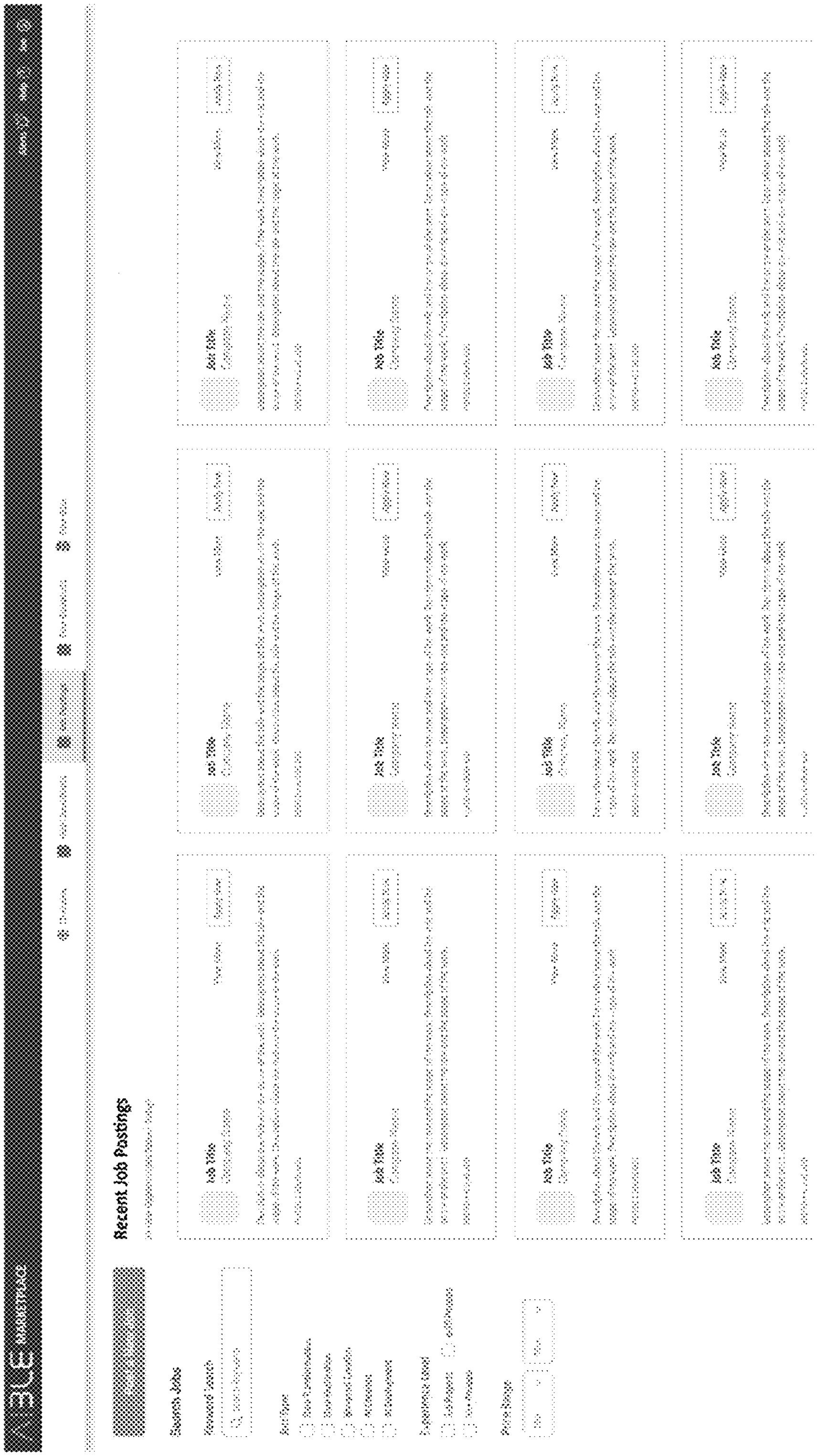
Figure 50:
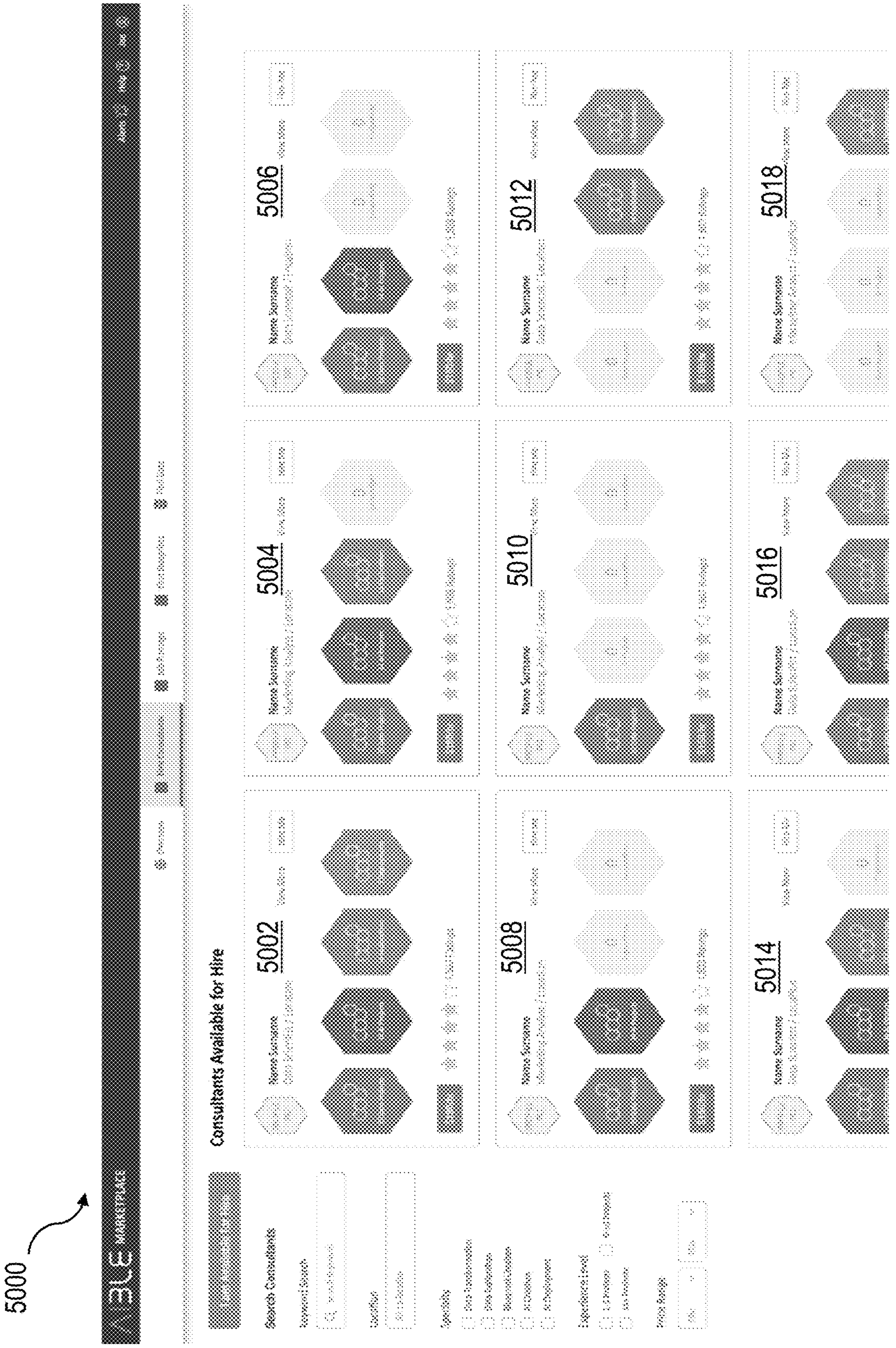

FIG. 45 is a flowchart of an exemplary method of requesting assistance via a graphical user interface (GUI) for performing one or more analytical tasks of a multi-step analytical process. At step 4502, a first set of nodes indicative of a multi-step analytical process that can include a plurality of analytical tasks can be provided in a first graphical user interface (e.g., interface 800). For example, as described above, nodes 802-814 can represent a plurality of analytical sub-tasks (or a plurality of analytical tasks) provided in the interface 800. For example, a first node (e.g., node 812) in the interface 800 can be representative of a first analytical task (e.g., integrating the sales task with an existing artificial intelligence model). The spatial arrangement of the nodes 802-814 in the interface 800 is indicative of a temporal order associated with the plurality of analytical tasks in the multi-step analytical process. For example, the nodes 802-814 are placed based on temporal order in which they were created (e.g., node 802 is created first and node 814 is created last).

Figure 51:
Figure 52:
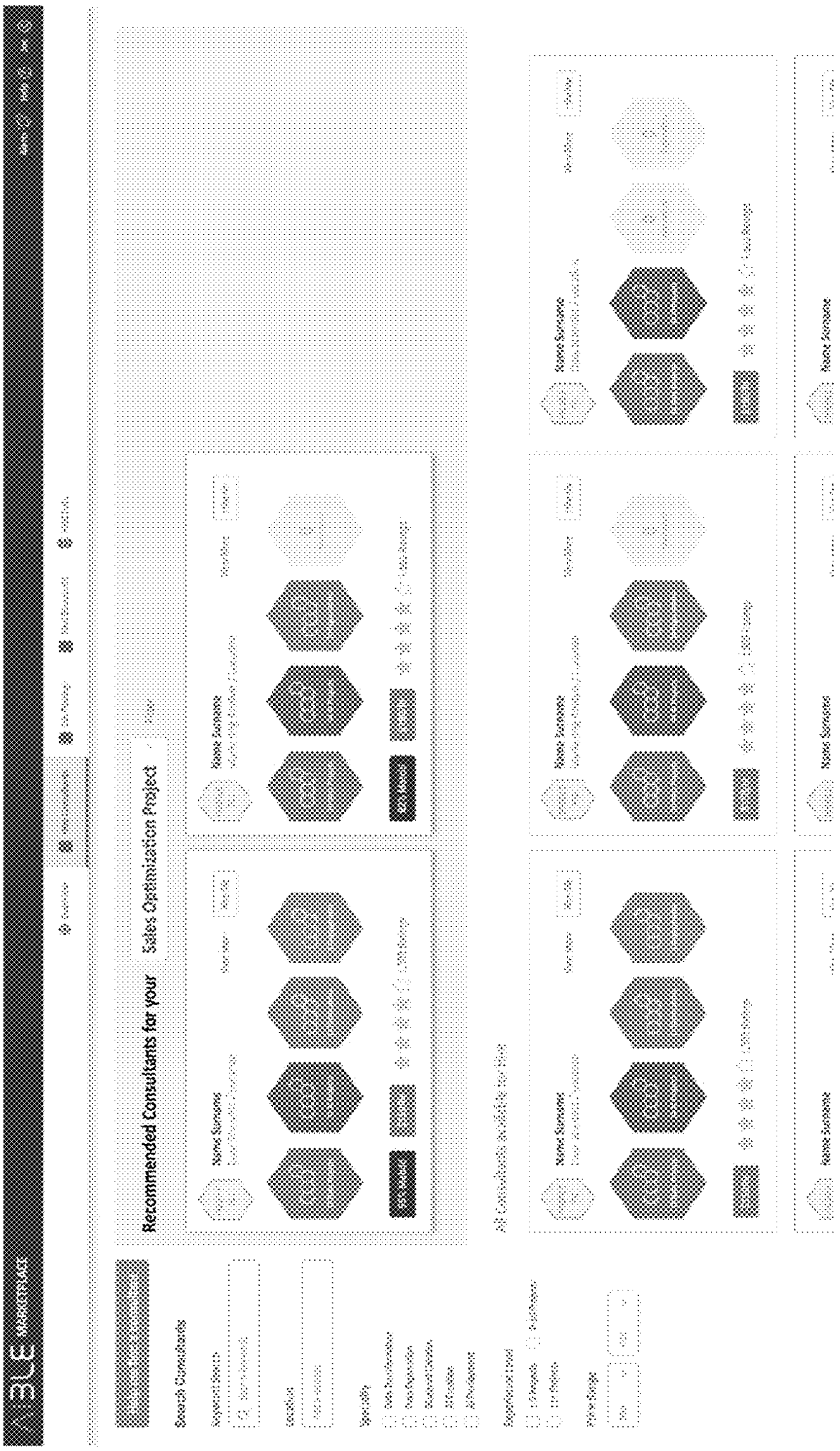

FIG. 46-57 illustrate example interfaces showing an example exchange in which a user can post for micro-task jobs (e.g., integrating the sales task with an existing artificial intelligence model) and receive expert help. FIG. 51 illustrates an interface that enables, once the user has hired a consultant for a project, to securely share the data via a data portal. FIG. 52 illustrates that if a user has an active project, explorations, and the like linked to their account they will see recommended experts for their ongoing projects.

Referring again to FIG. 45, at step 4504, data characterizing a first input from a first user can be received. The first input can be indicative of a request for assistance with the first analytical task by the first user. For example, the first user can request assistance for integrating the sales task with an existing artificial intelligence model (represented by node 814). In some implementations, the user can identify a prospective user from whom assistance can be requested from a GUI that provides information associated with a plurality of prospective users (e.g., prospective users 5002-5018 in FIG. 50). The user may select a user and request assistance from the user.

In some implementations, one or more users from a plurality of prospective users can be selected and provided to the first user. The selection can be based on comparing a predetermined set of requirements included in the request for assistance from the first user (e.g., received at step 4504) and user characteristics associated with the plurality of prospective users. For example, if the first user has requested help for the first analytical task (e.g., integrating the sales task with an existing artificial intelligence model), prospective users with experience in artificial intelligence and/or sales can be selected and provided to the first user. In some implementations, the first user can be provided with a recommendation associated with the selected prospective users. The recommendation can include a priority value that can be indicative of the likelihood that the selected prospective user is suitable for the first analytical task.

Figure 53:
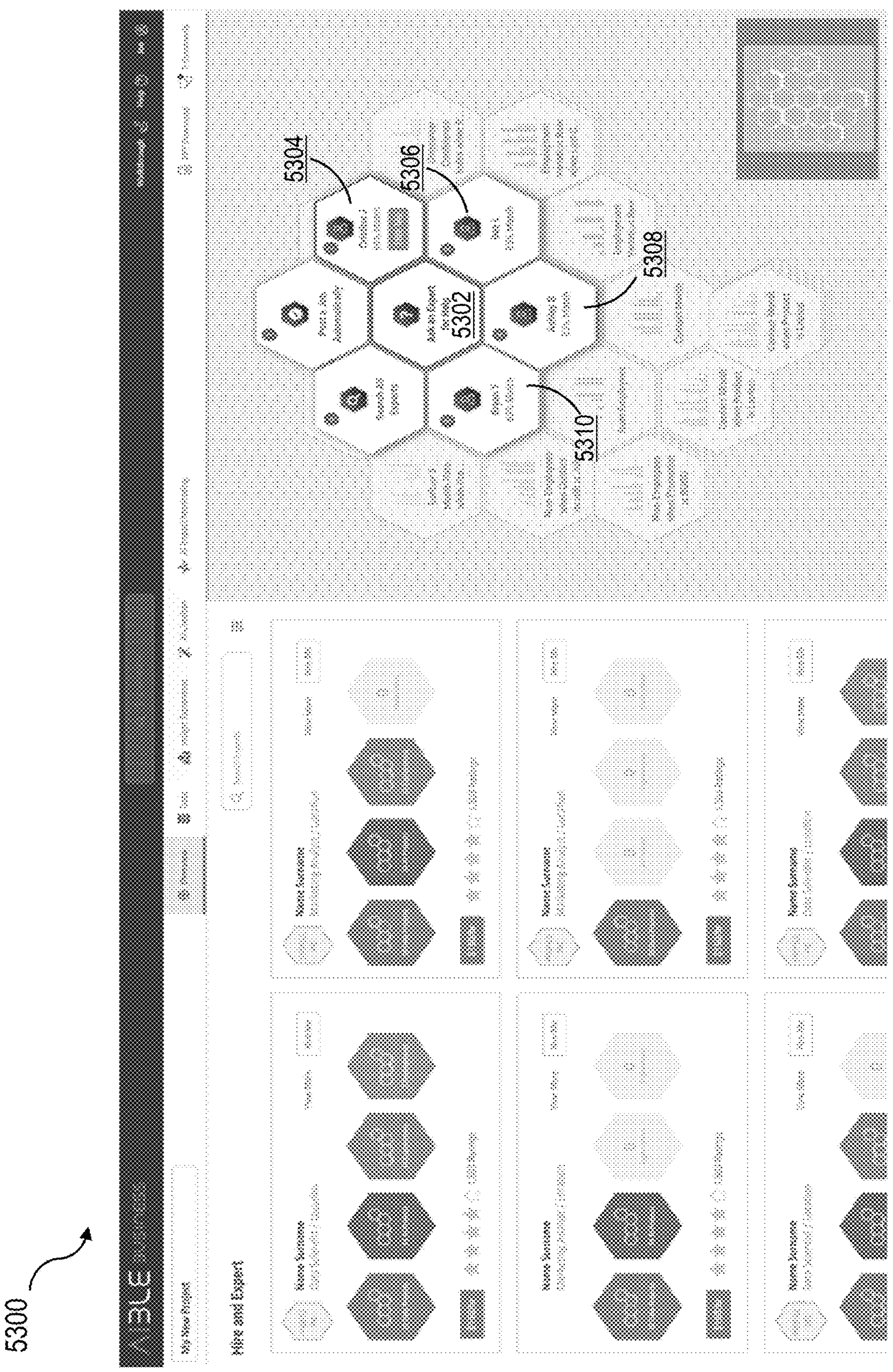

FIG. 53 illustrates an interface 5300 that includes a plurality of nodes 5302-5310. A core node 5302 can allow a user working on a project to request for assistance (e.g., by clicking on the core node 5302 labelled "ask an expert"). Based on the user interaction with the core node 5302 a second set of nodes 5304-5310 can be displayed. The second set of nodes 5304-5310 can be arranged adjacent to a core node located at a first location in the interface 5300. The second set of nodes can be indicative of the selected users (e.g., from the plurality of prospective users), and can include a priority value associated with the corresponding user (e.g., each node representative of a selected user can include a priority value associated with the user). The recommendation may be based on expert ratings and also based on their expertise on the specific kind of project the user is requesting for help on. Thus, if the user is asking for help on a sales optimization use case, priority can be given to experts who specifically are rated well on such use cases.

The second set of nodes 5304-5310 are arranged adjacent to the core node 5302. The arrangement of these nodes can be based on the priority value assigned to the user associated with the node. In some implementations, the nodes can be arranged such that the priority value decreases along the clockwise direction. For example, the second node 5304 (associated with a second user) is located at a second location in the interface 5300. The second location is indicative of a highest priority result associated with the request for assistance. In other words, the positioning of the second node 5304 at the second location can indicate that the second user has received the highest priority value among the selected users. A third node 5306 (associated with a third user) is located at a third location in the interface 5300. The third location is indicative of a second-highest priority result associated with the request for assistance. In other words, the positioning of the third node 5306 at the third location can indicate that the second user has received the second-highest priority value among the selected users.

Figure 54:
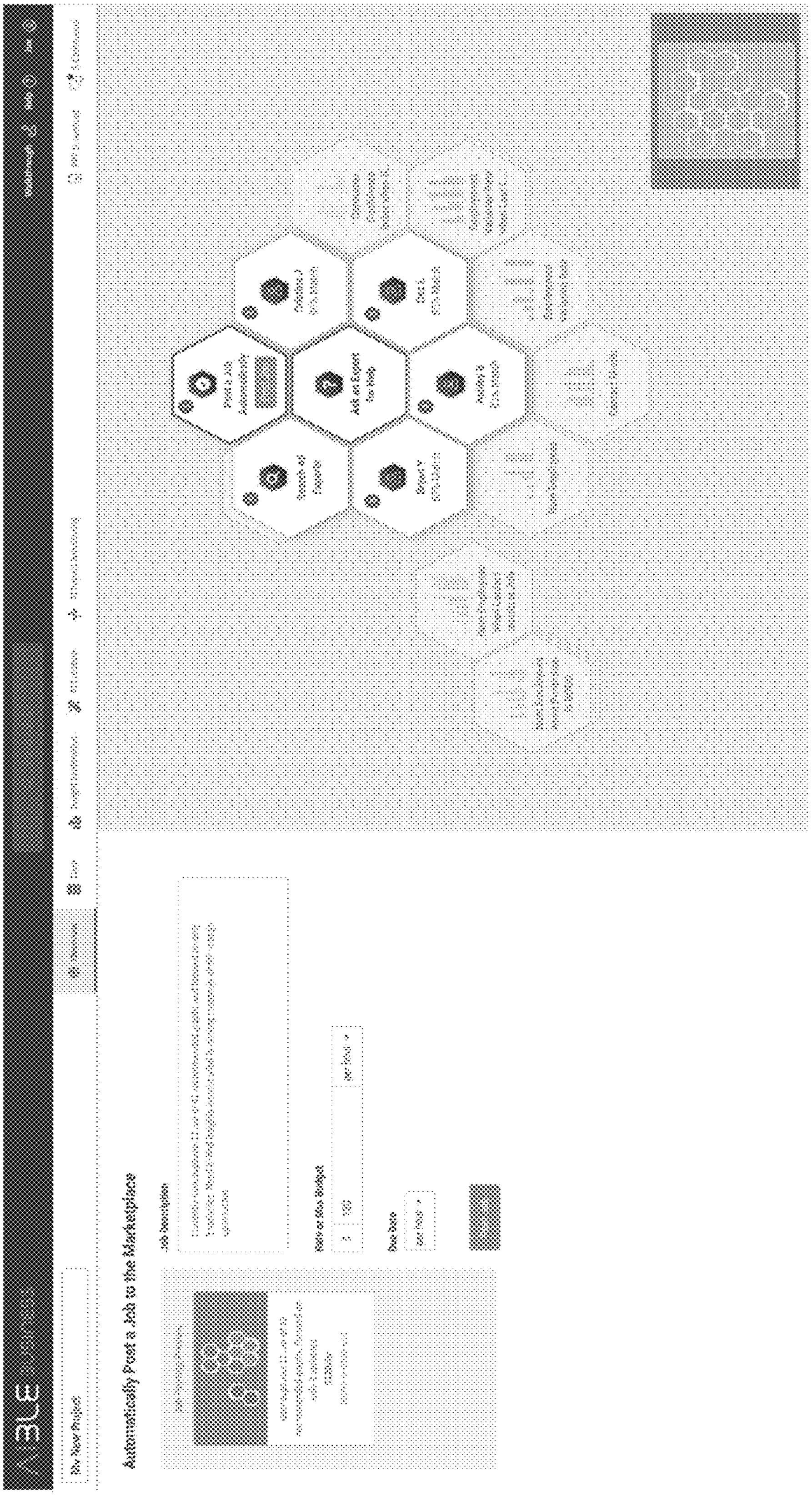
Figure 55:
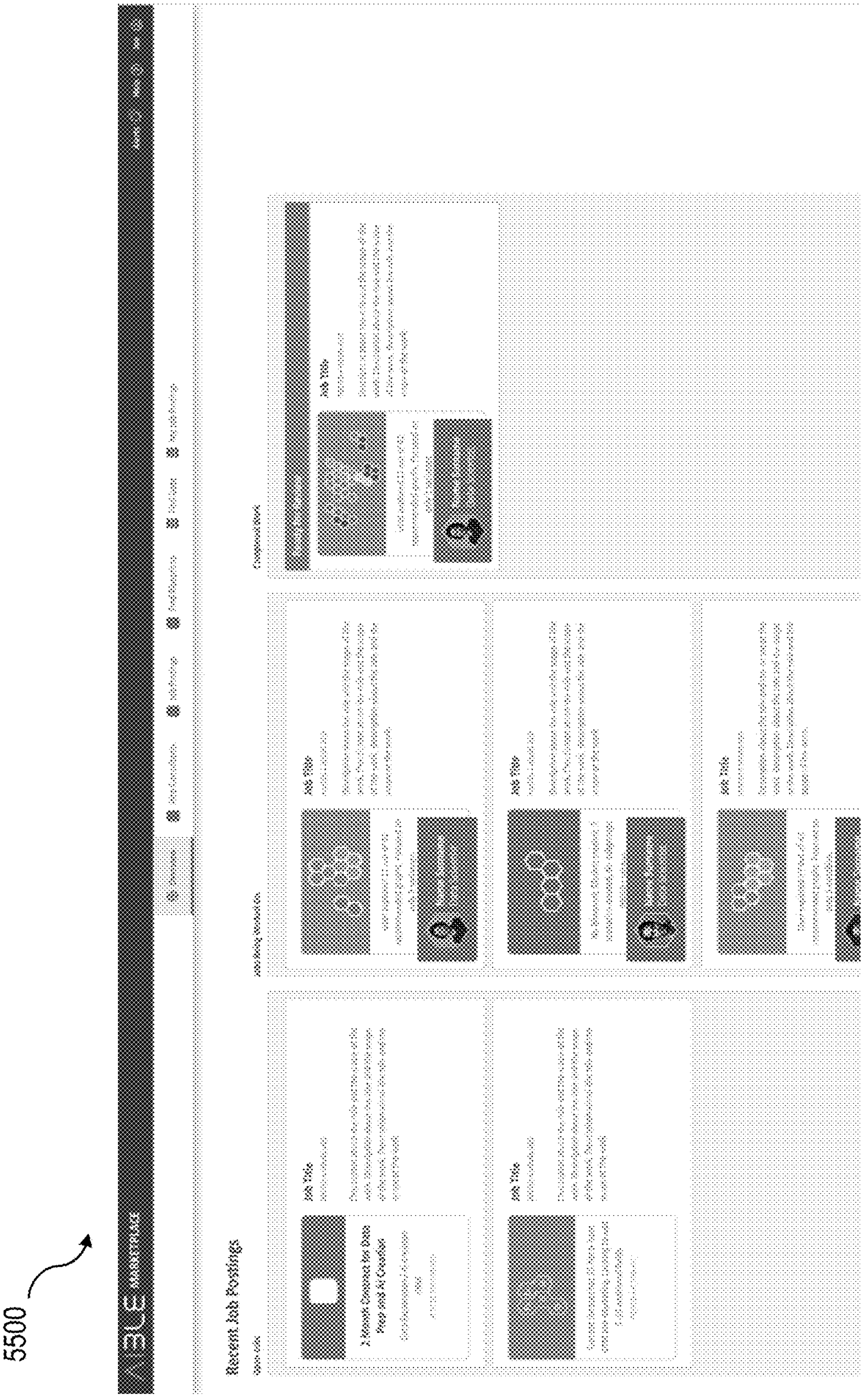
Figure 56:
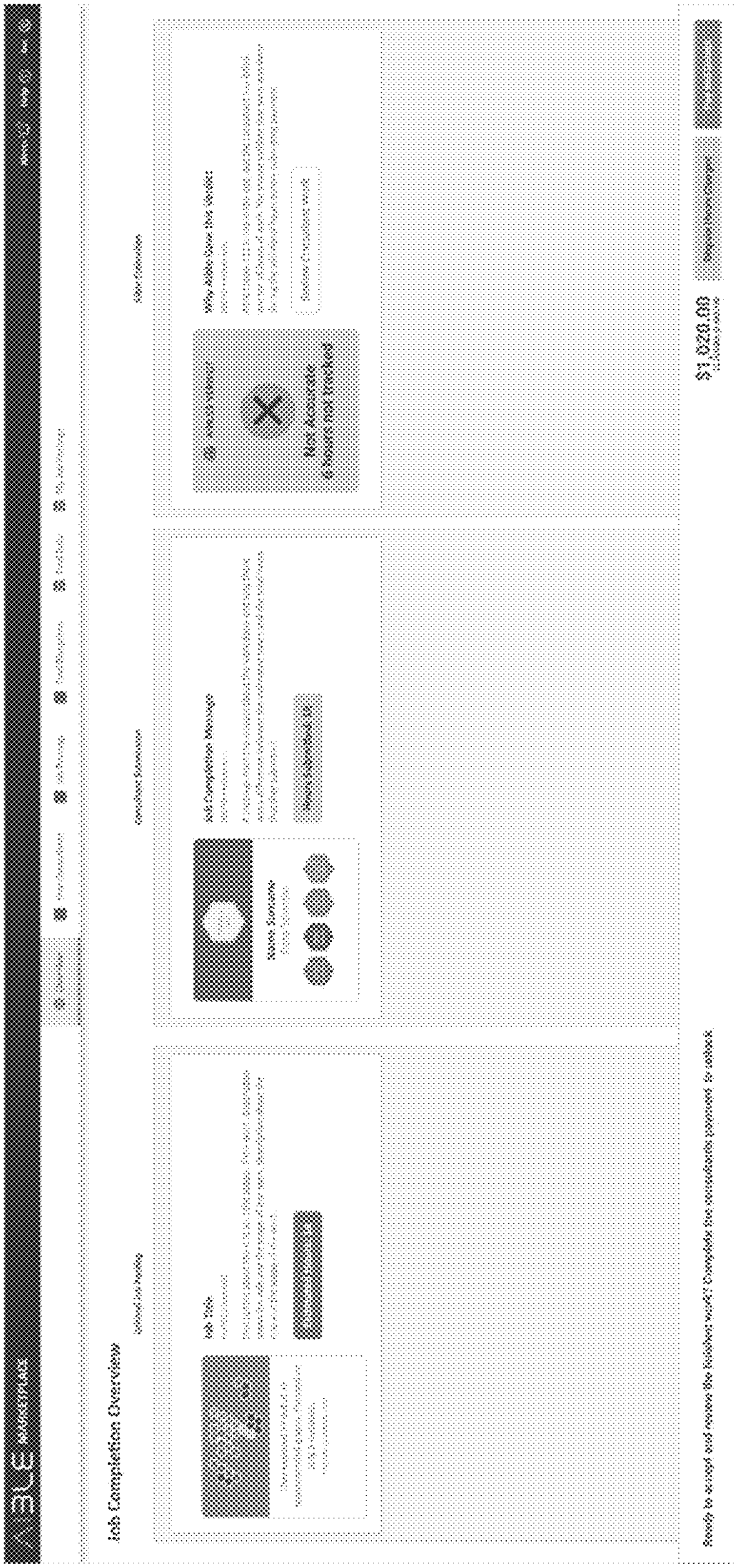
Figure 57:
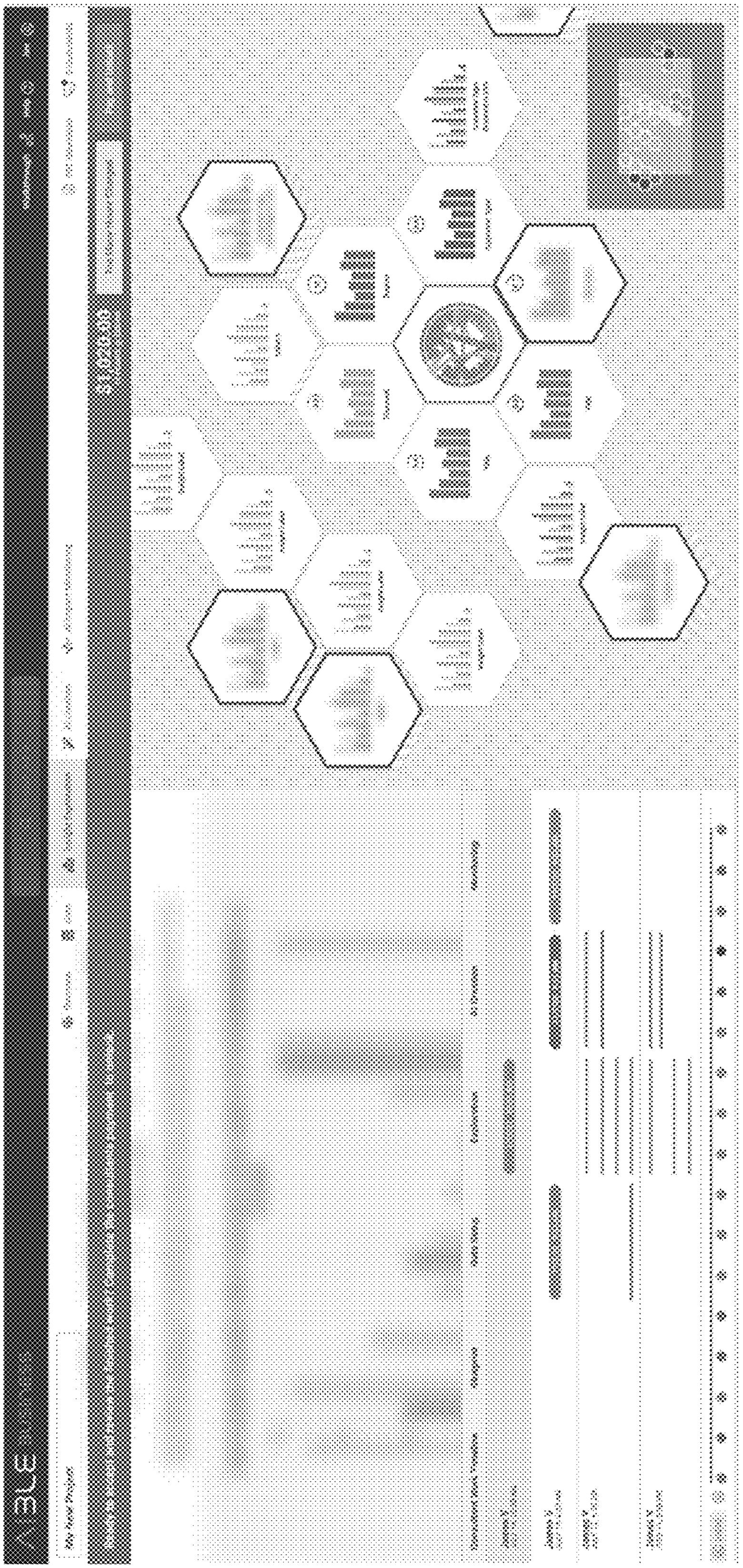

FIG. 54 illustrates the automatic posting of a job. FIG. 55 illustrates an overview of open, in progress, and completed jobs. FIG. 55 illustrates that users can click on a completed job to review the work done and see an evaluation by the system if the submitted hours match up with the expected job. FIG. 57 illustrates that users can view a replay of the actions that highlights the work completed. Submitting payment unlocks the hidden work.

In some implementations, the request for assistance from the first user can include one or more access parameters characterizing an access level associated with a prospective user. The access level can determine the data sub-sets of the dataset associated with the first analytical task that the prospective user can access. The access level may determine the analytical tools that the prospective user can use to perform operations on the first analytical task. In some implementations, the access parameters can be based on the data sub-sets selected by the first user. For example, the first user can select data sub-sets associated with the first analytical task (e.g., integrating the sales task with an existing artificial intelligence model) that will be assigned to a user selected from the plurality of prospective user.

Returning back to FIG. 45, at step 4506, a second user (e.g., a user who has been selected from the plurality of prospective users to assist with the first analytical task) can be provided with a second GUI including the spatial arrangement of the first set of nodes (e.g., spatial arrangement indicative of temporal order in which the first set of nodes were created). In some implementations, the second GUI can receive data characterizing a request to provide the temporal order of the plurality of analytical tasks in the multi-step analytical process (e.g., from a second user assigned to work on the first analytical task). The temporal order can be indicative of the order in which the analytical tasks in the plurality of analytical are created in the first GUI (e.g., interface 800). The second GUI can sequentially provide the nodes in the first set of nodes (e.g., nodes 802-814) in the second GUI. If node 802 (associated with a first analytical task) was created prior to node 804 (associated with a second analytical task) in interface 800, node 802 will be displayed prior to the display of node 804 in the second GUI. In other words, the node 802 will be displayed first, and at a later time both nodes 802 and 804 will be displayed. This can allow for repeat (or replay) of the changing view of the interface 800 as nodes 802-814 were created.

In some implementations, an assistance notice including at least a portion of the predetermined set of requirements (e.g., provided by the first user in the request for assistance) can be provided to one or more of the plurality of prospective users. The prospective users can receive the assistance notice and can provide data characterizing the corresponding user characteristics (e.g., provide data requested in the assistance notice).

Returning back to FIG. 45, at step 4508, data characterizing a second input can be received from the second user (e.g., a user who has been assigned to work on the first analytical task as described in step 4506). The second input can be indicative of interaction of the second user with the first analytical task via the first node (e.g., node 802 displayed in the second GUI). For example, when the second user begins working on the first analytical task, operations performed by the second user on the first analytical task can be received by the first GUI (e.g., interface 800).

Figure 58:
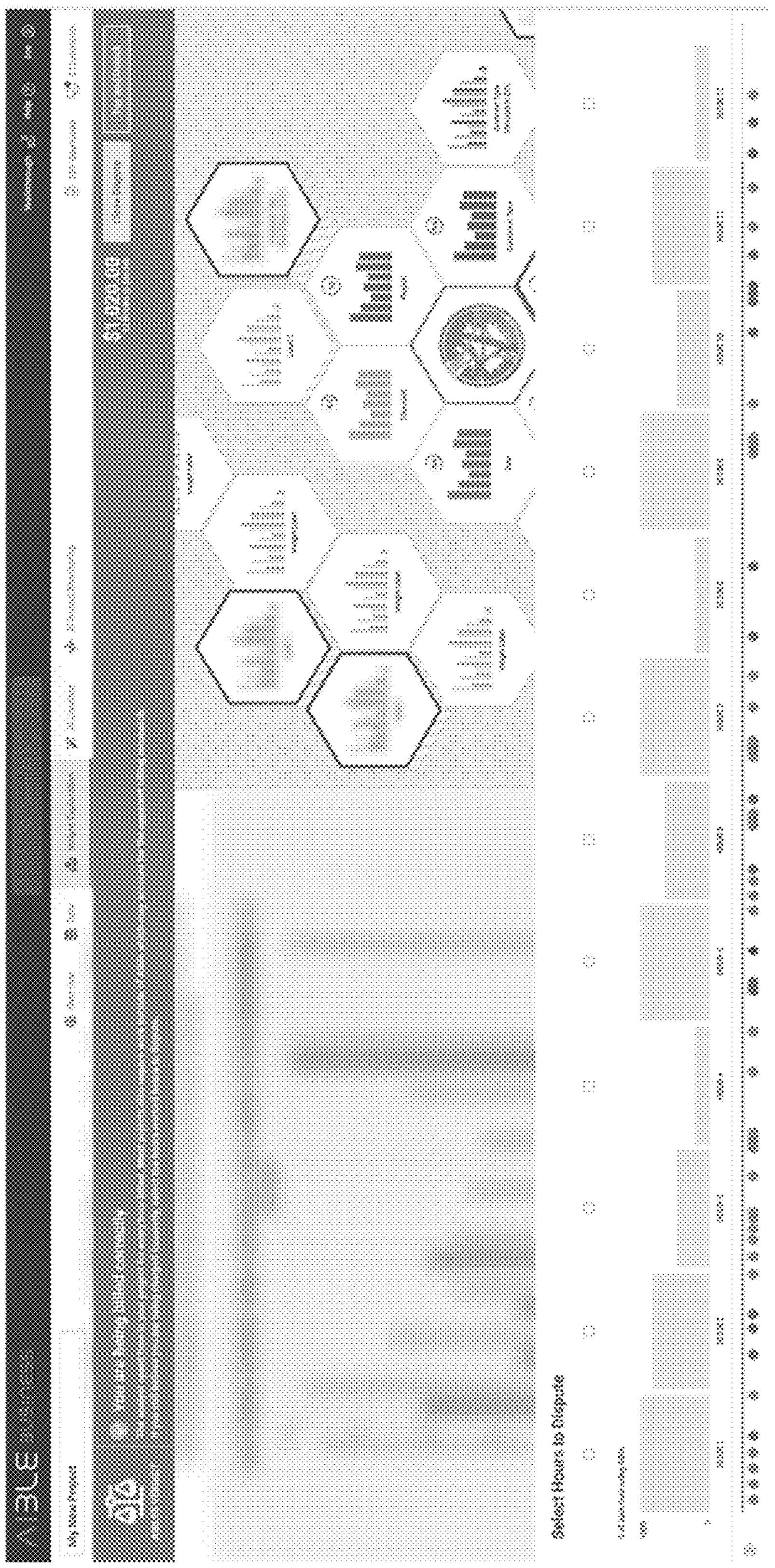
FIG. 58-59 illustrates example interfaces for enabling the system to arbitrate when there is a dispute on how much work the expert performed.
Figure 59:
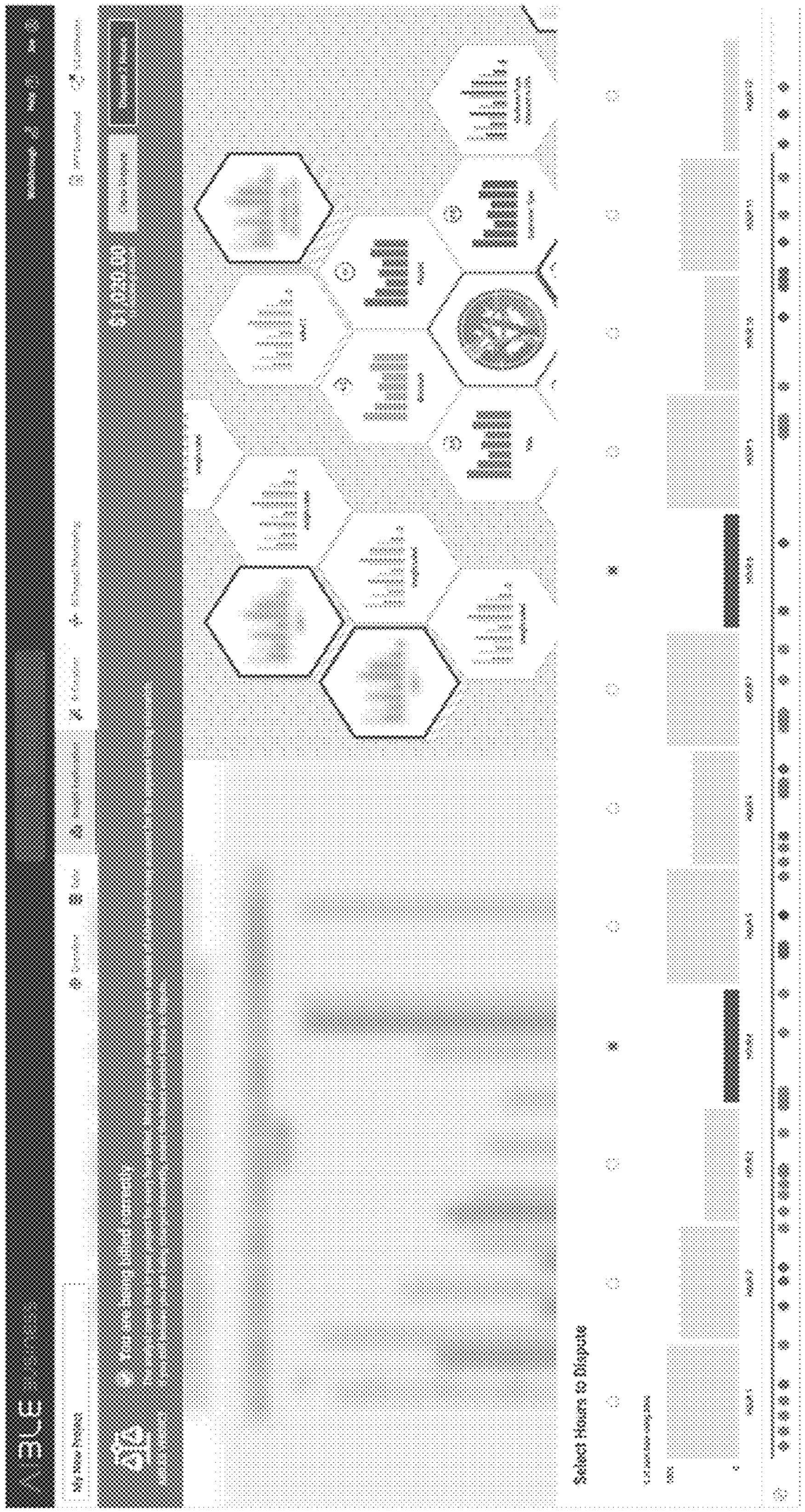
Figure 60:
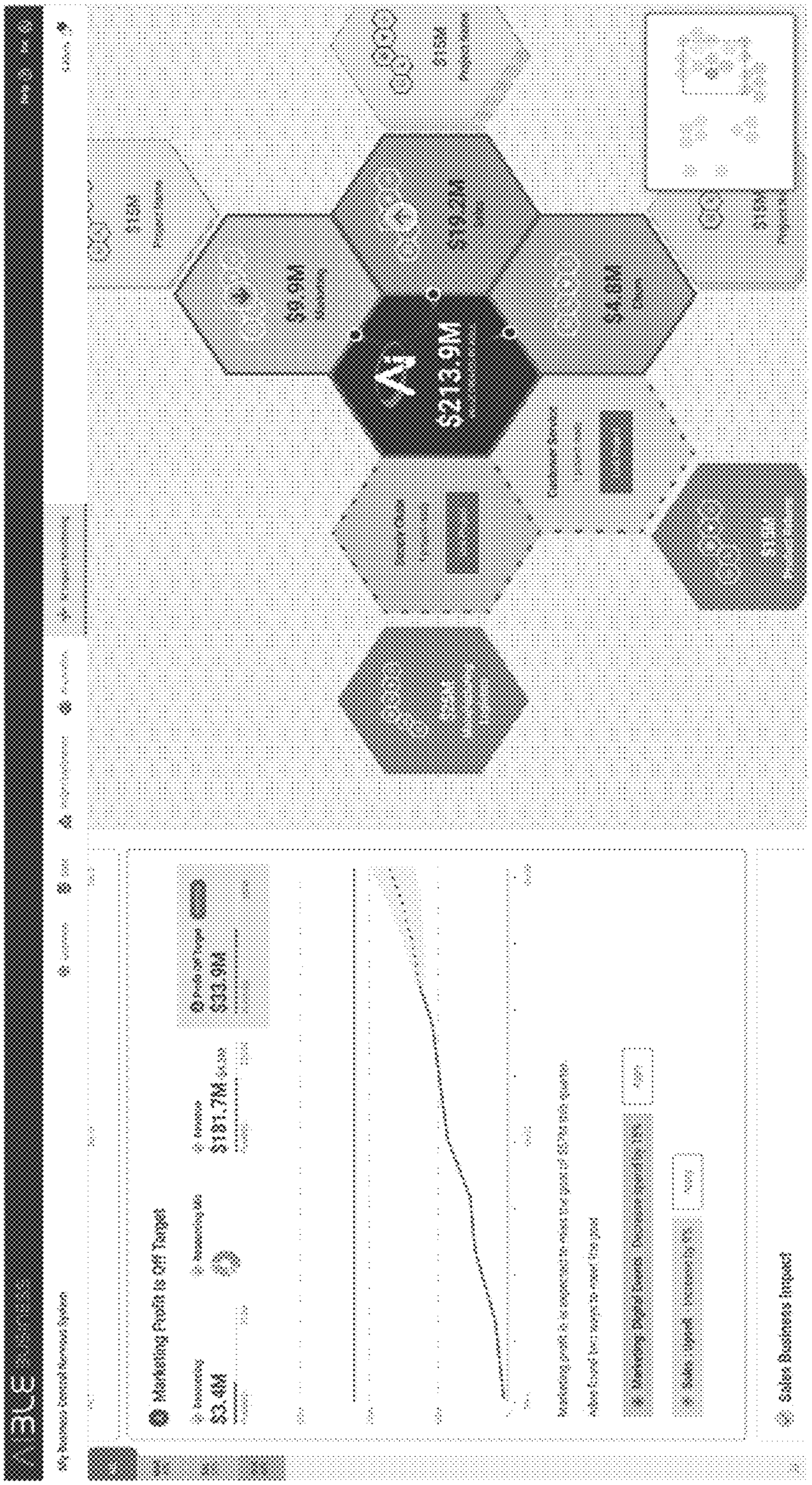
FIGS. 60-63 illustrate some implementations of the current subject matter that can provide an executive overview of various AI and machine learning projects in a given enterprise showing how much value they are creating, how they are linked together, projects that could be creating value but haven't been deployed, and valuable insights from other analytical activities.

FIG. 58-59 illustrates example interfaces for enabling the system to arbitrate when there is a dispute on how much work the expert performed. If users want to dispute a payment, the platform can provide a summary of the hours worked and a verdict from the system on if the consultant has correctly charged them (FIG. 58). FIG. 59 illustrates that if the user wants to continue to dispute some of the time they can select the hours they feel they have been unfairly billed to begin the dispute process.

Executive View

Figure 61:
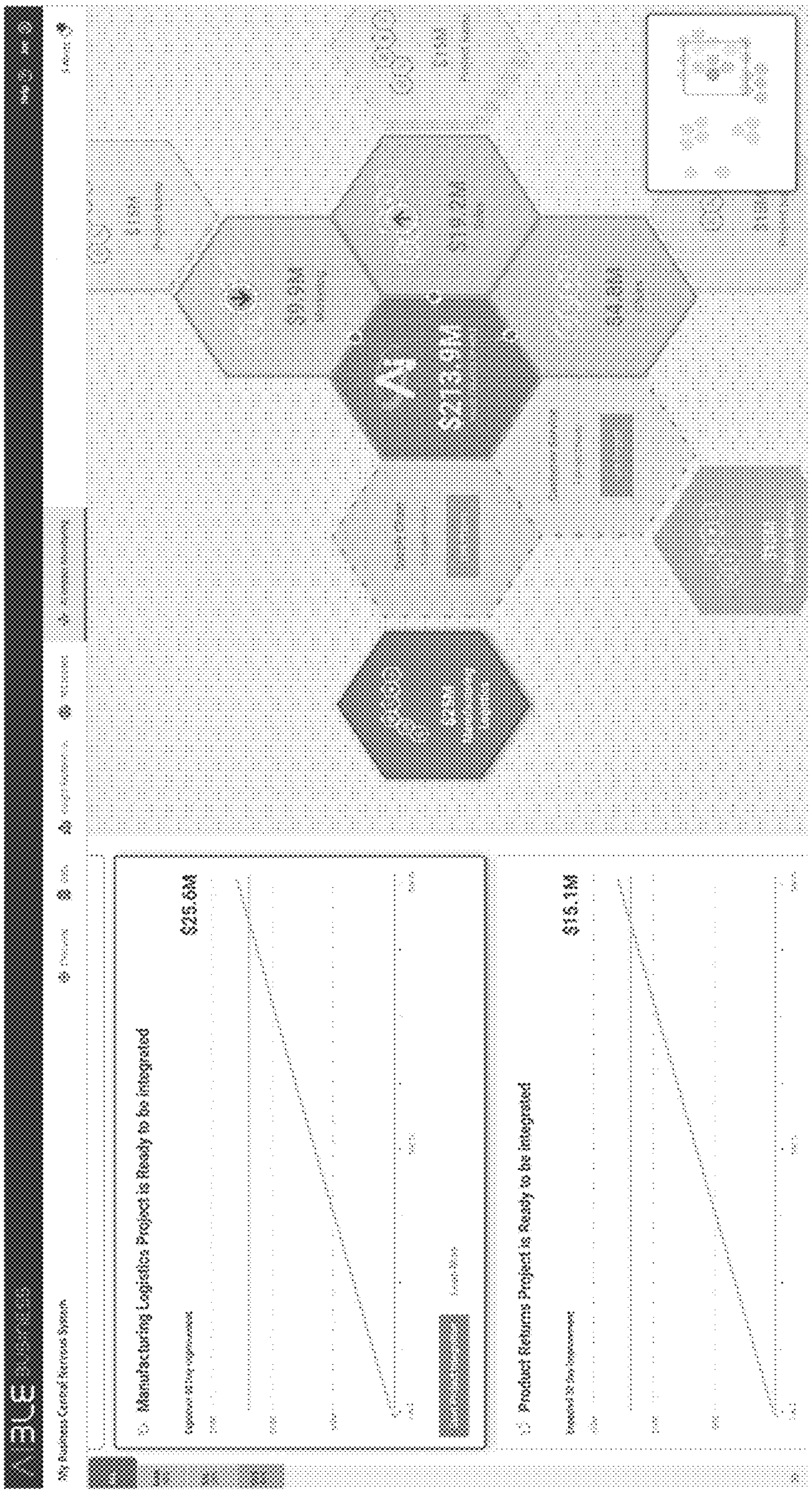
Figure 62:
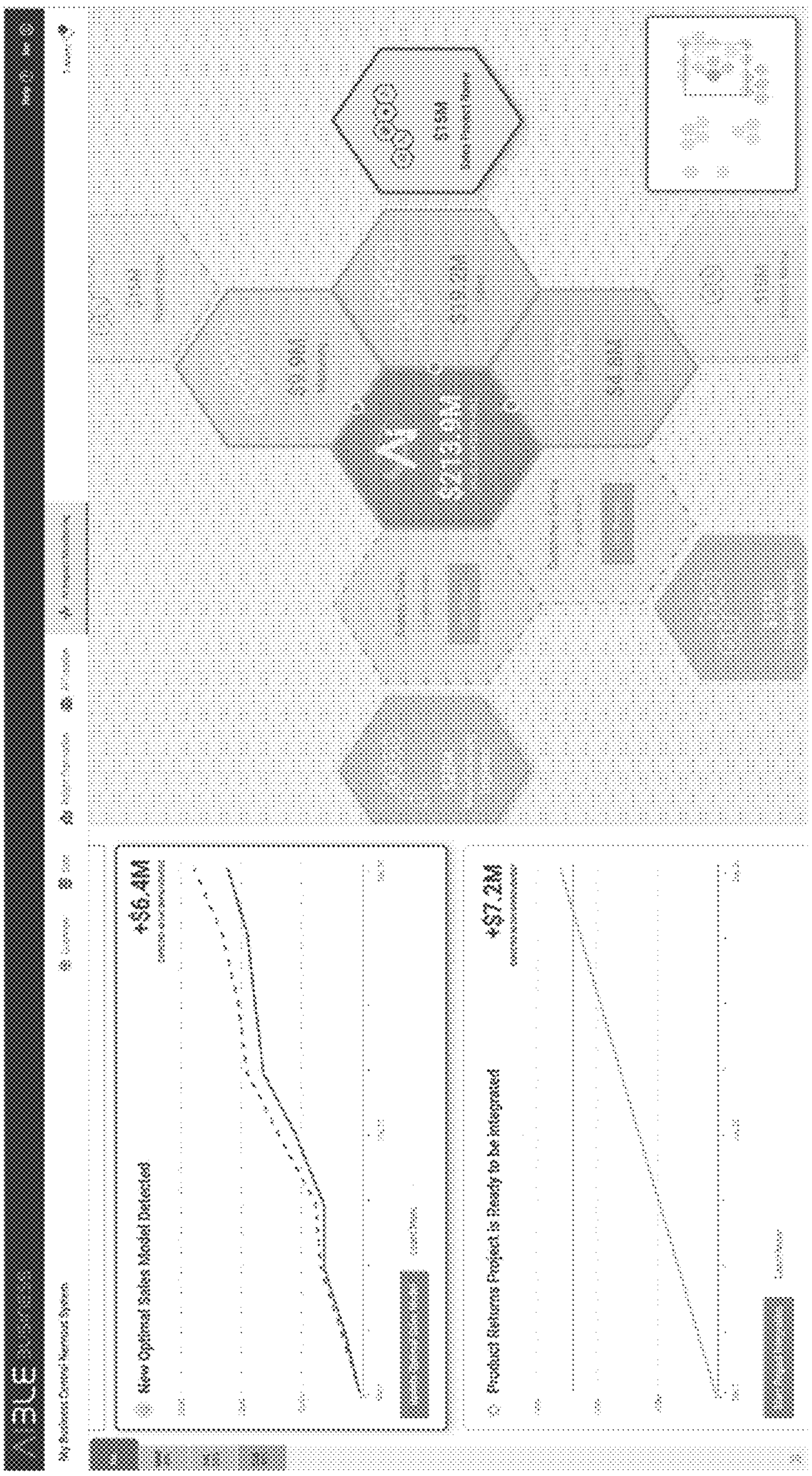
Figure 63:
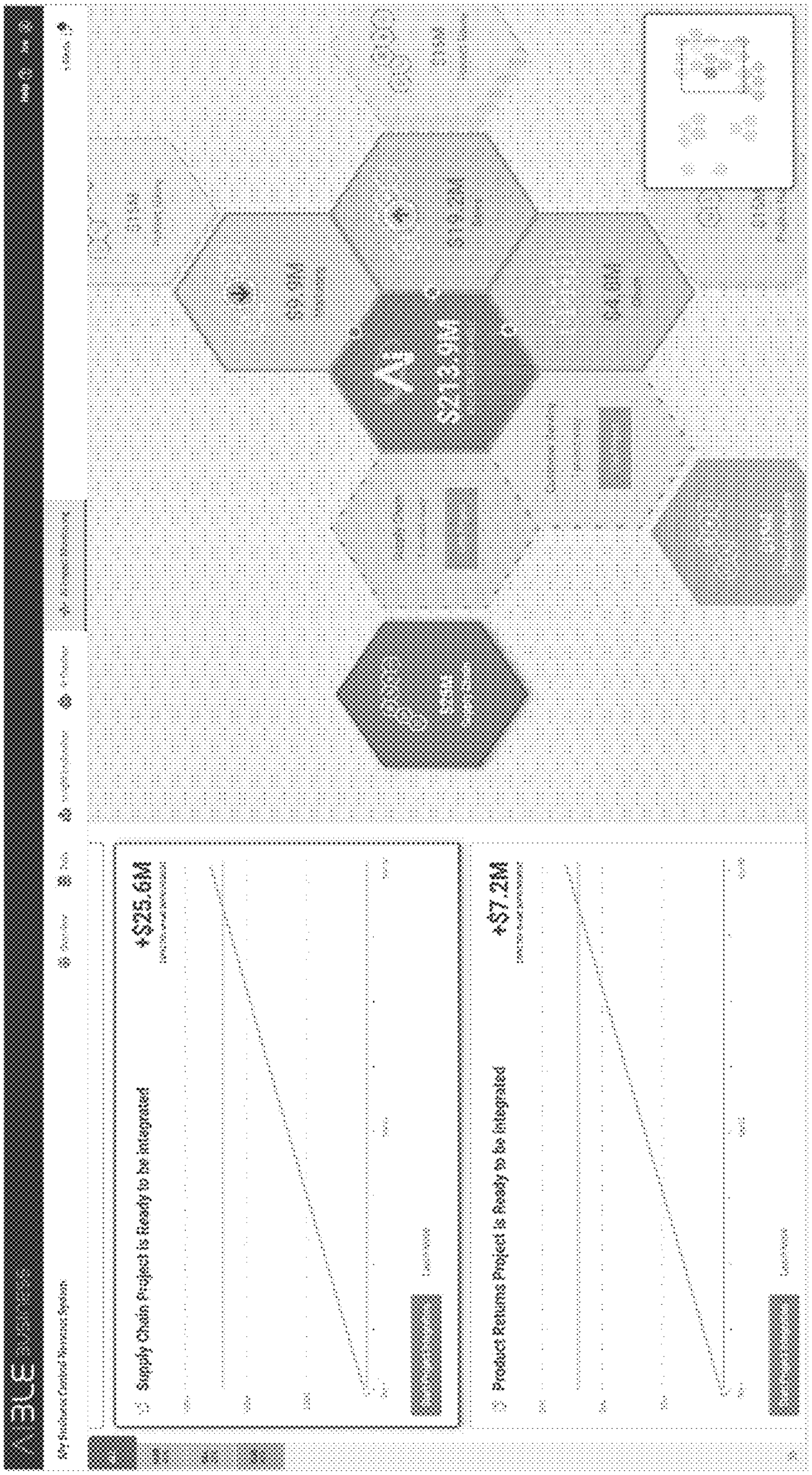
Figure 65:
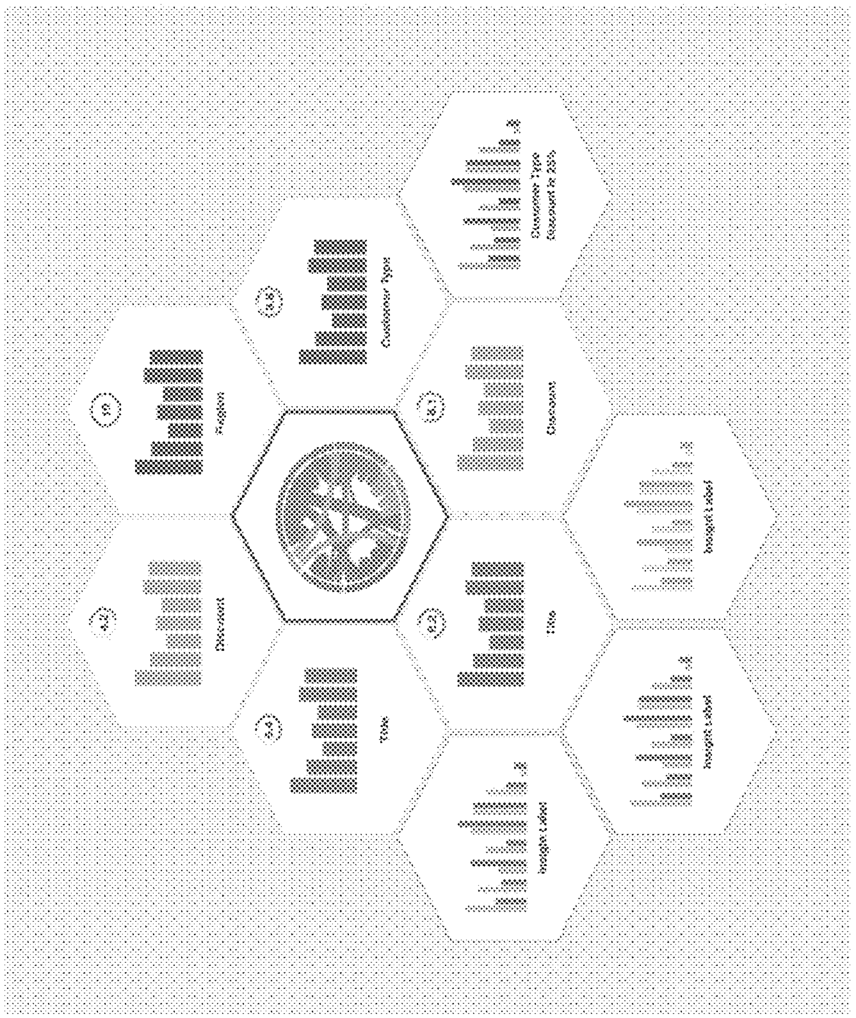
FIGS. 65-67 illustrate examples of the chord chart visualized on a node of several example interfaces.
Figure 66:
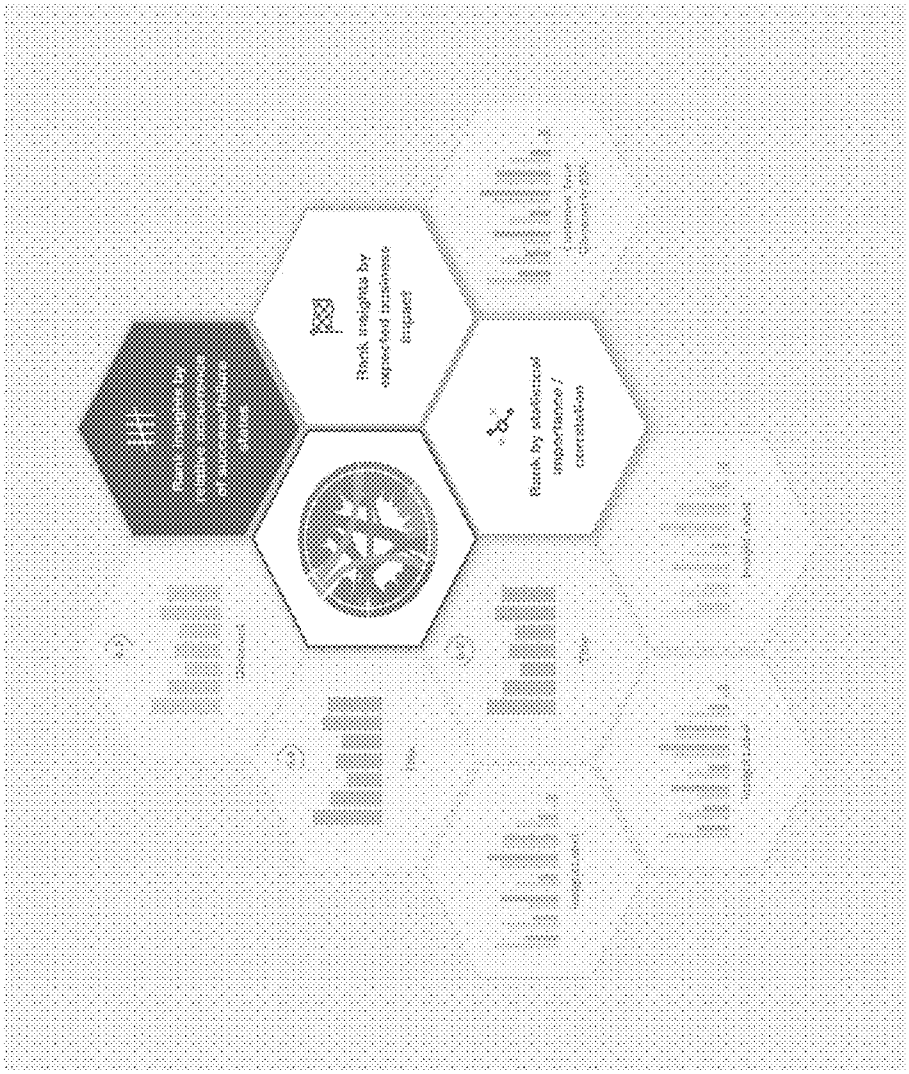
Figure 67:
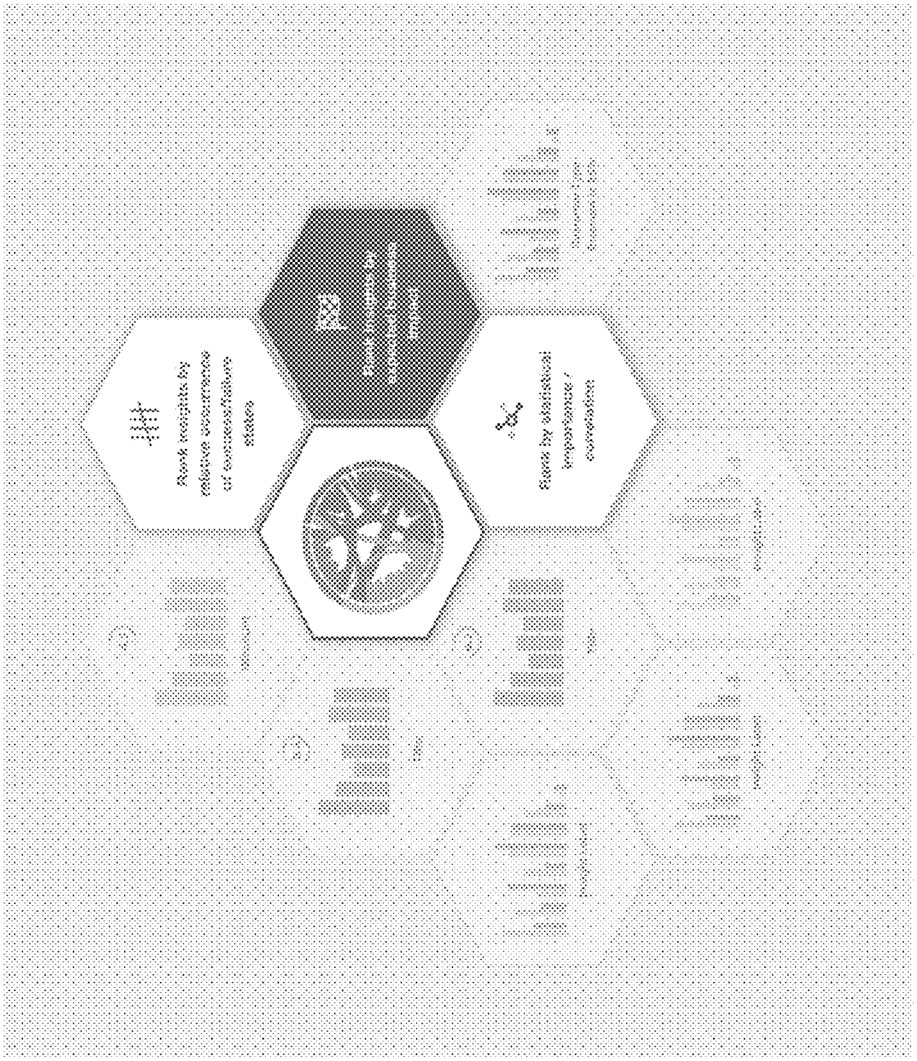

FIGS. 60-63 illustrate some implementations of the current subject matter that can provide an executive overview of various AI and machine learning projects in a given enterprise showing how much value they are creating, how they are linked together, projects that could be creating value but haven't been deployed, and valuable insights from other analytical activities. FIG. 62 illustrates a view in which a more optimal model for the enterprise has been identified and highlighted. FIG. 61 illustrates a view in which a project that has not been integrated is highlighted and how much the expected impact of the integration is shown.

Figure 70:
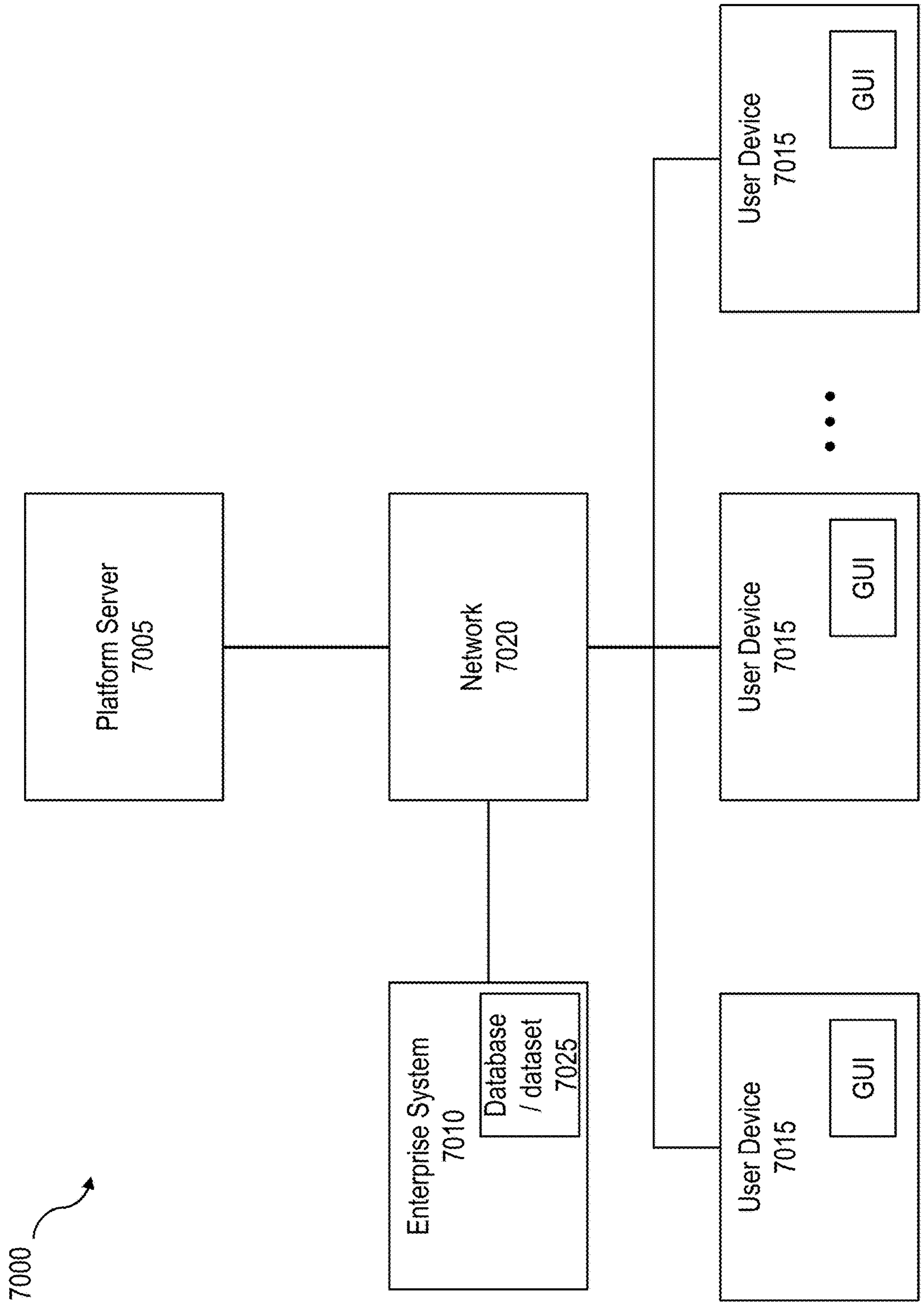
FIG. 70 is a system block diagram illustrating an example implementation of the current subject matter.

FIG. 70 is a system block diagram illustrating an example system 7000 that can enable collaboration of users, including subject matter expert and non-expert users, for developing and performing analytical tasks. The system 7000 includes a platform server 7005 that communicates with an enterprise system 7010 and a number of user devices 7015 via a network 7020. The enterprise system 7010 can include a database or dataset 7025 storing data relevant for performing analytical tasks. Each user device 7015 can include an input device and graphical user interface. The platform server 7005 can be capable of performing, for example, the process as described in FIG. 45.

Impact Driven Analysis

Some implementations of the current subject matter can include providing a visualization that can intuitively and quickly provide for a user to analyze the importance of variables and interactions of variables. In some implementations, a chord chart can be provided in which the arcs represent variables, the relative size of the arcs represent the importance of the variable (large being more important), and the chords connecting the variables can show the interaction (e.g., cost-benefit tradeoff, impact, and the like) between the variables. The chord can be weighted by economic impact of another factor, and not just statistical correlation. FIG. 64 is an example of a chord chart according to some example implementations.

Here the length of the arc that connects back to itself shows the strength of the individual variable in predicting an outcome. The chords show the strength of the combination of variables connected. It gives a quick overview of which single and multi-variable combinations are most important drivers of the outcome such as win rate or infection rate.

These drivers can be measured based on simple statistical measures like prediction drivers/regression coefficients and the like. In some implementations, the chords can be weighted by expected business impact by weighing the chords and arcs by (a) relative occurrence of success/failure states, (b) expected business impact of the specific driver. Business impact of the specific driver is related to quantifying how much impact would be delivered by an AI or how important the driver is to the business definition of success. For example, in a sales use case, a successful sale may be worth $100 and a failed attempt at a sale may cost $1. The statistical driver as calculated by standard techniques for detecting the important of a prediction factor such as 'Industry=Manufacturing" may thus be multiplied by a) the relative frequency-weighted relative impact ($100 vs. −$1) of the occurrence of success and failure states in the data where Industry=Manufacturing orb) the relative frequency-weighted relative impact ($100 vs. −$1) of the expected True Positive and False Positive rates for a predictive model if applied to predict sales opportunities where Industry=Manufacturing in the future. This allocates that expected impact back to the different drivers of the AI. So if one variable is responsible for 10% of the relative driver strength of the AI, then it would be weighted at 10% in the chord diagram.

Although a few variations have been described in detail above, other modifications or additions are possible. For example, the above illustrated example represents an action graph utilizing hexagons and so can be considered to be restricted to the top 6 recommended steps at any point in the analysis. However, some implementation can be conducted using up to four recommended steps (squares), up to five (pentagons), up to eight (octagons), and the like. In some implementations, the underlying graph of granular analytical tasks that is used to enforce structure on the broader analytical task can be represented visually in many different ways. Similarly, while in this example color has been used to denote different X-axis variables in the data exploration examples (e.g., at FIGS. 16 and 17), shapes, icons and other visual representations can be used to denote such characteristics instead. While a clock-wise order or numbers have been used to indicate the most recommended next step, (or other information) alternative visual representations such as colors, icons, size, transparency levels, can be used to denote which is the most recommended next step, (or other information).

The subject matter described herein provides many technical advantages. For example, decomposing analytical tasks into assemblies of granular analytical tasks can enable the system to learn organizational best practices of various form and leverage such best practices to recommend next steps to users. For example, if users always filter out certain variables from sales data exported from a certain data source, the system can learn and automatically conduct such a step or at least recommend such a step to future users analyzing the same data. If users working on certain types of datasets tend to create certain derived variables, such as customer tenure in the case of customer churn analysis, the system can observe the granular analytics tasks of such users and recommend the addition of the appropriate derived variable when the dataset has the appropriate learned characteristics such as datasource, prior analysis by other users, variables, time since last access, and the like. If users analyzing marketing data typically draw and comment on a chart of marketing spend by region, then the system can start recommending such a chart whenever a user starts analyzing marketing data where the relevant variables exist for such a chart. By observing the types of granular analytical tasks performed by experts on different projects, the types of such projects, and the corresponding ratings or user acceptance rates of their work, the system can generate a granular evidence driven view of the nature of expertise of each expert, the kind of projects where they are expected to perform well and where they are not.

In some implementations, a similar analysis can be conducted for any kind of user to provide coaching recommendations based their success rates on different types of projects, the kinds of granular analytical tasks they tend to perform or not perform, the kinds of recommendations they tend to accept or ignore. For example, a user may be informed that they typically work on much smaller datasets than their peers working on similar projects and that their projects tend to be more popular or shared/used more broadly if they include at least 5 more fields or 20% more rows of data. Such analysis can also be used to better allocate analytical projects to the users most likely to succeed with such a project. Some implementations of the system can use request patterns for analytical projects to predict analyst demand for a specific time period and whether or not outsourced analysts may be needed to meet expected demand during the time period. Some implementations of the system can optimally allocate analytical tasks to the right analyst based on information about each analyst's project backlogs, expected demand, relative efficiency, and relative expertise for different types of analytical tasks.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

providing, in a first graphical user interface (GUI), a first set of nodes indicative of a multi-step analytical process including a plurality of analytical tasks, wherein the multi-step analytical process includes at least one of importing a dataset, building an analytical model using the dataset, and/or deploying an analytical model to operate on live data, wherein a first node of the first set of nodes is indicative of a first analytical task of the multi-step analytical process, wherein a spatial arrangement of the first set of nodes in the GUI is indicative of a temporal order associated with the plurality of analytical tasks in the multi-step analytical process;

receiving data characterizing a first input from a first user indicative of a request for assistance with the first analytical task, wherein the request for assistance from the first user includes a predetermined set of requirements comprising one or more access parameters characterizing whether a second user is permitted to access a record of a dataset associated with the first analytical task;

providing a first user with a plurality of prospective second users configured to provide assistance to the first user;

providing an assistance notice to the plurality of prospective second users comprising at least a portion of the predetermined set of requirements;

receiving data characterizing user characteristics associated with the plurality of prospective users;

selecting a second user from among the prospective second users based on comparing a predetermined set of requirements included in the request for assistance from the first user and the received data characterizing user characteristics;

providing the selected second user with a second GUI including the spatial arrangement of the first set of nodes; and receiving data characterizing a second input from a second user indicative of interaction of the selected second user with the first analytical task via the first node, wherein the second input includes a request for information associated with the first analytical task, and wherein the first analytical task is completed by a combination of the first user and the selected second user.

2. The method of claim 1, wherein the second input includes a request for information associated with the first analytical task.

3. The method of claim 2, further comprising:

selecting a data sub-set from a dataset associated with the first analytical task, the selecting based on the one or more access parameters; and providing the selected data sub-set to the second user.

4. The method of claim 1, further comprising providing, in a third graphical user interface (GUI), a second set of nodes indicative of the selected one or more users;

wherein the second set of nodes are arranged adjacent to a core node located at a first location in the third GUI, the arrangement based on a plurality of priority values, wherein each node of the second set of nodes is associated with a priority value of the plurality of priority values.

5. The method of claim 4, wherein a second node of the second set of nodes is located at a second location in the third GUI, the second node associated with the second user, wherein the second location is indicative of a highest priority result associated with the request for assistance;

wherein a third node of the second set of nodes is located at a third location in the third GUI, the third node associated with a third user, wherein the third location is indicative of a second-highest priority result associated with the request for assistance.

6. The method of claim 1, further comprising:

generating an assistance notice including at least a portion of the predetermined set of requirements.

7. The method of claim 1, further comprising:

receiving, via the second GUI, data characterizing a request to provide the temporal order of the plurality of analytical tasks in the multi-step analytical process, the temporal order indicative of the order in which the analytical tasks in the plurality of analytical are created in the first GUI; and sequentially providing the nodes in the first set of nodes in the second GUI, wherein the first node indicative of the first analytical task is displayed prior to a second node indicative of a second analytical task, wherein the first node and the second node are simultaneously displayed after the second node is displayed.

8. The method of claim 1, further comprising providing the data characterizing the second input to the first user via the first GUI, the provided data indicative of operations performed by the second user on the first analytical task.

9. A system comprising:

at least one data processor; and at least one memory storing instructions which, when executed by the at least one data processor, result in operations comprising:

providing, in a first graphical user interface (GUI), a first set of nodes indicative of a multi- step analytical process including a plurality of analytical tasks, wherein the multi-step analytical process includes at least one of importing a dataset, building an analytical model using the dataset, and/or deploying an analytical model to operate on live data, wherein a first node of the first set of nodes is indicative of a first analytical task of the multi-step analytical process, wherein a spatial arrangement of the first set of nodes in the GUI is indicative of a temporal order associated with the plurality of analytical tasks in the multi-step analytical process;

receiving data characterizing a first input from a first user indicative of a request for assistance with the first analytical task wherein the request for assistance from the first user includes predetermined set of requirements comprising one or more access parameters characterizing whether a second user is permitted to access a record of a dataset associated with the first analytical task;

providing a first user with a plurality of prospective second users configured to provide assistance to the first user;

providing an assistance notice to the plurality of prospective second users comprising at least a portion of the predetermined set of requirements;

receiving data characterizing user characteristics associated with the plurality of prospective users;

selecting a second user from among the prospective second users based on comparing a predetermined set of requirements included in the request for assistance from the first user and the received data characterizing user characteristics;

providing the selected second user with a second GUI including the spatial arrangement of the first set of nodes; and receiving data characterizing a second input from a second user indicative of interaction of the selected second user with the first analytical task via the first node, wherein the second input includes a request for information associated with the first analytical task, and wherein the first analytical task is completed by a combination of the first user and the selected second user.

10. The system of claim 9, wherein the second input includes a request for information associated with the first analytical task.

11. The system of claim 10, the operations further comprising:

selecting a data sub-set from a dataset associated with the first analytical task, the selecting based on the one or more access parameters; and providing the selected data sub-set to the second user.

12. The system of claim 9, the operations further comprising providing, in a third graphical user interface (GUI), a second set of nodes indicative of the selected one or more users;

wherein the second set of nodes are arranged adjacent to a core node located at a first location in the third GUI, the arrangement based on a plurality of priority values, wherein each node of the second set of nodes is associated with a priority value of the plurality of priority values.

13. The system of claim 12, wherein a second node of the second set of nodes is located at a second location in the third GUI, the second node associated with the second user, wherein the second location is indicative of a highest priority result associated with the request for assistance;

wherein a third node of the second set of nodes is located at a third location in the third GUI, the third node associated with a third user, wherein the third location is indicative of a second-highest priority result associated with the request for assistance.

14. The system of claim 9, the operations further comprising:

generating an assistance notice including at least a portion of the predetermined set of requirements.

15. The system of claim 9, the operations further comprising:

receiving, via the second GUI, data characterizing a request to provide the temporal order of the plurality of analytical tasks in the multi-step analytical process, the temporal order indicative of the order in which the analytical tasks in the plurality of analytical are created in the first GUI; and sequentially providing the nodes in the first set of nodes in the second GUI, wherein the first node indicative of the first analytical task is displayed prior to a second node indicative of a second analytical task, wherein the first node and the second node are simultaneously displayed after the second node is displayed.

16. The system of claim 9, the operations further comprising providing the data characterizing the second input to the first user via the first GUI, the provided data indicative of operations performed by the second user on the first analytical task.

17. A non-transitory computer readable medium storing executable instructions that, when executed by at least one processor forming part of at least one computing system, cause the at least one processor to perform operations comprising:

providing, in a first graphical user interface (GUI), a first set of nodes indicative of a multi-step analytical process including a plurality of analytical tasks, wherein the multi-step analytical process includes at least one of importing a dataset, building an analytical model using the dataset, and/or deploying an analytical model to operate on live data, wherein a first node of the first set of nodes is indicative of a first analytical task of the multi-step analytical process, wherein a spatial arrangement of the first set of nodes in the GUI is indicative of a temporal order associated with the plurality of analytical tasks in the multi-step analytical process;

receiving data characterizing a first input from a first user indicative of a request for assistance with the first analytical task, wherein the request for assistance from the first user includes a predetermined set of requirements comprising one or more access parameters characterizing whether a second user is permitted to access a record of a dataset associated with the first analytical task;

providing a first user with a plurality of prospective second users configured to provide assistance to the first user;

providing an assistance notice to the plurality of prospective second users comprising at least a portion of the predetermined set of requirements;

receiving data characterizing user characteristics associated with the plurality of prospective users;

selecting a second user from among the prospective second users based on comparing a predetermined set of requirements included in the request for assistance from the first user and the received data characterizing user characteristics;

providing the selected second user with a second GUI including the spatial arrangement of the first set of nodes; and receiving data characterizing a second input from a second user indicative of interaction of the selected second user with the first analytical task via the first node, wherein the second input includes a request for information with the first analytical task, and wherein the first analytical task is completed by a combination of the first user and the selected second user.

18. The non-transitory computer readable medium of claim 17, wherein the second input includes a request for information associated with the first analytical task.

* * * * *